United States Patent
Nakamura et al.

(10) Patent No.: US 7,583,826 B2
(45) Date of Patent: Sep. 1, 2009

(54) IMAGE READING APPARATUS AND ITS DRIVING METHOD

(75) Inventors: Yoshiaki Nakamura, Ome (JP); Tatsuya Miyakawa, Tachikawa (JP); Shigeru Morikawa, Tokyo (JP); Tomomi Iihama, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1116 days.

(21) Appl. No.: 10/632,080

(22) Filed: Jul. 30, 2003

(65) Prior Publication Data

US 2004/0021786 A1 Feb. 5, 2004

(30) Foreign Application Priority Data

Jul. 31, 2002 (JP) ............................. 2002-224110
Sep. 19, 2002 (JP) ............................. 2002-272501

(51) Int. Cl.
*G06K 9/00* (2006.01)
(52) U.S. Cl. ...................... 382/124; 382/115; 382/125; 382/126; 340/5.53; 340/5.83; 713/186
(58) Field of Classification Search ................ 382/124, 382/125, 126, 127; 340/5.53, 5.83; 356/71; 713/186; 283/68, 69
See application file for complete search history.

(56) References Cited

U.S. PATENT DOCUMENTS 5,828,773 A * 10/1998 Setlak et al. ................ 382/126
5,953,441 A 9/1999 Setlak
6,181,808 B1 * 1/2001 Fukuzumi ................... 382/126

(Continued)

FOREIGN PATENT DOCUMENTS

CN 1256773 A 6/2000

(Continued)

OTHER PUBLICATIONS

Ma, Making Silicon Nitride Film a Viable Gate Dielectric, Mar. 1998, IEEE Transactions on Electron Devices, vol. 45, No. 3, pp. 680-690.*

(Continued)

*Primary Examiner*—Vikkram Bali
*Assistant Examiner*—Daniel Zeilberger
(74) *Attorney, Agent, or Firm*—Frishauf, Holtz, Goodman & Chick, P.C.

(57) ABSTRACT

An image reading apparatus for reading an image pattern of a detecting object comprises a detecting surface on which a detecting object is placed, a sensor array having a plurality of sensors arranged to read an image pattern of the detecting object placed on the detecting surface, a first detection electrode, provided on at least an upper portion of the sensor array, having the detecting surface; a second detection electrode provided to be electrically insulated and spaced from the first detection electrode; a counter electrode provided to be opposite to the first detection electrode through an interlayer insulating film; signal voltage applying circuit which applies a signal voltage having a first signal waveform that varies periodically to the counter electrode to excite a second signal waveform to the first detection electrode through the interlayer insulating film, and contact detector which determines whether the detecting object brought into contact with the detecting surface is a specific detecting object based on a third signal waveform excited to the second detection electrode according to contact of the detecting object with both the first detection electrode and the second electrode wherein a reading operation of the image pattern of the detecting object is performed based on the determination result by the contact detector.

39 Claims, 27 Drawing Sheets

U.S. PATENT DOCUMENTS

| | | | |
|---|---|---|---|
| 6,240,199 B1 * | 5/2001 | Manchanda et al. | 382/124 |
| 6,414,297 B1 | 7/2002 | Sasaki et al. | |
| 6,486,504 B1 | 11/2002 | Guidash | |
| 6,681,992 B2 | 1/2004 | Iihama | |
| 6,784,413 B2 | 8/2004 | Sasaki et al. | |
| 2001/0030324 A1 * | 10/2001 | Morikawa et al. | 257/59 |
| 2002/0014530 A1 * | 2/2002 | Iihama | 235/454 |

FOREIGN PATENT DOCUMENTS

| | | |
|---|---|---|
| DE | 100 21 501 C1 | 10/2001 |
| JP | 07-176713 A | 7/1995 |
| JP | 2001-92951 A | 4/2001 |
| JP | 2002-050750 A | 2/2002 |
| TW | 485620 | 5/1991 |

OTHER PUBLICATIONS

English language translation of the Text of the First Office Action Issued in Chinese Patent Application No. 03152474.5.*

Japanese Office Action (and English translation thereof) dated Jun. 10, 2008, issued in a counterpart Japanese Application.

English language translation of the Text of the First Office Action issued in Chinese Patent Application No. 03152474.5, 2006.

Japanese Office Action dated Oct. 2, 2008 issued in a counterpart Japanese Application No. 2002-272501 and English translation thereof.

* cited by examiner

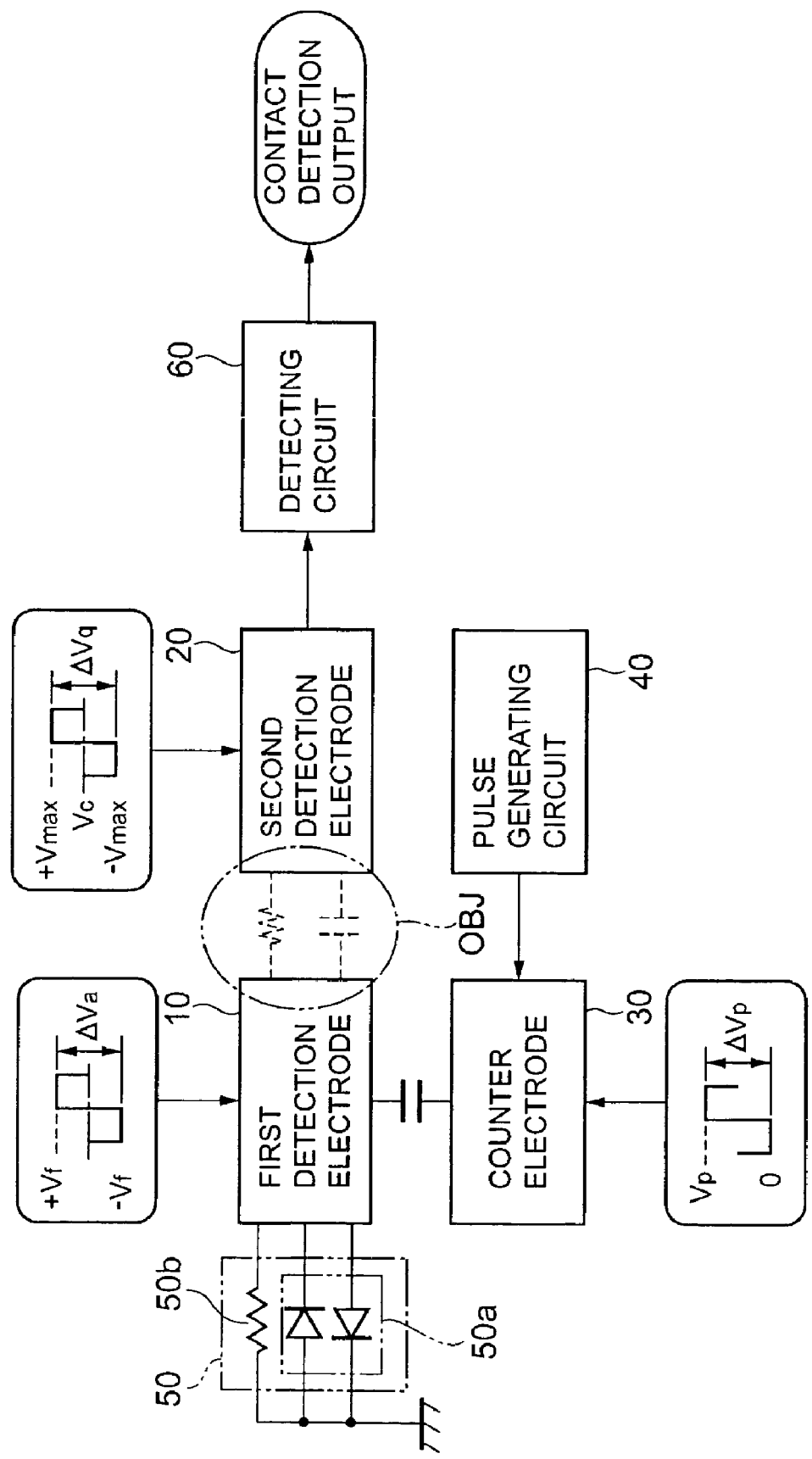

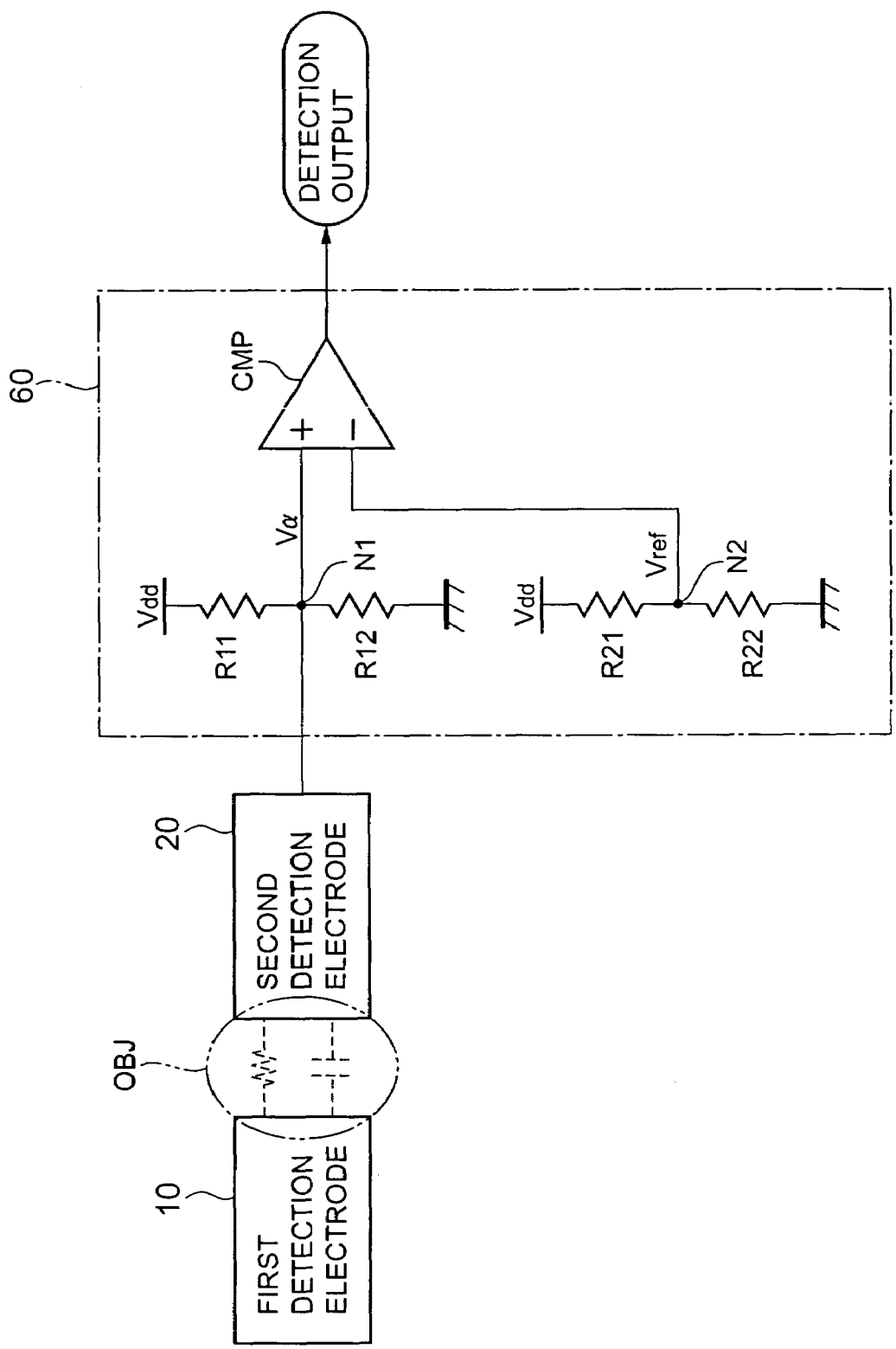

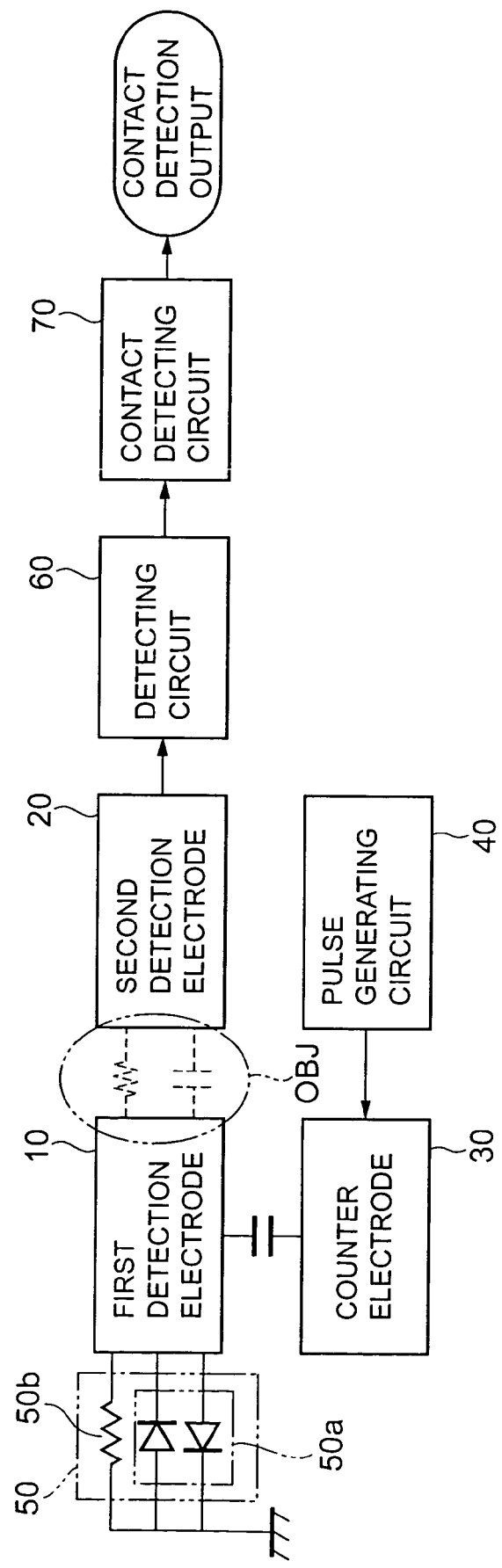

A-A PARTIAL CROSS SECTION

B-B PARTIAL CROSS SECTION

IMAGE READING APPARATUS AND ITS DRIVING METHOD

BACKGROUND OF THE INVENTION

1. Field of the Invention

The present invention relates to an image reading apparatus, and more in particular to an image reading apparatus and its driving method that brings a detecting object into contact with a sensor array having a plurality of sensors arranged in a matrix form to detect a contact state of a specific detecting object such as a human body and the like and to execute a reading operation of an image pattern of the detecting object.

2. Description of the Related Art

As a two-dimensional image reading apparatus that reads a printed material, a photograph, or a fine concave and convex shape such as a fingerprint, there is used, for example, a structure that places a detecting object on a detecting surface formed on a photosensor array having photoelectric transducers (photosensors) arranged in a matrix form to be brought into contact therewith to read an image pattern of the detecting object.

In the image reading apparatus having such the structure in which the detecting object directly comes in contact with the detecting surface, there is known one that has a function (hereinafter referred to as "contact detecting function") of detecting a contact state of the detecting object with the detecting surface to start the image reading in order to perform an appropriate image reading operation as suppressing deterioration in device characteristics of the photosensors. Moreover, there is known one that has a function (hereinafter referred to as "electrostatic removing function") of discharging and removing static electricity in order to suppress device damage by static electricity charged onto the detecting object and generation of an erroneous operation.

A brief explanation will be hereinafter given of the conventional structure of the image reading apparatus having the aforementioned contact detecting function and the electrostatic removing function with reference to the drawings. In addition, a fingerprint reading apparatus will be hereinafter explained as the structural example of the image reading apparatus.

First, the conventional contact detecting function will be explained.

FIG. 25 is a schematic structural view illustrating one structural example of the conventional contact detecting function, and FIG. 26 is a schematic structural view illustrating another structural example. The contact detecting function illustrated in FIG. 25 is one that is called a resistance detecting system.

Schematically, this system is structured to have a photosensor array 300A having a plurality of photosensors 310 arranged on one surface side of a transparent insulating substrate in a matrix form, transparent electrode layers 320$x$ and 320$y$ formed on an array area where at least the plurality of photosensors 310 is arranged to divide the array area into two to be spaced therebetween via a slight gap GP, a detecting circuit 330$a$, which applies a D.C. voltage to either one of the transparent electrode layers 320$x$ and 320$y$ (for example, transparent electrode layer 320$x$) through a lead wire PLx and applies a ground potential to the other transparent electrode layers (for example, transparent electrode layer 320$y$) through a lead wire Ply to detect a change in voltage when a detecting object such as a finger FG is placed between the transparent electrode layers 320$x$ and 320$y$ to be brought into contact therewith to start the image reading operation in the image reading apparatus, and a surface light source (not illustrated) arranged on a back surface side of the photosensor array 300A.

In such the image reading apparatus, when the detecting object such as the finger FG is placed to be laid across the transparent electrode layers 320$x$ and 320$y$ and is brought into contact therewith, the detecting circuit 330$a$ observes a change in voltage generated when an electrical conduction between the transparent electrode layers 320$x$ and 320$y$ is made through the electric resistance of the finger FG, thereby detecting that the finger is placed on the photosensor array 100$p$ to operate various kinds of drivers and the surface light source (not illustrated), and to automatically execute the image reading operation of the image pattern (fingerprint) of the detecting object.

Moreover, the contact detecting function illustrated in FIG. 26 is one that is called a capacitance detecting system.

Schematically, this system is structured to have a photosensor array 300B having a plurality of photosensors 310 arranged in a matrix form, a transparent electrode layer 320$z$ formed to cover the entirety of the array area, a detecting circuit 330$b$, which is connected to the transparent electrode layer 320$z$ through a lead wire PLz to detect a change in capacitance when a detecting object is placed on the transparent electrode layer 320$z$ to be brought into contact therewith to start the image reading operation in the image reading apparatus, and a surface light source (not illustrated) arranged on a back surface side of the photosensor array 300B.

In such the image reading apparatus, when the detecting object such as the fingerprint FG is placed on the transparent electrode layer 320$z$ and brought into contact therewith, the change in the capacitance generated when the finger (human body) as a dielectric is contacted and added in connection with the capacitance, which the photosensor array 300B as such originally has, is observed, thereby detecting that the finger is placed on the photosensor array 300B to automatically execute the mage reading operation of reading the fingerprint.

An explanation will be next given of the conventional electrostatic removing function.

FIG. 27A is a schematic structural view illustrating one structural example of the conventional electrostatic removing function in the image reading apparatus.

Schematically, this system is structured to have a photosensor array 300C having a plurality of photosensors 310 arranged on one surface side of a transparent insulating substrate in a matrix form, a transparent electrode layer 330$z$ formed to cover the entirety of the array area where at least a plurality of photosensors 310 is arranged, a lead wire PLp, which connects the transparent electrode layer 330$z$ to a ground potential, and a surface light source (not illustrated) arranged on a back surface side of the photosensor array 300C. Additionally, in the figure, Rp is a wiring resistance for the lead wire PLp.

In such the image reading apparatus, when the detecting object such as the fingerprint FG is placed on the transparent electrode layer 330$z$ and brought into contact therewith, electrical charges (static electricity) carried on the finger FG (human body) are discharged to the ground potential through the lead wire PLp. Namely, since overcurrent, which is caused by the electrical charges carried on the finger FG, flows into the ground potential through the lead wire PLp (wiring resistance Rp), which is the relatively low resistance, it is possible to suppress device damage of the photosensors due to static electricity and generation of the erroneous operation of the image reading apparatus. Here, in conventional, it is known that discharge voltage generated by contact of the figure is generally 3 to 4 kV, so that it is considered that electrostatic withstand pressure may be 5 kV or more. Then, in order to obtain this electrostatic withstand pressure, sheet resistance for the transparent electrode layer $330z$ was set to a value lower than about 50 $\Omega/\square$ and preferably about 15 to 20 $\Omega/\square$.

Moreover, the image reading apparatus having both the contact detecting function and electrostatic removing function is also known. FIG. 27B is a schematic structural view illustrating one structural example of a case in which the image reading apparatus has both the contact detecting function and the electrostatic removing function.

In this case, the transparent electrode layer $330z$ formed on the photosensor array area is connected to a detecting circuit $330b$ through the lead wring PLp, and for example, an anti-parallel diode circuit $340z$ having a pair of diodes connected in parallel to be opposite to each other is connected between the lead wire PLp and the ground potential, and overcurrent, which is caused by the electrical charges carried on the finger FG, flows into the ground potential through the lead wire PLp with wiring resistance Rp and the diode of the anti-parallel diode circuit $340z$.

However, in the aforementioned conventional image reading apparatuses, the following problems were present.

In the image reading apparatus (fingerprint reading apparatus) of the resistance detecting system as illustrated in FIG. 25, there is used the method in which the contact state of the detecting object is detected based on a resistance value obtained when the detecting object comes in contact with both the transparent electrode layers $320x$ and $320y$ spaced therebetween through the gap GP, however, when the relevant detecting object is a human body, a resistance value peculiar to the detecting object (human body) largely varies due to influences of an individual difference such as the person's constitution and condition and the like or external environments such as temperature, moisture, and the like. This causes a problem in which the contact state of the detecting object cannot be correctly detected and control of starting the image reading operation became ununiform and unstable.

While, in the image reading apparatus of the capacitance detecting system as illustrated in FIG. 26, as one of the methods for correctly detecting the contact state of the detecting object, there is used the method of reading a change in a weak signal voltage that varies in accordance with a capacitance component which the detecting object has, however, in order to judge the change in such a weak voltage, it is desirable that not only the capacitance of the transparent electrode layer but also a parasitic capacitance, which is generated between the photosensitive sensor and the transparent electrode layer, should be extremely small. However, it is necessary to form the transparent electrode layer relatively thick such that the transparent electrode layer has a sufficiently small sheet resistance in order to improve electrostatic withstand pressure of the photosensors and the peripheral circuits. Here, when general metallic oxide is used as a transparent electrode layer, this has a characteristic of a relatively high electrical resistivity, so that when the transparent electrode layer is deposited thick to reduce the sheet resistance as mentioned above, the capacitance of the transparent electrode layer as such largely increases and the parasitic capacitance between the photosensor and the transparent electrode layer increases to reduce a signal to noise ratio (S/N) with respect to the change in the capacitance due to contact of the detecting object, and this causes a problem in which there is difficulty in detecting the change in the capacitance satisfactorily when the detecting object (human body) is placed on the detecting surface.

Moreover, the aforementioned contact detecting system and capacitance detecting system pay attention to only the electric resistance value of the detecting object or the capacitance value to detect the change generated thereby, and this causes a problem in which when a foreign object or objects besides a normal object as the detecting object are contacted, there is difficulty in judgment of whether this is a normal detecting object or not.

Moreover, in the image reading apparatus having the electrostatic removing function as illustrated in FIGS. 27A and 27B, since the film material of the transparent electrode layer $330C$ needs optical transparency and conductivity for discharging static electricity through the lead wire PLp, a transparent conductive film such as a stannic oxide ($SnO_2$) film, an ITO (Indium-Tin-Oxide) film and the like is generally used.

As mentioned above, conventionally, when the sheet resistance of the transparent electrode layer is set to a value lower than about 50 $\Omega/\square$ and preferably about 15 to 20 $\Omega/\square$, a predetermined electrostatic withstand pressure can be obtained, and it is known that such a value can be obtained by setting a film thickness to approximately about 1500 to 2000 Å (150 to 200 nm) when the ITO film is used as the transparent electrode layer.

By the way, the condition of the sheet resistance value of the aforementioned transparent electrode layer was obtained based on such a condition that the electrostatic withstand pressure was 5 kV or more with respect to the discharge voltage due to contact of the finger as mentioned above. However, the study zealously made by the inventors of the present invention later revealed that the human body was electrically charged to 10 kV in some cases. Then, as the electrostatic withstand pressure against this, it was shown that there was need of a value higher than 10 kV, more specifically a value of 10 to 15 kV.

In contrast to this, it can be expected that necessary electrostatic withstand pressure can be obtained by further setting the transparent electrode layer to have low resistance based on the concept of the prior art, however, in this case, the film thickness of the transparent electrode layer must be much thicker. However, since this transparent electrode layer must have a good transmittance and should not prevent the object image pattern from being read, the film thickness cannot be increased unnecessarily. Moreover, when the capacitance detecting system, as the contact detecting function, using the transparent electrode layer is applied, the increase in the thickness of the transparent electrode layer increases the parasitic capacitance between the photosensor and the transparent electrode layer, and this causes a problem in which there is difficulty in detecting the change in the capacitance satisfactorily when the detecting object (human body) is placed on the detecting surface as mentioned above.

SUMMARY OF THE INVENTION

An image reading apparatus for reading an image pattern of a detecting object of the present invention has advantages in which the contact state of a specific detecting object placed on a detecting surface and brought into contact therewith is detected excellently to make it possible to start a reading operation of the image pattern, and static electricity charged onto the detecting object is discharged satisfactorily to make it possible to prevent device damage due to static electricity and generation of an erroneous operation of a system.

In order to obtain the above advantage, an image reading apparatus according to the present invention comprises a detecting surface on which a detecting object is placed; a sensor array having a plurality of sensors arranged to read an image pattern of the detecting object placed on the detecting surface; a first detection electrode, provided on at least an upper portion of the sensor array, having the detecting surface; a second detection electrode provided to be electrically insulated and spaced from the first detection electrode; a counter electrode provided to be opposite to the first detection electrode through an interlayer insulating film; signal voltage applying circuit which applies a signal voltage having a first signal waveform that varies periodically to the counter electrode to excite a second signal waveform to the first detection electrode through the interlayer insulating film; contact detector which determines whether the detecting object brought into contact with the detecting surface is a specific detecting object based on a third signal waveform excited to the second detection electrode according to contact of the detecting object with both the first detection electrode and the second electrode; and drive controller which supplies a predetermined drive control signal to each sensor of the sensor array based on the determination result whether the detecting object is the specific detecting object by the contact detector to perform an image reading operation of the image pattern of the detecting object placed on the detecting surface, wherein the specific detecting object is, for example, a human body, and the image pattern peculiar to the human body is read.

Each sensor of the sensor array is a photosensor, and the first detection electrode and interlayer insulating film have transmittance, the first detection electrode is a transparent conductive film formed on the upper portion of a light receiving surface of at least the sensor array through the interlayer insulting film, and the transparent conductive film is formed of material principally of indium-tin oxide.

The first detection electrode is a conductive film formed on the upper portion of the sensor array, the second detection electrode is conductive member formed close to at least a part of the surrounding of the conductive film, the conductive member is a conductive case member that surrounds around the sensor array, and the detecting object is arranged to be laid across the first detection electrode and the second detection electrode to be brought into contact therewith.

The image reading apparatus further comprises amplitude limiting circuit which defines the upper and lower limit voltage values of the second signal waveform excited to the first detection electrode, for example, an anti-parallel diode circuit provided between the first detection electrode and a ground potential.

The signal voltage applying circuit applies a voltage component having a periodical pulse-like signal waveform with predetermined voltage amplitude to the counter electrode.

The contact detector determines whether the detecting object is the specific detecting object based on a value of voltage amplitude of the third signal waveform excited to the second detection electrode and a value of central voltage of the voltage amplitude. The contact detector determines whether the detecting object is the specific detecting object based on comparison between threshold voltage preset based on a capacitance component and a resistance component of the specific detecting object and the third signal waveform excited to the second detection electrode so as to set the threshold voltage. The contact detector includes a threshold voltage setting circuit that sets the threshold voltage, and a comparing circuit that compares the threshold voltage and the third signal waveform. The contact detector determines that the detecting object is the specific detecting object when the threshold voltage is included within a range of the voltage amplitude of the third signal waveform excited to the second detection electrode based on the comparison result by the comparing circuit.

Moreover, the third signal waveform is a waveform that varies periodically, and the contact detector includes count circuit which counts the number of times the third signal waveform has passed the threshold voltage level, and determines that the detecting object is the specific detecting object when the number of continuous count times by the count circuit exceeds the preset number of times.

The sensors are photosensors, have a source electrode and a drain electrode that are formed to sandwich a channel area formed of a semiconductor layer, the counter electrode is the drain electrode and a drain line connected to the drain electrode, and the first signal voltage applied to the counter electrode by the signal voltage applying circuit is a pulse voltage formed of, for example, a precharge pulse applied to the drain line.

A time constant, which is defined by a resistance component between the detecting surface and the ground potential and a capacitance component added to the detecting surface, is set to 0.3 μsec or a smaller value, more preferably 0.25 μsec or a smaller value. The resistance component includes electrical resistance of the first detection electrode, and is set to 30 Ω or a smaller value. The capacitance component includes electrostatic capacitance between the first detection electrode and the counter electrode opposed through the interlayer insulating film and between the first detection electrode and the sensor, and is set to 10 nF or a smaller capacitance value.

Moreover, each sensor of the sensor array is a photosensor and has a predetermined light receiving surface, and the first detection electrode has an area larger than the area of the light receiving surface, and is a transparent electrode film formed on the upper portion of the light receiving surface of the sensor array through the interlayer insulating film. Also, conductive member having a resistance value lower than a resistance value of the transparent conductive film is provided to be electrically connected to an area besides an area corresponding to at least the light receiving surface of the transparent conductive film. The resistance component includes electrical resistance formed by the transparent conductive film and the conductive member. The conductive member is formed of any one of conductive materials of chromium, aluminum, alloy material containing chromium, and alloy material containing aluminum.

In order to obtain the aforementioned advantages, a driving method for an image reading apparatus according to the present invention comprises the steps of applying signal voltage having a first signal waveform that varies periodically to a counter electrode provided on an upper portion of the sensor array to be opposite to a first detection electrode having the detecting surface through an interlayer insulating film to excite a second signal waveform to the first detection electrode; detecting a third signal waveform excited to the second detection electrode based on contact of the detecting object with both the first detection electrode and second detection electrode provided to be electrically insulated and spaced from the first detection electrode; determining whether the detecting object brought into contact the detecting surface is a specific detecting object based on the state of the detected third signal waveform; and starting reading of the image pattern by the drive controller when it is determined that the detecting object is the specific detecting object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram illustrating a first embodiment of contact detector to implement a contact detecting function according to the present invention;

FIG. 2 is a schematic circuit diagram illustrating a structural example of a detecting circuit applied to contact detector according to the present embodiment;

FIG. 5 is a schematic block diagram illustrating a second embodiment of the present invention of contact detector to implement a contact detecting function according to the present invention;

DETAILED DESCRIPTION OF THE PREFERRED EMBODIMENTS

Figure 3A:
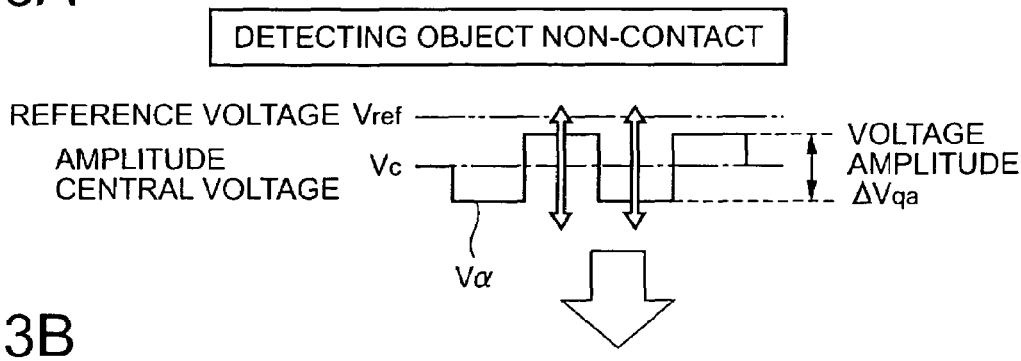
FIGS. 3A to 3D are conceptual views each illustrating one example of a contact detecting operation of the first embodiment of contact detector.

The following will explain the image reading apparatus, which has the contact detecting function, and the electrostatic removing function, and the driving method according to the present invention based on the embodiments illustrated in the drawings.

An explanation will be first given of the structure for implementing the contact detecting function according to the present invention by illustrating the embodiments.

<First Embodiment of Contact Detector>

FIG. 1 is a schematic block diagram illustrating a first embodiment of contact detector (contact detecting circuit) to implement a contact detecting function according to the present invention, and FIG. 2 is a schematic circuit diagram illustrating a structural example of a detecting circuit applied to contact detector according to the present embodiment.

As illustrated in FIG. 1, the contact detector according to the present embodiment is composed of a first detection electrode 10 and a second detection electrode 20, which are provided to be spaced from each other such that a detecting object OBJ lies across both to come in contact therewith, a counter electrode 30, which is provided to be opposite to the first detection electrode 10 via an interlayer insulating film (insulating layer), a pulse generating circuit (signal voltage applying circuit) 40, which applies signal voltage having a predetermined signal waveform to the counter electrode 30, an amplitude limiting circuit (amplitude limiting means) 50, which limits voltage amplitude of a signal component excited to a predetermined range by the first detection electrode 10, and a detecting circuit (contact detector) 60, which detects a change in a signal component excited by the second detection electrode 20 and judges a contact state of the detecting object OBJ with the first detection electrode 10 and the second detection electrode 20.

The first detection electrode 10 uses a thin film formed of conductive material with relatively high electric resistance such as a transparent conductive (stannic oxide ($SnO_2$)) film, an ITO (Indium-Tin-Oxide) film and the like, and is provided to cover the entirety of an area where the detecting object OBJ as a contacting object is placed and contacted.

Moreover, the second detection electrode 20 uses a member formed of conductive material with low electric resistance such as metal, and is provided to be spatially alienated from the first detection electrode 10 through insulating material such as air and the like to be electrically insulated therefrom. Here, the second detection electrode 20 is provided to project to an area close to, for example, the first detection electrode 10 such that the detecting object OBJ is placed on the first detection electrode 10 and is brought into contact therewith and the detecting object OBJ is contacted at the same time. The specific structural examples of the first detection electrode 10 and the second detection electrode 20 are described later.

Accordingly, only when the detecting object OBJ lies across the first detection electrode 10 and the second detection electrode 20 and are placed thereon and brought into contact therewith as illustrated in FIG. 1, the first detection electrode 10 and the second detection electrode 20 are electrically connected to each other.

The counter electrode 30 uses, for example, a conductive thin film, which is formed to be opposite to the first detection electrode 10 through insulating material as a dielectric, and the first detection electrode 10, the insulating film, and the counter electrode 30 form capacitance having a predetermined capacitance value. Here, the counter electrode 30 may be one that is formed as a single thin film layer having a size equivalent to the first detection electrode 10 formed on the entirety of the area where the detecting object OBJ lies across the first detection electrode 10 and the second detection electrode 20 and are placed thereon and brought into contact therewith as mentioned above, or one that is formed beltlike as a thin film layer to have a predetermined arrangement path against the first detection electrode 10. The specific structural example of the counter electrode 30 will be described later.

The pulse generating circuit 40 is structured to generate a pulse-shape signal voltage (first signal waveform) having a predetermined voltage amplitude $\Delta Vp$ (for example, 0 to Vp) and a signal cycle and apply it to the counter electrode 30.

Moreover, for example, as illustrated in FIG. 1, the amplitude limiting circuit 50 is structured to include an anti-parallel diode circuit section 50a, which has a pair of diodes connected in parallel in an opposite direction, and a resistance element 50b, which is connected to the anti-parallel diode circuit section 50a in parallel, between the first detection electrode 10 and a ground potential.

Accordingly, a second signal waveform, which has a signal waveform corresponding to the first signal waveform, is excited from the pulse-shape first signal waveform applied to the counter electrode 30 by the pulse generating circuit 40. Voltage amplitude $\Delta Va$ (amplitude upper limit voltage and amplitude lower limit voltage) of the second signal waveform is defined to a voltage range +Vf to −Vf according to forward voltage Vf of the diode by the anti-parallel diode circuit section 50a of the amplitude limit circuit 50 and is controlled to have positive and negative alternating voltage waveforms around the ground potential by the resistance element 50b.

Here, since the second detection electrode is structured to be spaced from the first detection electrode 10 with a gap and electrically insulated therefrom, the capacitance component formed by the first detection electrode 10 and the second detection electrode 20 becomes extremely small. For this reason, in a state that the detecting object OBJ is not contacted, a signal waveform (third signal waveform), which is excited to the second detection electrode 20 by the second signal waveform excited to the first detection electrode 10 by the pulse generating circuit 40, becomes extremely small, and is set that no detection is performed by the detecting circuit 60.

The second signal waveform whose voltage amplitude $\Delta Va$ is limited is excited to the first detection electrode 10 by such the amplitude limiting circuit 50, and the voltage range is defined to the voltage range +Vf to −Vf by the voltage amplitude $\Delta Va$, thereby even if an electrical disturbance element, which exceeds this voltage range (voltage more than amplitude upper limit voltage +Vf and voltage less than amplitude lower limit voltage −Vf), is applied to the first detection electrode 10, current flows into the ground potential by the anti-parallel diode 50a connected to the amplitude limiting circuit 50 and only voltage, which is within the predetermined voltage range (+Vf to −Vf) defied by the voltage amplitude $\Delta Va$, is applied to the first detection electrode 10. Accordingly, it is possible to prevent overvoltage, which is more than, for example, the amplitude upper limit voltage +Vf, from being applied to the counter electrode 30 through the insulating film, so that electrostatic damage of the contact detector and the peripheral circuits can be appropriately prevented.

The detecting circuit 60 is structured to judge that a specific detecting object OBJ lies across the first detection electrode 10 and the second detection electrode 20 and comes in contact therewith and output the judgment result as a contact detection signal when always monitoring the signal waveform excited to one second detection electrode 20 to detect a predetermined signal waveform.

More specifically, as illustrated in FIG. 2, the detecting circuit 60 is schematically structured to have a resistor R11, which is connected between a node N1 connected to the second detection electrode 20 and high potential power Vdd, a resistor R12, which is connected between the node N1 and the ground potential, resistors R21 and R22, which are connected in series through a note N2 between the high potential power Vdd and the ground potential, and a comparator CMP where the note N1 is connected to a non-inverting input terminal (+) and the node N2 is connected to an inverting input terminal (−).

In the detecting circuit having such the circuit structure, the comparator CMP compares a voltage component (signal voltage $V\alpha$ of the node N1) of the third signal waveform excited to the second detection electrode 20 with reference voltage (threshold voltage) Vref dividedly generated at the node N2, and outputs a contact diction signal when the signal voltage $V\alpha$ is higher than the reference voltage Vref.

<Detecting Method of Contact Detector>

An explanation will be next given of the detecting operation in the detecting object contact state by the contact detector having the aforementioned structure with reference to the drawings.

FIGS. 3A to 3D are conceptual views each illustrating one example of this embodiment. Here, FIG. 3A corresponds to a state in which the detecting object OBJ is not contacted, and FIGS. 3B to 3D correspond to the state that the detecting object OBJ is contacted.

First of all, in the state that the detecting object OBJ is not brought into contact with the first detection electrode 10 and the second detection electrode 20, since the second detection electrode 20 is little affected by the second signal waveform excited to the first detection electrode 10, the signal voltage Vα, which is input to the non-inverting input terminal (+) of the comparator CMP, becomes substantially a signal waveform with fine amplitude using a predetermined voltage Vr dividedly generated by resistance elements R11 and R12 connected to the node N1 (For example, when the respective resistance values of resistance elements R11 and R12 are equal, Vdd/2 is provided) as amplitude central voltage Vc. Here, a division ratio due to the resistance elements R12 and R22 is arbitrarily set such that the reference voltage Vref input to the non-inverting input terminal (−) becomes higher than the signal voltage Vα, (=Vr), and the contact detection signal is not thereby output from the comparator CMP.

While, in the state that the detecting object OBJ lies across the first detection electrode 10 and the second detection electrode 20 and are placed thereon and brought into contact therewith, as illustrated in FIGS. 1 and 2, the first detection electrode 10 and the second detection electrode 20 are electrically connected to each other through the intrinsic resistance component and the capacitance component, which the detecting object OBJ has. Thereby, the third signal waveform, which corresponds to the second signal waveform excited to the first detection electrode 10, is excited to the second detection electrode 20 based on the resistance component and the capacitance component of the detecting object OBJ.

Here, the capacitance component of the detecting object OBJ has an influence upon the voltage amplitude ΔVq of the third signal waveform excited to the second detection electrode 20 and when the detecting object OBJ is not contacted as mentioned above, the capacitance component between the first detection electrode 10 and the second detection electrode 20 is extremely fine, so that voltage amplitude ΔVq is an extremely small value, however, when the detecting object OBJ is contacted and the capacitance value of the detecting object OBJ is added, a capacitance combination is generated between the first detection electrode 10 and the second detection electrode 20 to increase the width of voltage amplitude ΔVq. The width of voltage amplitude ΔVq becomes large as the capacitance of the detecting object OBJ increases. The maximum value (amplitude upper limit voltage) (+Vmax to −Vmin) of voltage amplitude ΔVq of the third signal waveform excited to the second detection electrode 20 is limited to voltage amplitude ΔVa of the second signal waveform excited to the first detection electrode 10, namely, the voltage range (+Vf to −Vf) defined by forward voltage Vf of the diode 50*a* of the anti-parallel diode circuit 50*a* provided in the amplitude limit circuit 50 connected to the first detection electrode 10.

Moreover, when the resistance element 50*b* of the amplitude limiting circuit 50 is connected to the ground potential and the resistance element R12 of the detecting circuit 60 is connected in parallel therewith to reduce the resistance value between the ground potential and the resistance element, the resistance component of the detecting object OBJ acts in a direction that decreases the amplitude central voltage Vc of the signal waveform excited to the second detection electrode 20, and the amplitude central voltage Vc decreases as the resistance value becomes small.

Accordingly, the third signal waveform, which is excited to the second detection electrode 20 and which is input to the non-inverting input terminal (+) of the comparator CMP through the node N1, has a predetermined amplitude central voltage Vc, which is defined by the resistance component of the detecting object OBJ, and a predetermined voltage amplitude ΔVq, which is defined by the capacitance component of the detecting object OBJ.

At this time, the reference voltage Vref, which is input to the inverting input terminal (−) of the comparator CMP in advance, is appropriately set, and the signal waveform having the amplitude central voltage Vc and the voltage amplitude ΔVq is compared with the reference voltage Vref in the relationship of a level of large and small, thereby making it possible to detect a change in the third signal waveform based on the resistance component and capacitance component peculiar to a specific detecting object OBJ (for example, finger FG) and to detect only the state that the specific detecting object OBJ is placed and contacted.

More specifically, when attention is paid to the capacitance component of the detecting object OBJ, in the state that the detecting object OBJ is not brought into contact with the first detection electrode 10 and the second detection electrode 20, the reference voltage Vref, which is dividedly generated by the resistance elements R21 and R22, is preset such that the reference voltage Vref is higher than the maximum value of the third signal waveform excited to the second detection electrode 20. While, the third signal waveform excited to the second detection electrode 20 has the amplitude central voltage Vc, which is dividedly generated by the resistance elements R1 and R12 provided in the detecting circuit 60, and fine voltage amplitude ΔVqa as mentioned above. Thereby, the comparator CMP provided in the detecting circuit 60 judges that the signal waveform input to the non-inverting input terminal (+) is small as compared with the reference voltage Vref input to the inverting input terminal (−) and that no reverse of the relationship of the level of large and small occurs, and the comparator CMP outputs a low-level output signal.

Figure 3B:
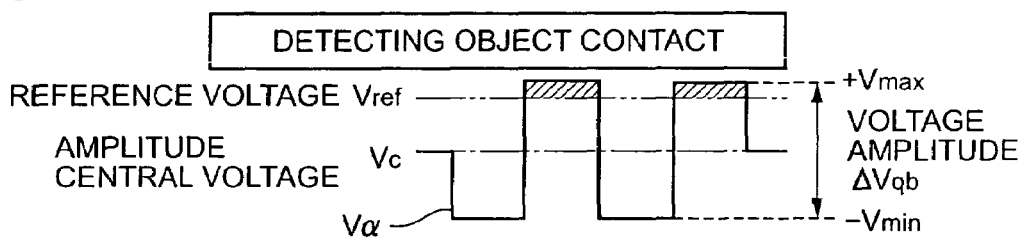

Next, when the detecting object OBJ lies across the first detection electrode 10 and the second detection electrode 20 and are brought into contact therewith, voltage amplitude ΔVqa of the third signal waveform input to the non-inverting input terminal (+) of the comparator CMP is changed to ΔVqb by the capacitance component of the detecting object OBJ as illustrated in FIG. 3B. At this time, the capacitance value added to the first detection electrode 10 is largely increased by the capacitance component of the detecting object OBJ as mentioned above, and the voltage amplitude ΔVqb thereby becomes higher than voltage amplitude ΔVqa. Then, when the maximum value (amplitude upper limit voltage) +Vmax of voltage amplitude ΔVqa is higher than the reference voltage Vref, namely, the third signal waveform and the reference voltage Vref cross each other, a high-level output signal is output by the comparator CMP, the output of the comparator CMP varies, so that the contact of the detecting object OBJ is detected.

Figure 3C:
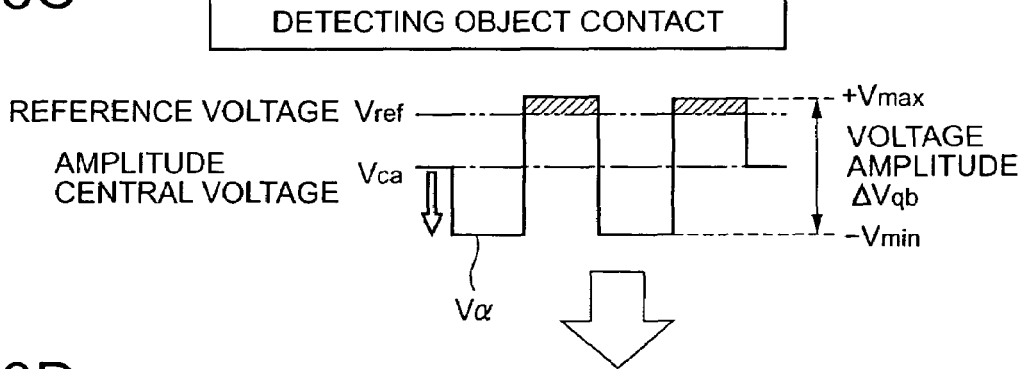
Figure 3D:
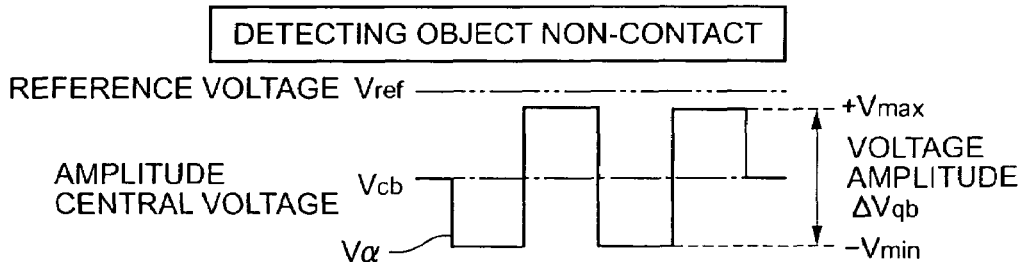

Here, when the resistance value added to the first detection electrode 10 is substantially decreased as illustrated in FIG. 3C and FIG. 3D by the resistance component in spite of the detecting object OBJ having such the capacitance component that increases the voltage amplitude ΔVqa of the third signal waveform, the amplitude central voltage Vc of the signal waveform is decreased (Vca→Vcb), so that the maximum value (amplitude upper limit voltage) +Vmax of voltage amplitude ΔVqb becomes smaller than the reference voltage Vref as illustrated in FIG. 3D, namely, the third signal waveform and the reference voltage Vref do not cross each other, a low-level output signal is output by the comparator CMP. In other words, the contact detection signal is not output.

Namely, even if the detecting object OBJ lies across the first detection electrode 10 and the second detection electrode 20 and are brought into contact therewith, the contact detector can judge that there is no contact of the normal detecting object that is regarded as the object by the contact detector when the detecting object has neither the capacitance component nor the resistance component that are peculiar to the material as the contact detecting object in advance, for example, the resistance value is extremely low. In other words, when one that is not the normal detecting object, for example, a forged finger and the like are used as the detecting object, or a conductive or capacitive foreign substance (dirt and the like) is adhered, this can be removed as one that is different from the normal detecting object to prevent an illegal use and an erroneous operation.

In this way, according to the contact detector and its detecting method of the present embodiment, attention is paid to two elements of the resistance component and the capacitance component of the detecting object, and only when the signal waveform, which varies in accordance with both, exceeds a predetermined threshold, this can be judged as the normal detecting object to be detected, so that at the time of detecting the contact state of the detecting object, the influences of intrinsic state of the detecting object and the external environments can be suppressed, detection and judgment can be performed relatively correctly, and reliability of the contact detector can be improved, unlike the case shown in the prior art.

An explanation will be next given of another embodiment of the contact detecting method according to the present invention with reference to the drawings.

FIGS. 4A to 4D are conceptual views each illustrating the other example of the contact detecting operation of the contact detector according to this embodiment. Here, the structure of the contact detector is equivalent to the aforementioned embodiment, and the explanation is omitted. Moreover, regarding the contact detecting operation, the same reference numerals are added to the method equivalent to the aforementioned embodiment, and the explanation is simplified or omitted.

The above-explained detecting method of the contact detector has showed the case in which the reference voltage Vref is preset to be relatively larger than the signal waveform excited to the second detection electrode 20, however, in the present embodiment, the reference voltage Vref is preset to be relatively smaller than the signal waveform excited to the second detection electrode 20.

Figure 4A:
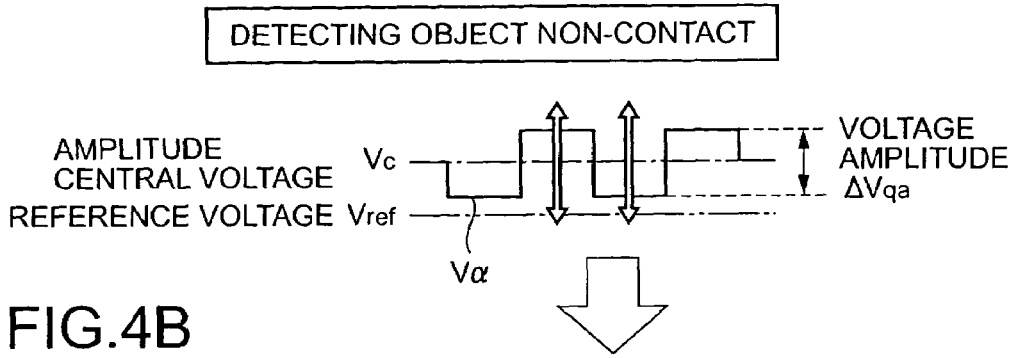
FIGS. 4A to 4D are conceptual views each illustrating the other example of the contact detecting operation of the first embodiment of contact detector.

More specifically, in the state that the detecting object OBJ is not in contact with the first detection electrode 10 and the second detection electrode 20, as illustrated in FIG. 4A, the reference voltage Vref, the amplitude central voltage Vc of the third signal waveform excited to the second detection electrode 20 and the voltage amplitude $\Delta Vqa$ are preset such that the reference voltage Vref is lower than the minimum value (amplitude lower limit voltage) $-Vmin$ of the signal waveform excited to the second electrode 20. In this state, the comparator CMP provided in the detecting circuit 60 judges that the signal waveform input to the non-inverting input terminal (+) is large as compared with the reference voltage Vref input to the inverting input terminal (−) and that no reverse of the relationship of the level of large and small occurs, and the comparator CMP outputs a high-level output signal.

Figure 4B:
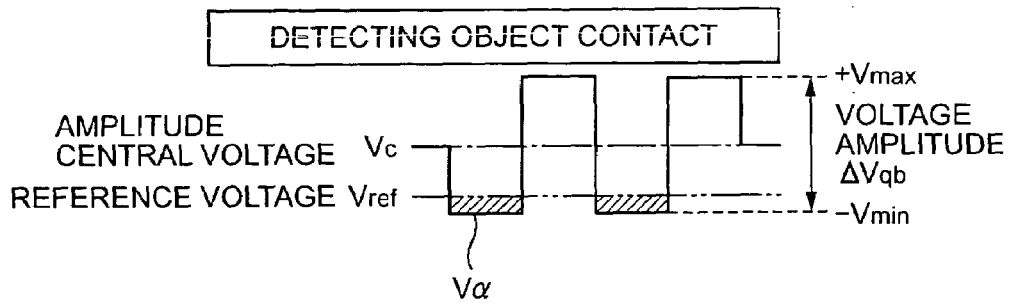

While, when the detecting object OBJ lies across the first detection electrode 10 and the second detection electrode 20 and are brought into contact therewith, voltage amplitude $\Delta Vqa$ of the third signal waveform input to the non-inverting input terminal (+) of the comparator CMP is changed to $\Delta Vqb$ by the capacitance component of the detecting object OBJ as illustrated in FIG. 4B. At this time, the minimum value (amplitude lower limit voltage) $-Vmin$ of the signal waveform increased by the capacitance component of the detecting object OBJ becomes smaller than reference voltage Vref, namely, the third signal waveform and the reference voltage Vref cross each other, a low-level output signal is output by the comparator CMP, the output of the comparator CMP varies, so that the contact of the detecting object OBJ is detected.

Figure 4C:
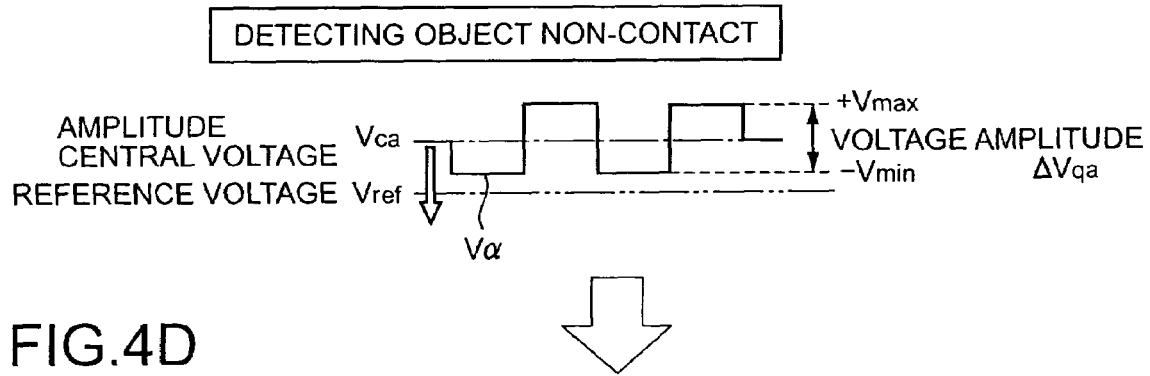
Figure 4D:
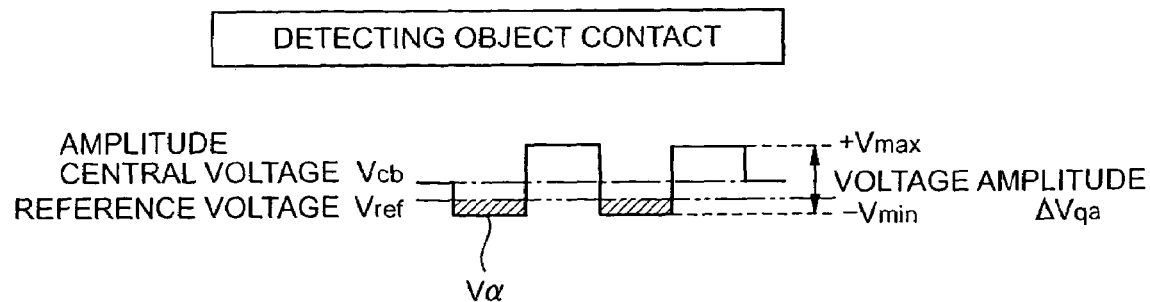

Here, when the resistance value added to the first detection electrode 10 is substantially decreased as illustrated in FIG. 4C and FIG. 4D by the resistance component in spite of the detecting object OBJ having small capacitance peculiar to the detecting object and substantially no such the capacitance component that increases the voltage amplitude $\Delta Vqa$ of the third signal waveform as mentioned above, the amplitude central voltage Vc of the signal waveform is decreased (Vca→Vcb), so that the minimum value (amplitude lower limit voltage) $-Vmin$ of voltage amplitude $\Delta Vqa$ becomes smaller than the reference voltage Vref, namely, the third signal waveform and the reference voltage Vref cross each other, a low-level output signal is output by the comparator CMP. In other words, the output of the comparator CMP varies and the contact detection signal is output.

Namely, when the detecting object OBJ lies across the first detection electrode 10 and the second detection electrode 20 and are brought into contact therewith and the detecting object has the capacitance component and the resistance component (particularly, resistance component in a predetermined range) that are peculiar to the material as the contact detecting object in advance, the contact detector judges that this is the contact of the normal detecting object that is regarded as the object. In other words, even if the capacitance component of the detecting object has the same value as the capacitance component of the material peculiar to the contact detecting object in advance, the signal waveform excited to the second diction electrode does not cross the reference voltage Vref when the resistance component is extremely high or low as compared with the resistance component of the material peculiar to the contact detecting object, so that the output of the comparator CMP does not vary and this is not judged as the contact of the normal detecting object According to such the contact detecting method, the influences of intrinsic state of the detecting object and the external environments can be suppressed and the condition of the contact judgment of the detecting object to be subjected to the contact detection can be strictly set, so that the contact state of the normal detecting object can be correctly detected and judged.

<Second Embodiment of Contact Detector>

An explanation will be next given of the second embodiment of the structure for implementing a contact detecting function according to the present invention.

Figure 6A:
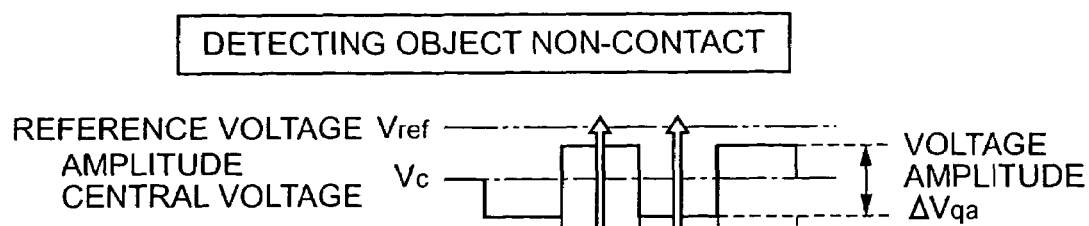
FIGS. 6A to 6C are conceptual views each illustrating one example of a contact detecting operation of the second embodiment of contact detector.
Figure 6B:
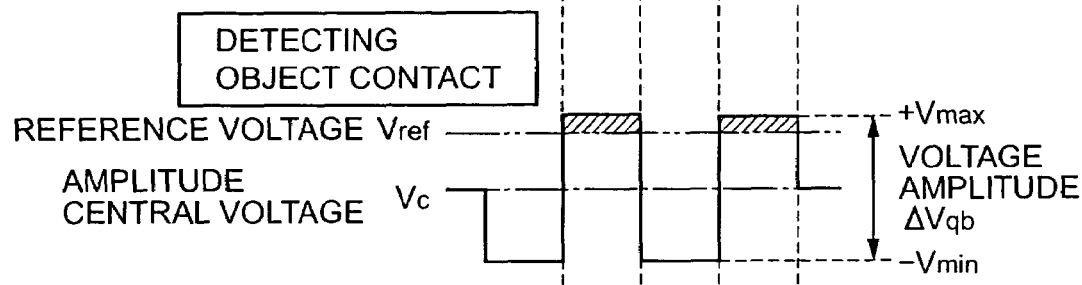
Figure 6C:
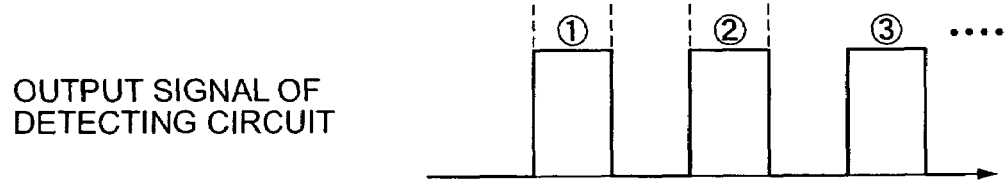

FIG. 5 is a schematic block diagram illustrating the second embodiment of contact detector to implementing the contact detecting function according to the present invention, and FIGS. 6A to 6C are conceptual views each illustrating one example of the contact detecting operation of the contact detector according to the present embodiment. Here, regarding the contact detector and the contact detecting operation, the same reference numerals are added to the same structure and the method as those of the aforementioned first embodiment and the explanation is omitted. Here, FIG. 6A corresponds to a state in which the detecting object OBJ is not contacted, and FIGS. 6B and 6C correspond to the state that the detecting object OBJ is contacted.

As illustrated in FIG. 5, the contact detector of this embodiment has the structure including a contact determining circuit 70 in an outputting section of the detecting circuit 60 provided in the contact detector illustrated in FIG. 1 and FIG. 2.

Here, the contact determining circuit 70 counts an output signal with a specific signal level output from the detecting circuit when the detecting object is brought into contact with the first detection electrode and the second detection electrode, and outputs a contact detection signal when the output signal is output the number of times, which is more than a predetermined threshold value.

More specifically, for example, similar to the case illustrated in FIG. 3A, the reference voltage Vref is preset to be larger than the third signal waveform (amplitude central voltage Vc and voltage amplitude ΔVqa) excited to the second detection electrode 20 such that no contact detection signal is output from the comparator CMP when the detecting object OBJ is not contacted.

Then, when the detecting object OBJ lies across the first detection electrode 10 and the second detection electrode 20 and are brought into contact therewith, the voltage amplitude ΔVqa of the signal waveform and the amplitude central voltage Vc are changed by the capacitance component and resistance component of the detecting object OBJ to detect a state that the relationship of a level of large and small between the third signal waveform and the reference voltage Vref is reversed, namely a state that the signal waveform and the reference voltage Vref cross each other by the comparator CMP provided in the detecting circuit 60 as illustrated in FIG. 6B, so that the contact detection signal is output from the comparator CMP. At this time, the contact determining circuit 70 counts the number of times a contact detection signal is output from the detecting circuit 60 (comparator CMP) for a given period of time and determines that a normal detecting object is contacted when the relevant count value exceeds a predetermined threshold value (for example, 5 times in series).

According to such the contact detector, the influences of intrinsic state of the detecting object and the external environments can be suppressed, and only when the detecting object having specific capacitance component and resistance component is continuously and stably contacted, this is judged as the normal detecting object, when a conductive or capacitive foreign object is contacted between the first detection electrode and the second deletion electrode, the normal detecting object and the foreign object are discriminated satisfactorily to perform exclusion from the object to be subjected to the contact detecting operation, and it is possible to prevent such an erroneous operation that erroneously judges it as a normal contact state as in the case of erroneous temporary contact to output the contact detection signal, so that contact detector having extremely high reliability can be implemented.

<Image Reading Apparatus>

An explanation will be next given of the image reading apparatus to which the contact detector according to the present invention is applied by showing the embodiment.

First, the structure of the sensors applicable to the image reading apparatus according to the present invention will be explained.

As the sensors applicable to the image reading apparatus according to the present invention, a solid state image pickup device such as a CCD (Charge Coupled Device) and the like can be satisfactorily used.

As is well known, CCD is one that has the structure having photosensors such as photodiodes or thin film transistors (TFT) arranged in a matrix form to detect an amount of electron-hole pairs (electric charge) generated in accordance with an amount of light with which the light receiving section of each photosensor is irradiated and to detect luminance of irradiation light.

By the way, in a photosensor system using such CCD, a selective transistor for setting each scanned photosensor to a selective state individually is needed, and this causes a problem that the system as such is enlarged with an increase in the number of detection pixels.

For this reason, as the structure to solve such a problem, there have recently been developed thin film transistors having the so-called double gate structure that provides a photosense function and a selective transistor function to the photosensor as such (hereinafter referred to as "double gate type transistor") and miniaturization in the system and increase in density of pixel have been tried. Accordingly, this double gate type transistor can be also satisfactorily applied to the image reading apparatus of the present invention.

Hereinafter, the following will specifically explain the photosensor (thereinafter referred to as "double gate type photosensor") using the double gate type transistor applicable to the image reading apparatus of the present invention.

<Double Gate Type Photosensor>

Figure 7A:
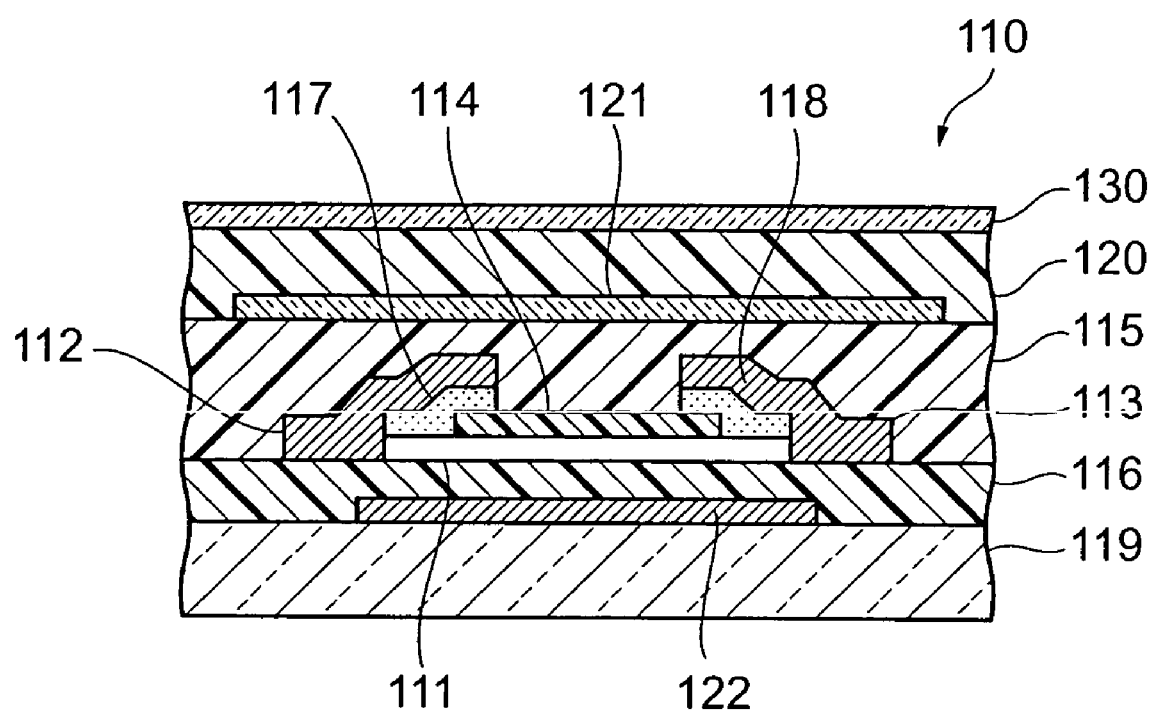
FIGS. 7A and 7B are a cross section structural view illustrating a schematic structure of a double gate type photosensor and an equivalent circuit diagram, respectively.
Figure 7B:
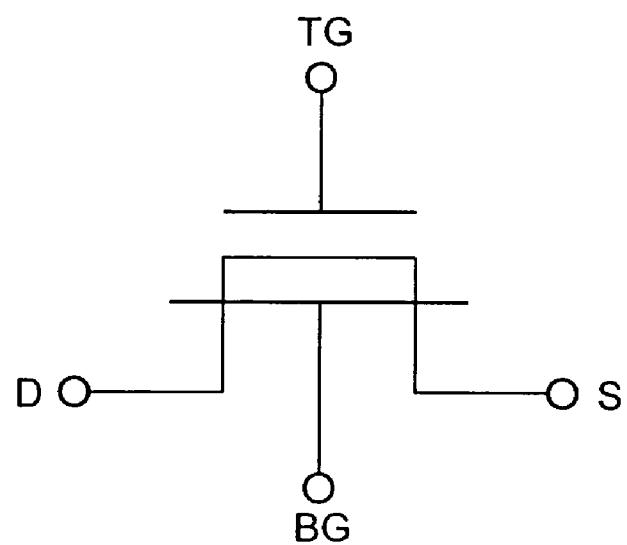

FIGS. 7A and 7B are a cross-section structural view illustrating a schematic structure of a double gate type photosensor, and an equivalent circuit, respectively.

As illustrated in FIG. 7A, a double gate type photosensor 110 comprises: a transparent insulating substrate 119; a bottom gate electrode 122 foamed on the transparent insulating substrate 119; a bottom gate insulating film (insulating layer) 116 covering the bottom gate electrode 122 and formed on the transparent insulating substrate 119; a semiconductor layer (channel layer) 111 formed on the bottom gate insulating film 116 and facing the bottom gate electrode 122; a block insulating film 115 formed on the semiconductor layer 111; impurity layers 117, 118 formed on both ends of the semiconductor layer 111, respectively; a drain electrode 112 formed on the impurity layer 117; a source electrode 113 formed on the impurity layer 118; a top gate insulating film 115 covering the drain and source electrodes 112, 113 and the block insulating film 116 and formed on the bottom gate insulating film (insulting layer) 116; a top gate electrode 121 formed on the top gate insulating film 115 and facing the semiconductor layer 111; a protection insulating (passivation) film (layer: dielectric) 120 covering the top gate electrode 121 and formed on the top gate insulating film 115; and a transparent electrode layer 130 formed on the protection insulating film 120 and facing the semiconductor layer 111.

The transparent insulative substrate 119 is formed of a transparent and insulative member such as a glass substrate and the like. The bottom gate electrode 122 is formed of conductive and opaque material, for example, chromium, chromium alloy, aluminum, aluminum alloy and the like, and formed at the lower portion (lower portion in the drawing) of the semiconductor layer 111. The bottom gate electrode 122 prevents any light from irradiating the semiconductor layer 111 from back (lower) side of this photosensor 110.

The semiconductor layer 111 constitutes a channel layer and is comprised of semiconductor such as amorphous silicon where an electron-hole pair is generated when exciting light (visible light here) is made incident.

The drain and source electrodes 112 and 113 are formed of material which is conductive and opaque to visible light, for example, chromium, chromium alloy, aluminum, aluminum alloy and the like.

The impurity layers 117 and 118 are formed between the semiconductor layer 111 and electrodes 112, 113 to provide ohmic contact between the semiconductor layer 111 and the electrodes 112, 113, and formed of, for example, n+ silicon.

The top gate electrode 121 and the transparent electrode layer 130 are formed of conductive and transparent material such as ITO.

The bottom and top gate insulating films 116 and 115 insulate the semiconductor layer 111 from the bottom and top gate electrodes 122 and 121, respectively and formed of transparent and insulating material such as silicon nitride, silicon oxide and the like. The passivation film 120 is for protecting this photosensor 110 from atmosphere and formed of passive insulating material such as silicon nitride, silicon oxide and the like.

Moreover, such the double gate type photosensor 110 is generally expressed by an equivalent circuit as illustrated in FIG. 7B. Here, TG is a top gate terminal electrically connected to the top gate electrode 121, BG is a bottom gate terminal electrically connected to the bottom gate electrode 122, S is a source terminal electrically connected to the source electrode 113, and D is a drain terminal electrically connected to the drain electrode 112.

An explanation will be next given of the drive controlling method of the aforementioned double gate type photosensor with reference to the drawings.

Figure 8:
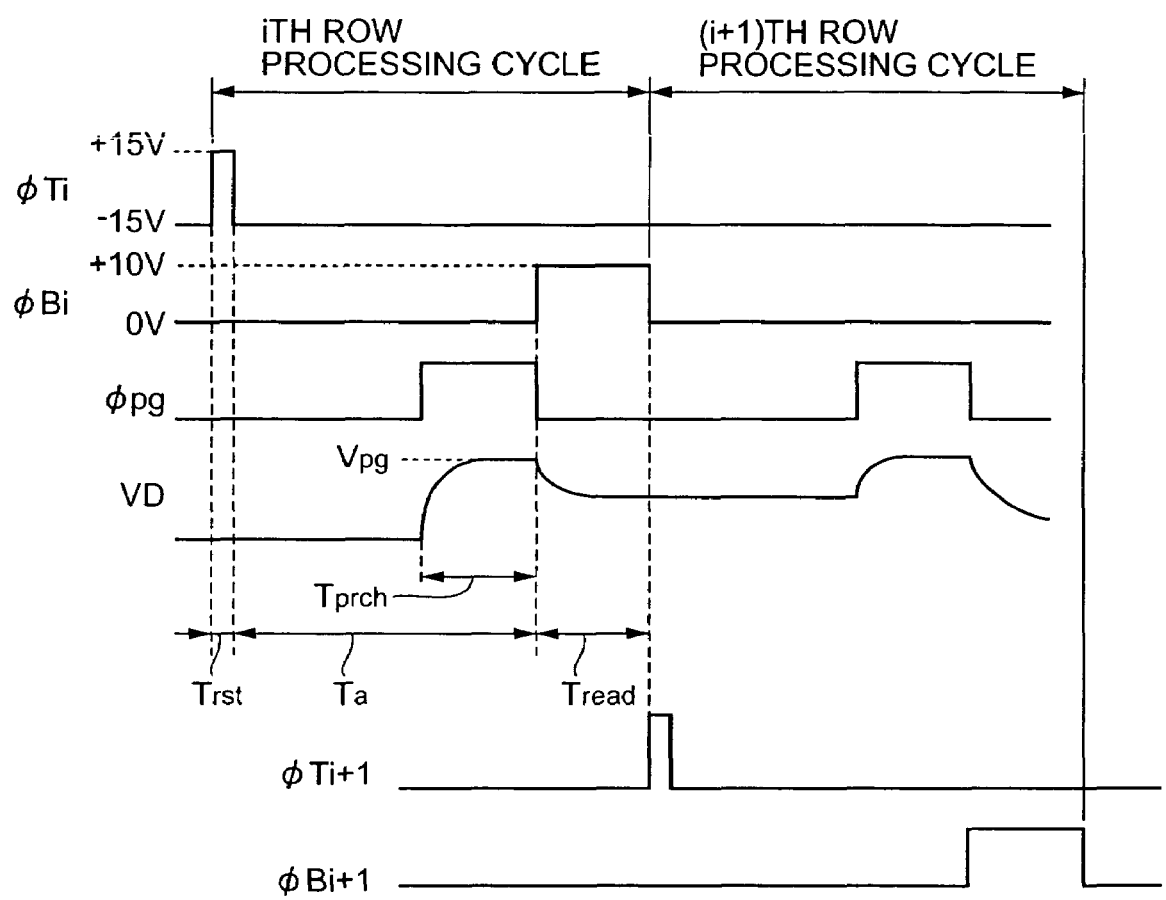
FIG. 8 is a timing chart illustrating one example a basic drive control method of the double gate type photosensor.

FIG. 8 is a timing chart illustrating one example of the basic drive controlling method of the double gate type photosensor. Here, an explanation will be given with reference to the structure of the aforementioned double gate type photosensor (FIG. 7) suitably.

As illustrated in FIG. 8, first of all regarding a reset operation (initializing operation), pulse voltage (hereinafter referred to as "reset pulse"; for example, high level of Vtg=+15V), φTi is applied to the top gate terminal TG of the double gate type photosensor 110 to discharge carriers (here, holes) stored in the semiconductor layer 111 and a portion close to a boundary surface between the semiconductor layer 111 and the block insulating film 114 (reset time Trst).

Next, regarding a charge storing operation (light storing operation), bias voltage φTi with a low level (for example, Vtg=−15V) is applied to the top gate terminal TG, and the reset operation is thereby ended to start a charge storing time Ta by the carrier storing operation. For the charge storing time Ta, an electron-hole pair is generated in an incident effective area of the semiconductor layer 111, that is, the semiconductor layer 111 and the portion close to a boundary surface between the semiconductor layer 111 and the block insulating film 114 in accordance with the amount of light incident from the top gate electrode 121, namely, a hole is stored on the periphery of a channel area.

Then, regarding a precharging operation, a predetermined voltage (precharge voltage) Vpg is applied to the drain terminal D in parallel with the charge storing time Ta, based on a precharge signal φpg to hold the charge in the drain electrode 112 (precharge time Tprch).

Next, regarding a reading operation, a high-level (for example, Vbg=+10V) bias voltage φBi (read selection signal; hereinafter referred to as "read pulse") is applied to the bottom gate terminal BG (selection state) after passing precharge time Tprch, and the double gate type photosensor 110 is thereby turned on (read time Tread).

Here, for the read time Tread, since the carriers (holes) stored in the channel area work in a direction that relaxes Vtg (−15V) applied to the top gate terminal TG with an opposite polarity, an n-channel is formed by Vbg (+15V) of the bottom gate terminal, and there is shown a tendency that voltage (drain voltage) of the drain terminal D gradually decreases from the precharge voltage Vpg with the passage of time according to the drain current.

In other words, when the light storing state for the charge storing time Ta is a light state, the carriers (holes) are captured in the channel area according to the amount of incident light, thereby acting to cancel a negative bias of the top gate terminal TG, so that the double gate type photosensor 110 is turned ON by a positive bias of the bottom gate terminal BG by the amount corresponding to the cancelled bias. Then, the drain voltage VD decreases according to the ON resistance corresponding to the amount of incident light While, when the light storing state is a dark state and no carrier (hole) is stored in the channel area, the negative bias is applied to the top gate terminal TG, thereby canceling the positive bias of the bottom gate terminal BG, so that the double gate type photosensor 110 is turned OFF and the drain voltage VD is held as it is.

Accordingly, the tendency in the change of the drain voltage VD is deeply related to the amount of light that is received during the time between the instant when the resetting operation due to application of reset pulse φTi to the top gate terminal TG is ended and the instant when the read pulse φBi is applied to the bottom gate terminal BG (charge storing time Ta) and there is shown a tendency to decrease sharply in the case that the number of stored carriers is large (light state), and there is shown a tendency to decrease gently in the case that the number of stored carriers is small (dark state). For this reason, the read time Tread is stared to detect the drain voltage VD (=Vrd) after a predetermined passage of time or detect time reaching a predetermined threshold voltage with reference to the voltage, thereby performing conversion of the amount of light that is incident onto the double gate type photo sensor 110.

The same processing procedure is repeated to the double gate type photosensor 110 of i+1th row in a state that the aforementioned series of image reading operations is used as one cycle, making it possible to operate the double gate type photosensors as a two-dimensional system.

<Photosensor System>

An explanation will be next given of the photosensor system including the photosensor array having the aforementioned double gate type photosensors arranged in a predetermined form with reference to the drawings. Though the following will explain the photosensor array having the plurality of double gate type photosensors arranged two-dimensionally, it is needless to say that the plurality of double gate photosensors may be one-dimensionally arranged in an X direction to form a line sensor array and that the line sensor array may be moved in a Y direction perpendicular to the X direction to scan a two-dimensional area.

Figure 9:
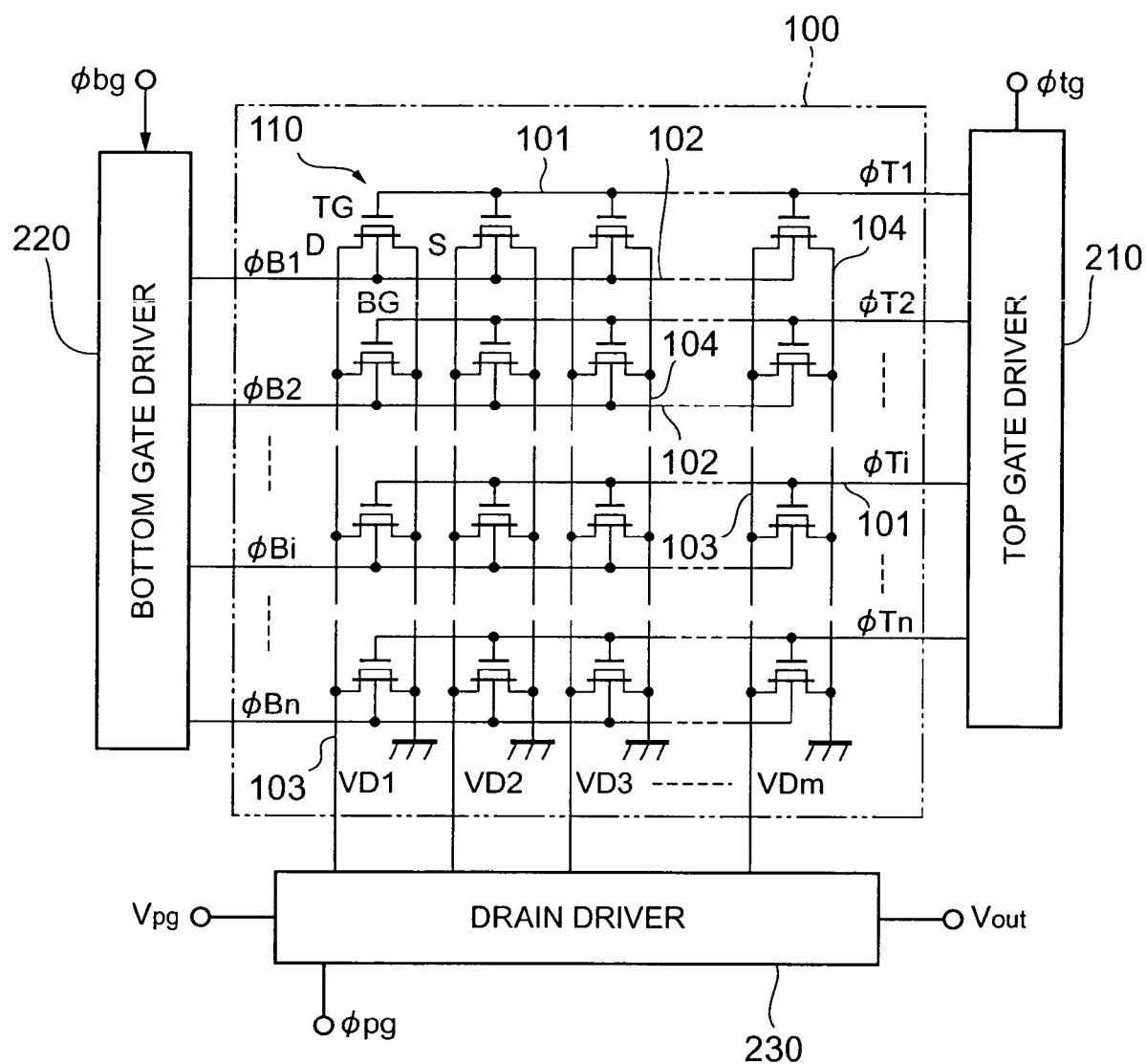
FIG. 9 is a schematic structural view of a photosensor system including a photosensor array having double gate type photosensors arranged two-dimensionally.

FIG. 9 is a schematic structural view of the photosensor system including the photosensor array having the double gate type photosensors arranged two-dimensionally.

As illustrated in FIG. 9, the photosensor system is structured to broadly have a photosensor array 100 having numerous double gate type photosensors 110 arranged in a matrix form of, for example, n row×m column (n and m are arbitrary natural numbers), a top gate line 101 and a bottom gate line 102, which connect the top gate terminal TG (top gate electrode 121) and the bottom gate terminal BG (bottom gate electrode 122) in a row direction to extend, respectively, a drain line (data line) 103, which connects a drain terminal D (drain electrode 12) of each double gate type photosensor 110 in a column direction, a source line (common line) 104, which connects a source terminal S (source electrode 13) in a column direction and which is connected to the ground potential, a top gate driver 210 connected to the top gate line 101, a bottom gate driver 220 connected to the bottom gate line 102, and a drain driver 230, which is connected to the drain line 103 and which includes a column switch, a precharge switch, an output amplifier, and the like (not illustrated).

Here, the top gate line 101 is formed by the transparent electrode layer such as ITO and the like integrally with the top gate electrode 121 as illustrated in FIG. 7, and the bottom gate line 102, the drain line 103, and the source line 104 are integrally formed by the materials opaque to exciting light, which are respectively similar to those of the bottom gate electrode 122, the drain electrode 112, and the source electrode 113. Moreover, constant voltage Vss, which is set according to precharge voltage Vpg to be described later is applied to the source line 104, but this may be ground potential (GND).

Additionally, in FIG. 9, φtg indicates a drive control signal for generating signals φT1, φT2, ... φTi, ... φTn to be selectively output as either a reset voltage or a light carrier storing voltage, φbg indicates a drive control signal for generating signals φB1, φB2, ... φBi, ... φBn to be selectively output as either a reset voltage or a light carrier storing voltage, and φpg is a precharge signal that controls timing at which precharge voltage Vpg is applied. Moreover, the structure of the drain driver 230 applicable to the present embodiment will be specifically described.

In such the structure, the signal φTi (i is an arbitrary natural number; i=1, 2, ... n) is applied to the top gate terminal TG from the top gate driver 210 through the top gate line 101, thereby a photosense function is implemented; and the signal φBi is applied to the bottom gate terminal BG from the bottom gate driver 220 through the bottom gate line 102 and a detection signal is captured to the drain driver 230 through the drain line 103 to output it as output voltage Vout of serial data or parallel data, thereby a selection read function is implemented.

Figure 10:
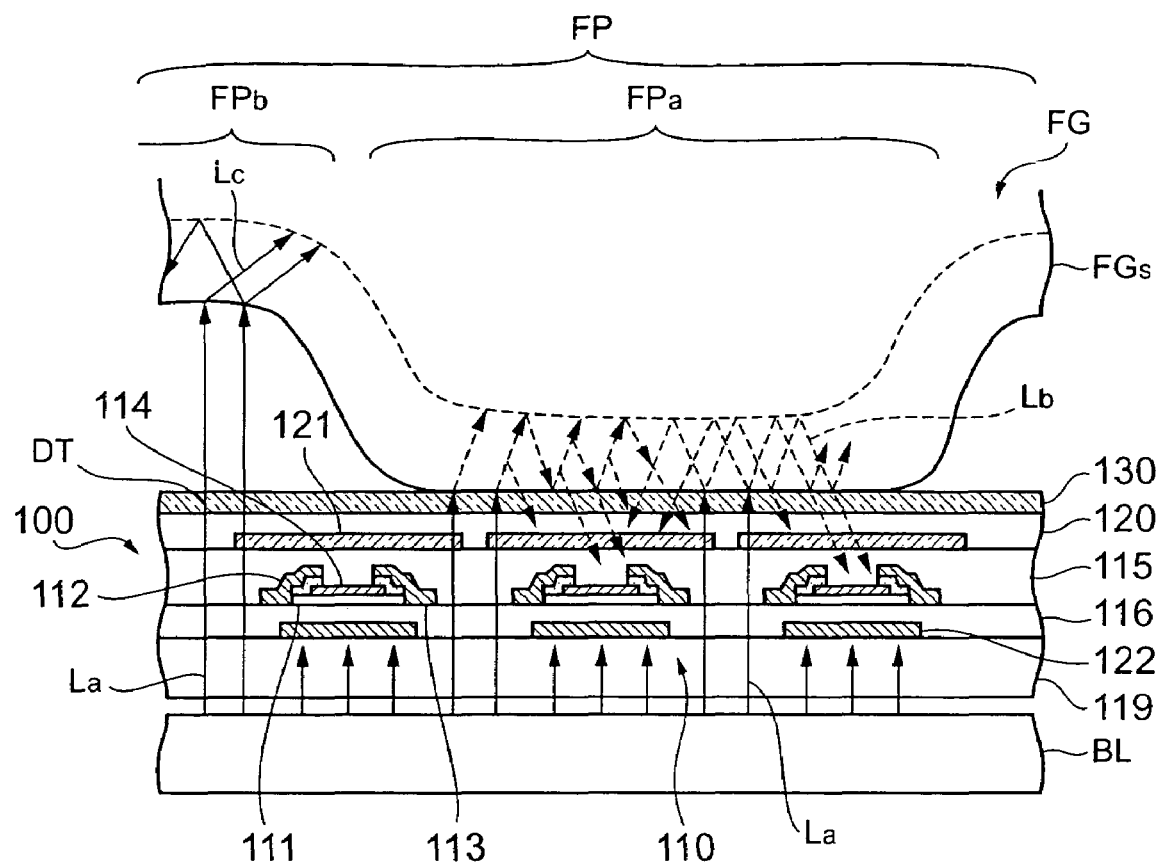
FIG. 10 is a general cross-sectional view at a fingerprint reading time in a fingerprint reading apparatus by an image reading apparatus to which the photosensor system is applied.

FIG. 10 is a general cross-sectional view of the structure at the time of reading an image pattern of a fingerprint in a fingerprint reading apparatus by an image reading apparatus it which the aforementioned photo sensor system is applied. Additionally, here, a part of hatching indicating the cross section of the photosensor system is omitted for reasons of the explanation and illustration.

As illustrated in FIG. 10, in the image reading apparatus that reads the image pattern of the fingerprint and the like, light irradiation is made incident from a backlight (surface light source) BL provided on a lower side of the insulating substrate 119 such as a glass substrate on which the double type photosensors 110 are formed, and this light irradiation is applied to the finger (detecting object) FG placed on the fingerprint detecting surface (detecting surface) DT on the transparent electrode layer 130 through the transparent insulating substrate 119 and insulating films 115, 116, 120 excepting the forming area of the double type photosensor 110 (specifically, bottom gate electrode 122, drain electrode 112, source electrode 113).

Then, at the time of detecting the fingerprint by the fingerprint reading apparatus, a semi-transparent layer of a skin surface layer FGs of the finger FG comes in contact with the transparent electrode layer 130 formed on the upper layer of the photosensor array 100, so that an air layer having a low refractive index is eliminated from the boundary surface between the transparent electrode layer 130 and the skin surface layer FGs. Here, since the thickness of the skin surface layer FGs is larger than 650 mm, light La incident onto the interior of a convex portion FPa of the fingerprint FP is propagated as being scattered and reflected in the skin surface layer FGs. A part of the propagated light Lb as exciting light is made incident onto the semiconductor layer 111 of the double type photosensors 110 through the transparent electrode layer 130, the transparent insulating films 120, 115, 114, and the top gate electrode 121. By storing carries (holes), which are generated when light is thus incident onto the semiconductor layer 111 of the double type photosensors 110 arranged at the position corresponding to the convex portion FPa of the fingerprint FP, the image pattern of the finger FG can be read as light and dark information according to the aforementioned series of driving control method.

Further, on a concave portion FGb of the fingerprint FG, irradiated light La passes through the boundary surface between the detecting surface DT of the upper surface of the transparent electrode layer 130 and the air layer, reaches the previous finger FG of the air layer, and scatters in the skin surface layer FGs, however, the skin surface layer FGs has higher refractive index than air, so that light Lc in the skin surface layer FGs made incident onto the boundary surface at a certain angle is easily impervious to passing through the air layer and incidence to the semiconductor layer 111 of the double type photosensors 110 arranged at the position corresponding to the convex portion FPa is controlled.

In this way, by using transparent conductive material such as ITO as the transparent electrode layer 130, light irradiated, scattered, and reflected on the finger FG placed on the transparent electrode layer 130 is made incident onto the semiconductor layer 111 of each double gate type photosensor 110, so that reading sensitivity characteristic at the reading operation of the finger (detecting object) FG does not deteriorate and the image pattern (fingerprint) of the detecting object can be read satisfactorily.

An explanation will be next given of the specific structure when the contact detector of each embodiment is applied to the fingerprint reading apparatus of the aforementioned image reading apparatus. Additionally, in the embodiment shown in below, a case in which the aforementioned double gate type photosensor is used as a sensor will be explained.

Figure 11A:
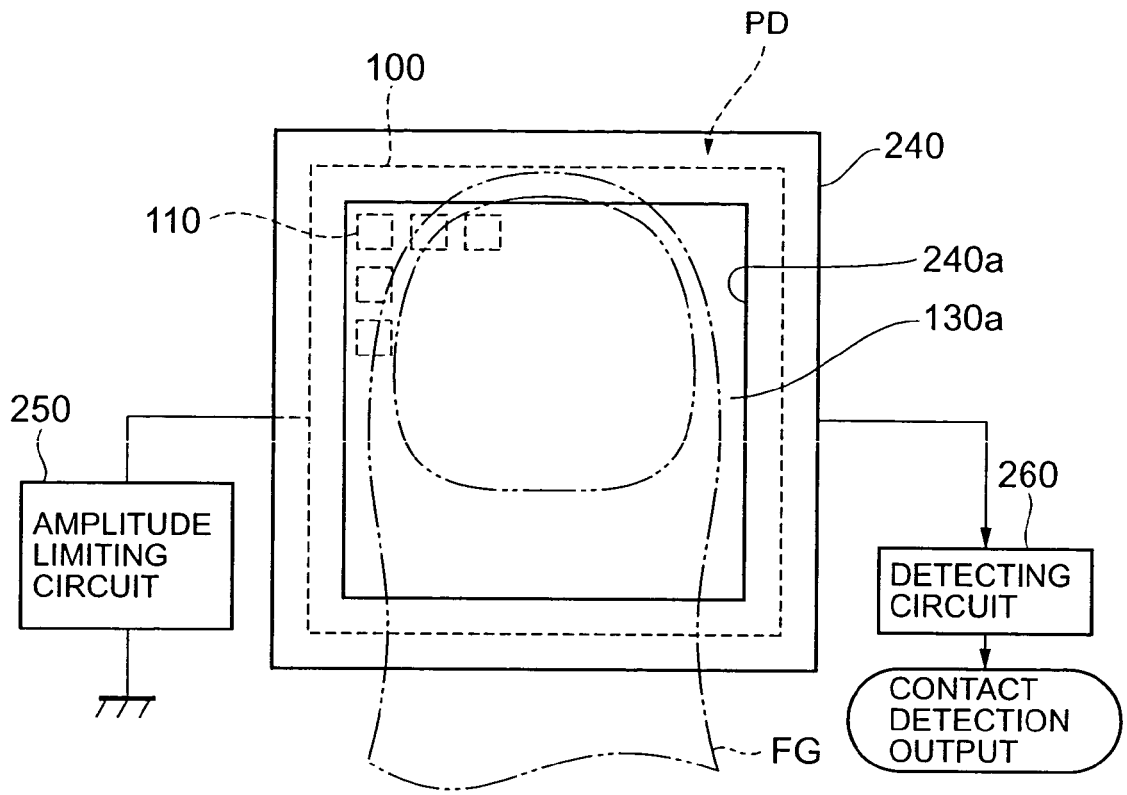
FIGS. 11A and 11B are schematic structural views illustrating one embodiment in the case where contact detector of each embodiment is applied to the fingerprint reading apparatus by the image reading apparatus.
Figure 11B:
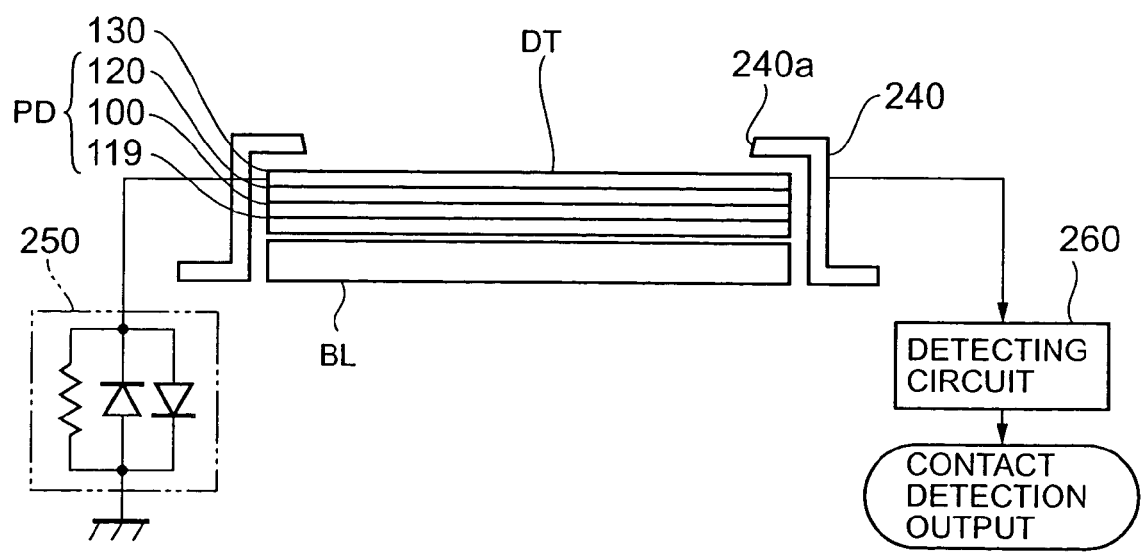
Figure 12A:
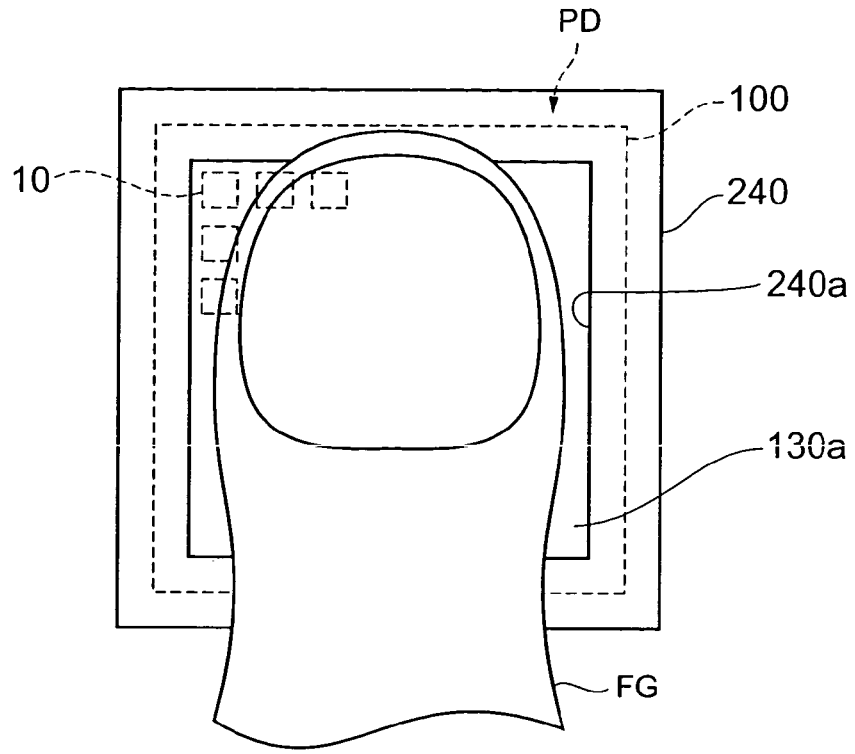
FIGS. 12A and 12B are schematic views each illustrating the state that the finger is placed on the fingerprint reading apparatus according to FIGS. 11A and 11B.
Figure 12B:
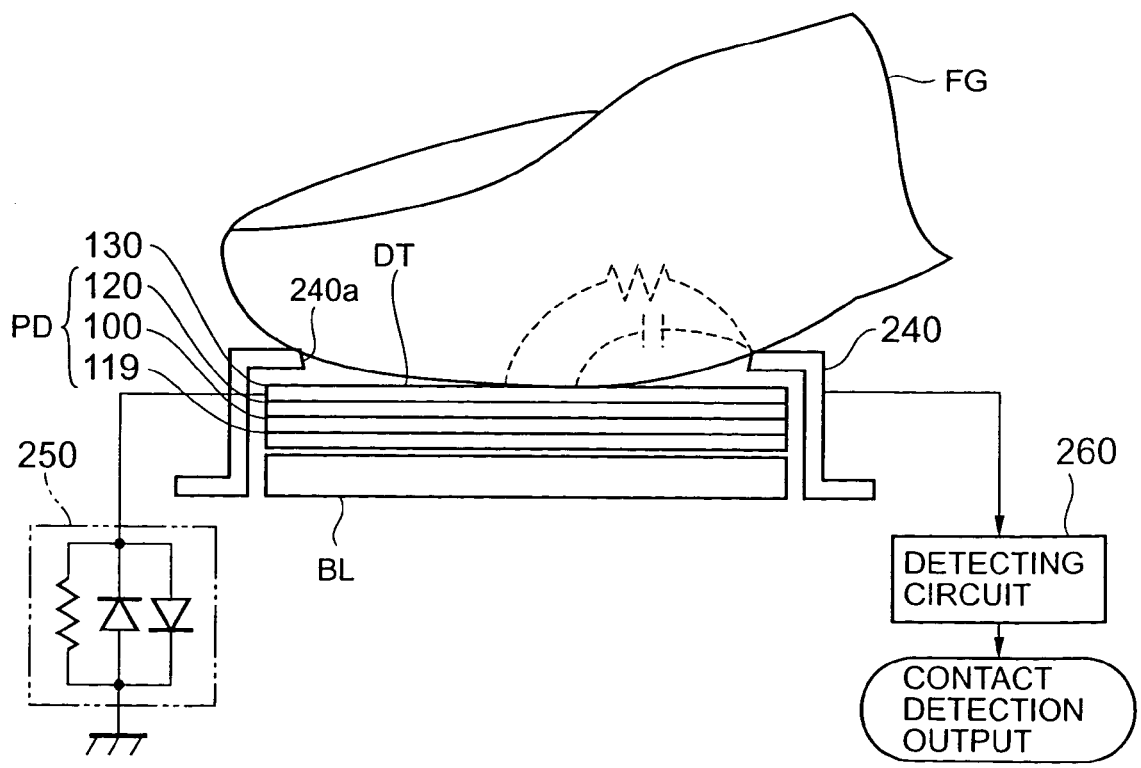

FIGS. 11A and 11B are schematic structural views illustrating one embodiment in the case where contact detector of each embodiment is applied to the fingerprint reading apparatus by the image reading apparatus, and FIGS. 12A and 12B are schematic views each illustrating the state that the finger is placed on the fingerprint reading apparatus according to FIGS. 11A and 11B. Additionally, here, an explanation will be given with reference to the structures of the aforementioned photosensor and the photosensor system (FIG. 7 and FIG. 9) suitably. Moreover, regarding the structure equivalent to the structure shown in FIG. 7 and FIG. 9, the same reference numerals are added thereto, and the embodiment and the explanation is simplified or omitted.

As illustrated in FIGS. 11A and 11B, the fingerprint reading apparatus according to the present embodiment is structured to have a sensor device PD, which includes the photosensor array 100 having double gate type photosensors 110 with the aforementioned structure arranged on one surface side of the insulating substrate 119 in a matrix form and the protection insulting film 120 formed on the entirety of the array area where the double gate type photosensors 110 arranged (the top gate insulting film 115 of the photosensor 110 and the protection insulting film 120 are corresponding to the aforementioned interlayer insulating film), a transparent electrode layer (transparent conductive film; corresponding to the aforementioned first detection electrode) 130 formed on the protection insulating film 120, a surface light source BL, which is arranged on the other surface side of the sensor device PD and which provides uniform light irradiation to the detecting object (finger FG) brought into contact with the upper surface (detecting surface DT) of the transparent electrode layer 130, a conductive case member (conductive member; corresponding to the aforementioned second detection electrode) 240, which is provided to be electrically insulated from the sensor device PD and the transparent electrode layer 130 and which is provided to surround around the sensor device PD and the transparent electrode layer 130, an amplitude limiting circuit (amplitude limiting means) 250 that limits voltage amplitude of the signal waveform (corresponding to the aforementioned second signal waveform) excited to the transparent electrode layer 130 as shown in the aforementioned embodiment, and a detecting circuit (contact detector) 260 that detects a change in the signal waveform (corresponding to the aforementioned third signal waveform) excited to the case member 240 to detect the state that the detecting object (finger FG) come into contact with both the transparent electrode layer 130 and the case member 240 in common.

Here, the case member 240 is formed to be spatially alienated from the transparent electrode layer 130 with a predetermined space (namely, through insulating material such as air) to be electrically insulated therefrom. Moreover, the case member 240 is structured to surround around the sensor device PD and the transparent electrode 130 and have an opening portion 240a with a predetermined shape from which the detecting surface DT on the transparent electrode layer 130 is exposed. The case member 240 is formed of dielectric having a single layer or a plurality of layers selected from material with a low resistivity, for example, chromium, aluminum, tungsten, and the like as compared with transparent conductive material such as ITO that forms the transparent electrode layer 130. This makes it possible to implement sheet resistance having a small plate thickness and a sufficient film thickness and increase a signal to noise ration (S/N) sufficiently.

More specifically, as illustrated in FIGS. 12A and 12B, the opening portion 240a of the case member 240 is structured to have a shape in which the finger FG comes into contact with the case member 240 close to the end portion of the opening portion 240a simultaneously in a state that the finger FG is placed on the detecting surface DT on the transparent electrode layer 130. Namely, there is provided a shape suitable for which the finger FG comes into contact with both the transparent electrode layer 130 and the case member 240.

In addition, the case member 240 may have not only a function as a structure for detecting the contact state of the finger FG with the detecting surface DT but also a function as a shield case for protecting the sensor PD from an electrical disturbance element, physical shock and the like, or a function as a guide member for inducing or guiding the finger as the detecting object to the detecting surface DT on the transparent electrode layer 130 satisfactorily.

When the detecting circuit 260 always monitors a change in the signal waveform (third signal waveform) excited to the case member 240 and detects a predetermined change in the signal waveform based on the capacitance component and the resistance component peculiar to the finger FG at the time when the finger FG lies across both the transparent electrode layer 130 and the case member 240 and are brought into contact therewith, the detecting circuit 260 determines that the finger FG is placed on the fingerprint detecting surface 30a on the transparent electrode layer 130 and outputs the determination result as a contact detection signal to, for example, a drive controller (drive controlling circuit) that performs operation control of the fingerprint reading apparatus, thereby controlling the start timing of the fingerprint reading operation.

More specifically, when comparison among reference voltage Vref, which is preset based on the capacitance component of the finger FG as the detecting object and the resistance component, voltage amplitude of the signal waveform (third signal waveform) excited to the case member 240, and amplitude central voltage in the relationship of the level of large and small is performed as shown in the contact detector (FIG. 2) and the relationship in the large and small with reference voltage Vref is changed (reversed), the detecting circuit 260 outputs the contact detection signal (FIGS. 3A to 3D, FIGS. 4A to 4D, FIGS. 6A to 6C).

Next, an explanation will be specifically given of the drain driver applicable to the fingerprint reading apparatus (FIG. 9) according to the present invention with reference to the drawings.

Figure 13A:
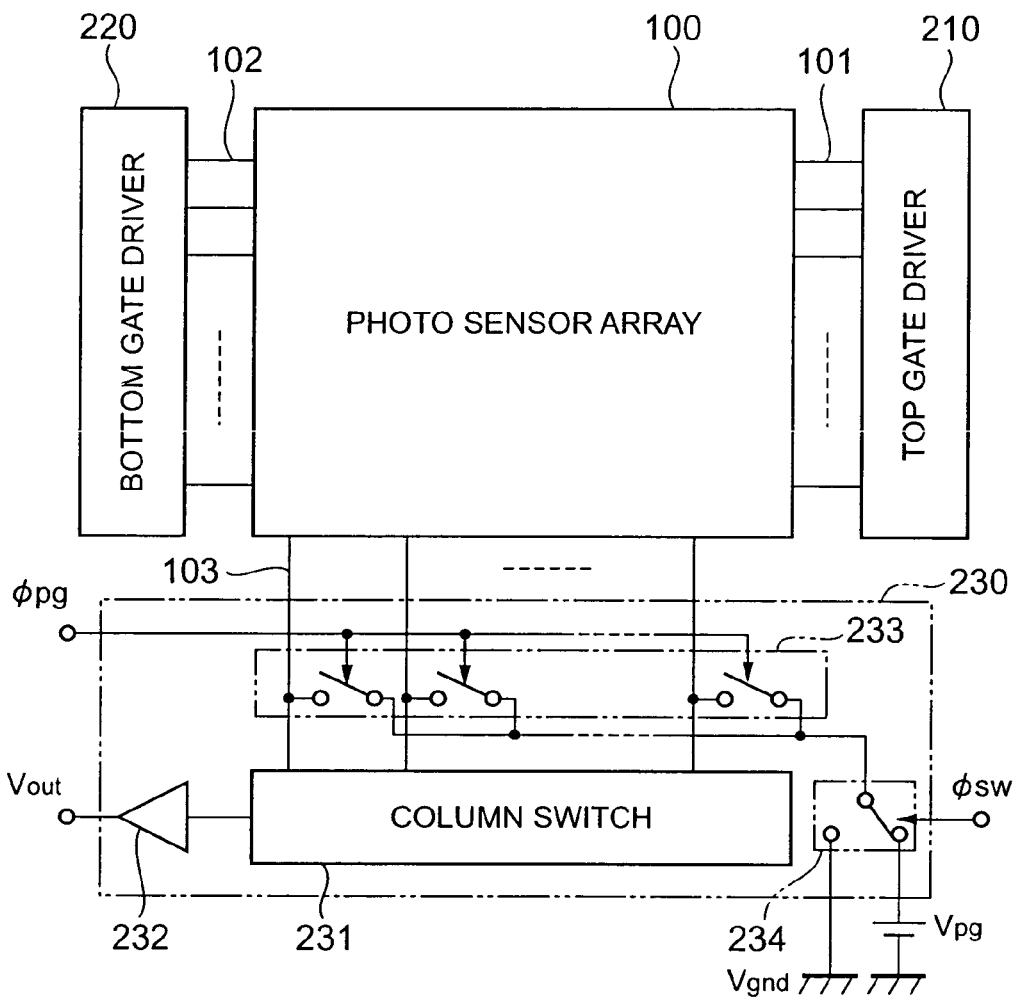
FIG. 13A is a schematic structural view illustrating one structural example of a drain driver, which is applicable to the fingerprint device to which contact detector of each embodiment is applied.
Figure 13B:
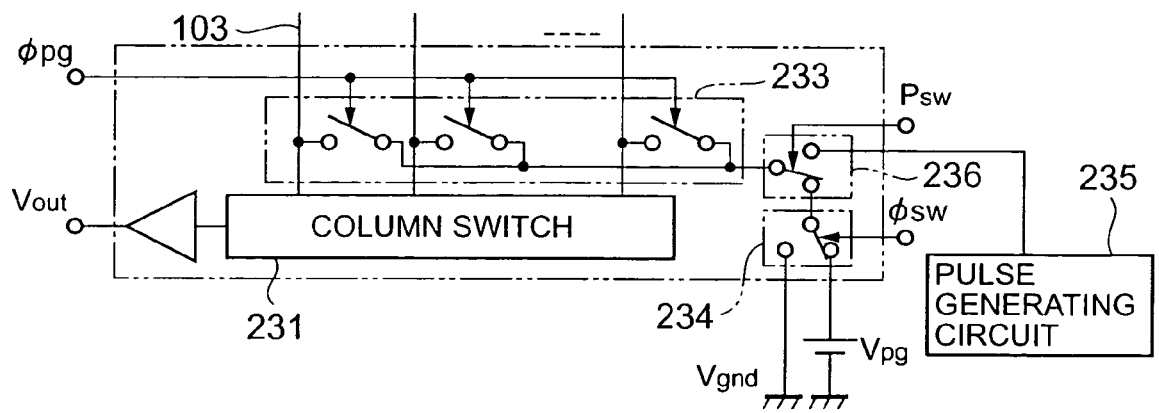
FIG. 13B is a schematic structural view illustrating the other structural example of a drain driver, which is applicable to the fingerprint device to which contact detector of each embodiment is applied.

FIG. 13A is a schematic structural view illustrating one structural example of the drain driver, which is applicable to the fingerprint device to which contact detector of each embodiment is applied, and FIG. 13B is a schematic structural view illustrating the other structural example of the drain driver. Additionally, here, an explanation will be given with reference to the structure of the aforementioned photosensor system (FIG. 9) suitably. Moreover, regarding the structure equivalent to the structure shown FIG. 9, the same reference numerals are added thereto, and the embodiment and the explanation is simplified or omitted.

As shown in the aforementioned embodiment (for example, FIG. 1), the contact detector according to the present invention has the structure including the counter electrode for exciting the predetermined waveform (second waveform) to the first detection electrode with which the detecting object is brought into contact and the pulse generating circuit. In the case where the contact detector having such the structure is applied to the image reading apparatus (fingerprint reading apparatus) having the double gate photosensors, the drain line 103, which connects the drain electrode 112 and the drain electrode to each other, can be applied as the counter electrode and the drain driver 230 can be applied as the pulse generating circuit (signal voltage applying circuit).

As illustrated in FIG. 13A, the fingerprint reading apparatus according to this embodiment has the structure provided with the drain driver 230 including a column switch 231 connected to the drain line 103, an output amplifier 232 connected to an output terminal of the column switch 231, a switch group 233 each having one end side is connected to each drain line 103, a single switch 234 connected to the other ends of the switch group 233, and a plurality of power voltages Vpg and Vgnd connected to the switch 234 in parallel with each other in addition to the photosensor array 100 having substantially the same structure shown in FIG. 7, the top gate driver 210 and the bottom gate driver 220.

Here, the column switch 231 and the output amplifier 232, which form the drain driver 230, reads the amount of electric charge (carriers), which are stored in each double gate type photosensor corresponding to the image pattern of the detecting object, in a batch for each row as a change in the drain voltage through the drain line 103 based on the operation control procedure of the aforementioned double gate photosensor 110, and amplifies a predetermined signal voltage to outputs them as serial data or parallel data to the peripheral circuit (for example, image processing apparatus such as a fingerprint recognition apparatus and the like) from the output terminal Vout.

Moreover, regarding the switch group 233, their one ends are individually connected to the respective drain lines that form the photosensor array 100 and the other ends are respectively connected to the single switch 234, and the ON/OFF state is controlled based on precharge signal φpg supplied from the drive controller. While, the switch 234 is connected to the plurality of power voltages Vpg and Vgnd, and is controlled such that either one of power voltages Vpg and Vgnd is selectively connected based on a switch control signal φsw supplied from the drive controller.

Concerning the drain driver 230 having such the structure, first of all, if an explanation is given of the case in which the aforementioned image reading operation is executed, in the precharge operation that is executed within the charge storing time of the double gate type photosensor, the switch 234 is changed to the precharge Vpg by the switch control signal φsw, thereafter, the switch group 233 is turned on all at once at a predetermined timing by the precharge signal φpg, thereby the precharge voltage Vpg is applied to each double gate photosensor through the switch group 233 and the drain line 103.

In the reading operation of the double gate type photosensor, the switch group 233 is turned off all at once by the precharge signal φpg, thereby capturing the drain voltage corresponding to the amount of electric charge (carriers), which are stored in each double gate type photosensor based on the image pattern of the detecting object (finger FG) for the charge storing time, to the column switch 231 in a batch through each drain line 103, to output as serial data or parallel data from the output terminal through the output amplifier 232.

While, in the contact detecting operation executed prior to the aforementioned image reading operation, the switch group 233 is turned on all at once by the precharge signal φpg and the switch 234 is repeatedly switch-controlled at a predetermined timing by the change control signal φsw, thereby the switch 234 is periodically and selectively connected to the precharge voltage Vpg and the ground potential Vgnd, so that a pulse signal, which has voltage amplitude whose low limit amplitude voltage is defined to 0V and upper limit amplitude voltage is defined to precharge voltage Vpg (for example, 3.3V), is applied to the drain electrodes of all double gate type photosensors that form the photosensor array 100 through the respective drain lines 103.

Moreover, in the embodiment illustrated in FIG. 13A, as the method of applying the pulse signal to the respective drain lines 103, there has been shown the structure in which the precharge voltage Vpg and the ground potential Vgnd are periodically and selectively connected by the switch 234 switch-controlled by the change control signal (sw to generate the pulse signal having voltage amplitude of 0V to Vpg to be supplied. However, the present invention is not limited to this, and as illustrated in FIG. 13B, for example, it is possible to provide a pulse generating circuit 235, which generates the pulse signal having the predetermined voltage amplitude individually, and a switch 236, which is provided between the other end side of the switch group 233 and the switch 234 and which switches connection between the switch group 233 and the switch 234 or the pulse generating circuit 235, and then the switch 236 is switch-controlled by a switch control signal Psw at the time of the contact detecting operation to connect the pulse generating circuit 235 to the other end side of the switch group 233, so that the pulse signal output from the pulse generating circuit 235 may be supplied to each drain line 103.

A specific explanation will be next given of the contact detecting operation in the fingerprint reading apparatus according to the present embodiment with reference to the drawings.

Figure 14:
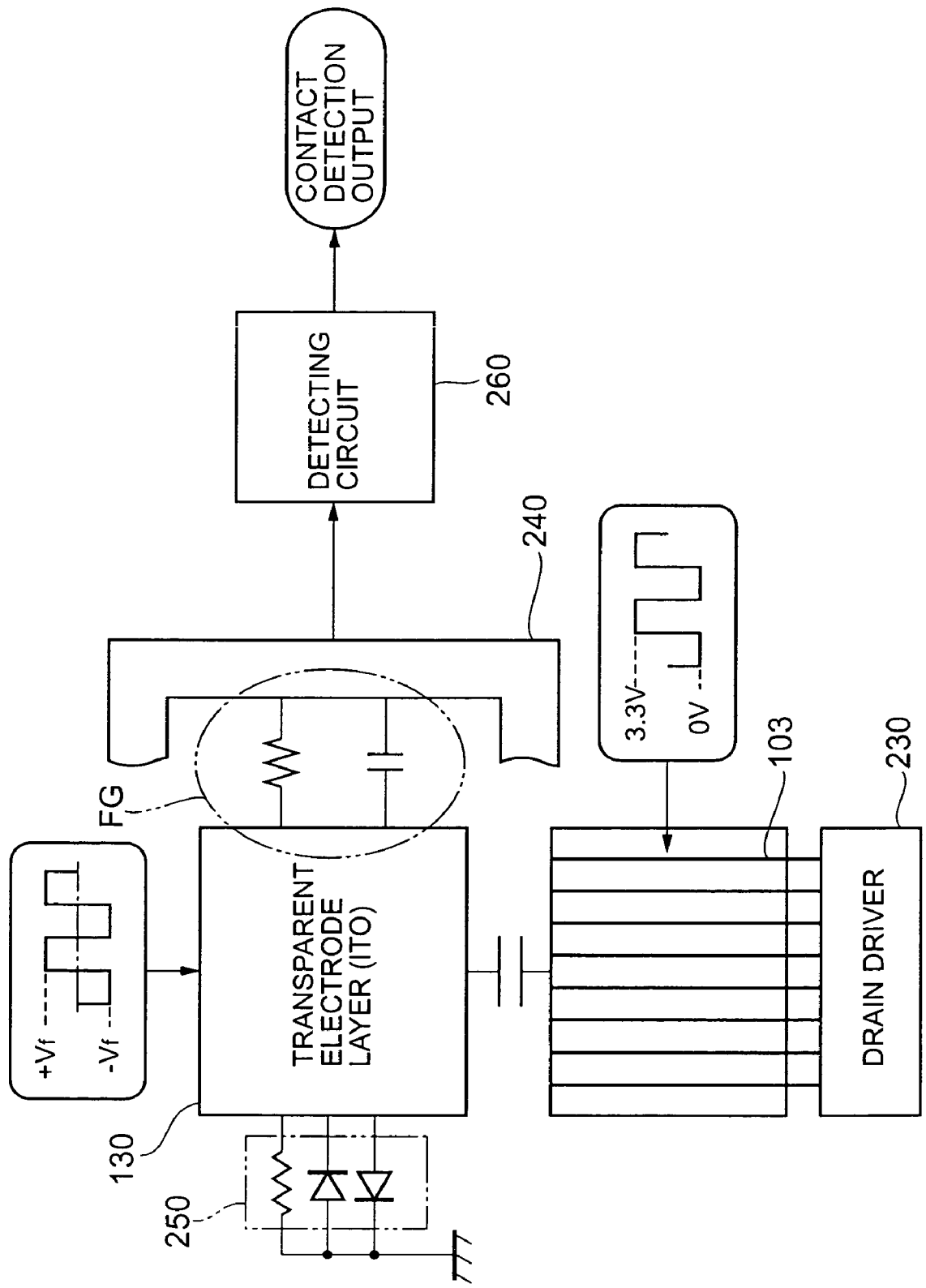
FIG. 14 is a schematic view explaining a contact detecting operation in the fingerprint reading apparatus to which contact detector of each embodiment is applied.
Figure 15:
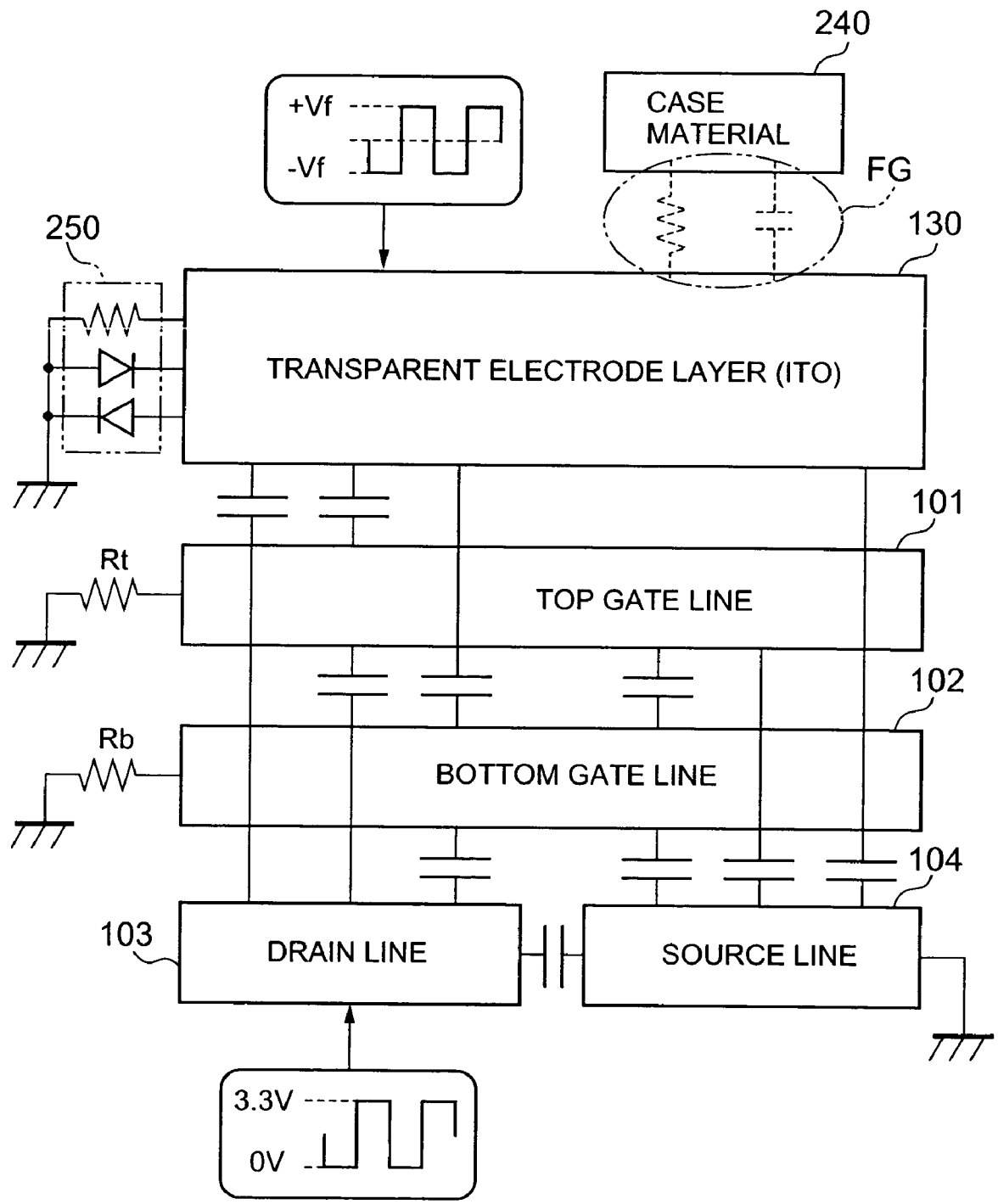
FIG. 15 is a view illustrating an equivalent circuit of the photosensor array at a contact detection operating time.

FIG. 14 is a schematic view explaining the contact detecting operation in the fingerprint reading apparatus to which the contact detector of each embodiment is applied, and FIG. 15 is a view illustrating an equivalent circuit of the photosensor array at the contact detection operating time.

As mentioned above, in the fingerprint reading apparatus according to the present embodiment, the drain driver 230 functions as the pulse generating circuit 40 in the contact detector illustrated in the aforementioned embodiment (FIG. 1) and the drain line 103 and the drain electrode 112 function as the counter electrode 30, so that the signal waveform (second signal waveform), which corresponds to the pulse signal (first signal waveform) applied to the drain line 103 and the drain electrode 112, is excited to the transparent electrode layer 130 formed to cover the entirety of the array area through the upper gate insulating film 115 and the protection insulating film 120.

More specifically, as illustrated in FIG. 15, the photosensor array 100 is structured to have parasitic capacitances among the transparent electrode 130, which forms the uppermost layer, the top gate line 101, which is formed to the transparent electrode layer 130 through the protection insulating film 120, the upper gate insulating film 115 and the lower gate insulting film 116, the bottom gate line 102, the drain line 103, and the source line 104, respectively, and the top gate line 101, the bottom gate line 102, the drain line 103 and the source line 104 also have the parasitic capacitances mutually.

While, as illustrated in FIGS. 14 and 15, since an amplitude limiting circuit 250 is provided between the transparent electrode layer 130 and the ground potential, voltage amplitude of the signal waveform (alternating voltage waveform; second signal waveform) excited to the transparent electrode layer 130 is limited to based on forward voltage Vf in the antiparallel diode circuit provided in the amplitude limiting circuit 250 as illustrated in FIG. 14 (−Vf to +Vf).

Moreover, as illustrated in FIG. 15, the top gate line 101 connected to the top gate driver 210 and the bottom gate line 102 connected to the bottom gate driver 220 are connected to the ground potential through the output resistors Rt and Rb of the driver 210 and 220, and the source line 104 is also structured to be connected to the ground potential.

For this reason, in such the equivalent circuit, when the pulse signal having a predetermined voltage amplitude is applied through the drain line 103 by the drain driver 230, no potential is excited to the top gate line 101, the bottom gate line 102, and the source line 104, and a predetermined signal waveform whose voltage amplitude is defined by the amplitude limiting circuit 250 is excited to only the transparent electrode layer 130.

This makes it possible to prevent overvoltage from being applied to the top gate line 101 and the bottom gate line 102 through the protection insulating film 120 even if electrical disturbance element which is out of the range of the voltage amplitude defined by the amplitude limiting circuit 250 (voltage more than amplitude upper limit voltage +Vf and voltage less than the amplitude lower limit voltage −Vf), so that electro-static damage of the photosensor array 100 and each of the drivers 210,220,230 can be appropriately prevented.

Then, when the finger FG is brought into contact with both the transparent electrode layer 130 and the case member 240 in common in a state that a predetermined signal waveform is excited to the transparent electrode layer 130 as illustrated in FIG. 14, the transparent electrode layer 130 and the case member 240 are electrically connected to each other through the capacitance component and the resistance component that are peculiar to the finger FG. Thereby, similar to the detecting method of the aforementioned contact detector, the signal waveform excited to the case member is changed by the capacitance component and the resistance component that are peculiar to the finger FG, comparison with the reference voltage preset by the comparator (FIG. 2) provided in the detecting circuit 260 is performed, and when the voltage component of the signal waveform and the reference voltage cross each other, it is judged that the normal detecting object (finger FG) as the detecting object is placed on the transparent electrode layer 130 and brought into contact therewith and a contact detection signal is output to the drive controller of the fingerprint reading apparatus. The drive controller executes the aforementioned series of image reading operations based on the contact detection signal to start the reading operation of the image pattern (fingerprint) of the finger FG placed on the transparent electrode layer 130 (photosensor array 100).

The following will specifically explain the effectiveness of the contact detector and the detecting method, and that of the image reading apparatus to which the contact detector is applied based on the comparison with the other structure.

Figure 16A:
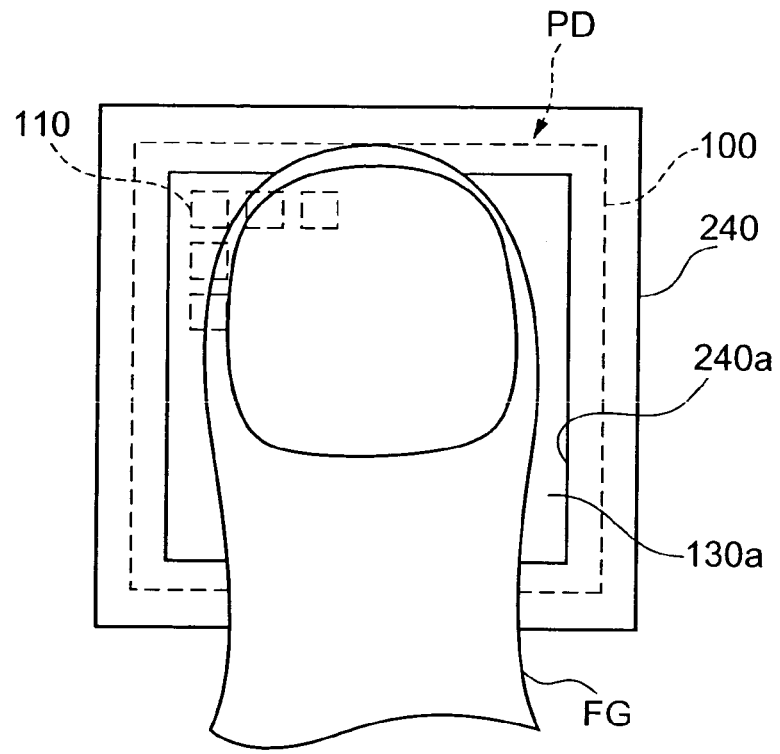
FIGS. 16A and 16B are schematic structural views each illustrating one example of a conventional fingerprint reading apparatus to be compared with the image reading apparatus of each embodiment according to the present invention.
Figure 16B:
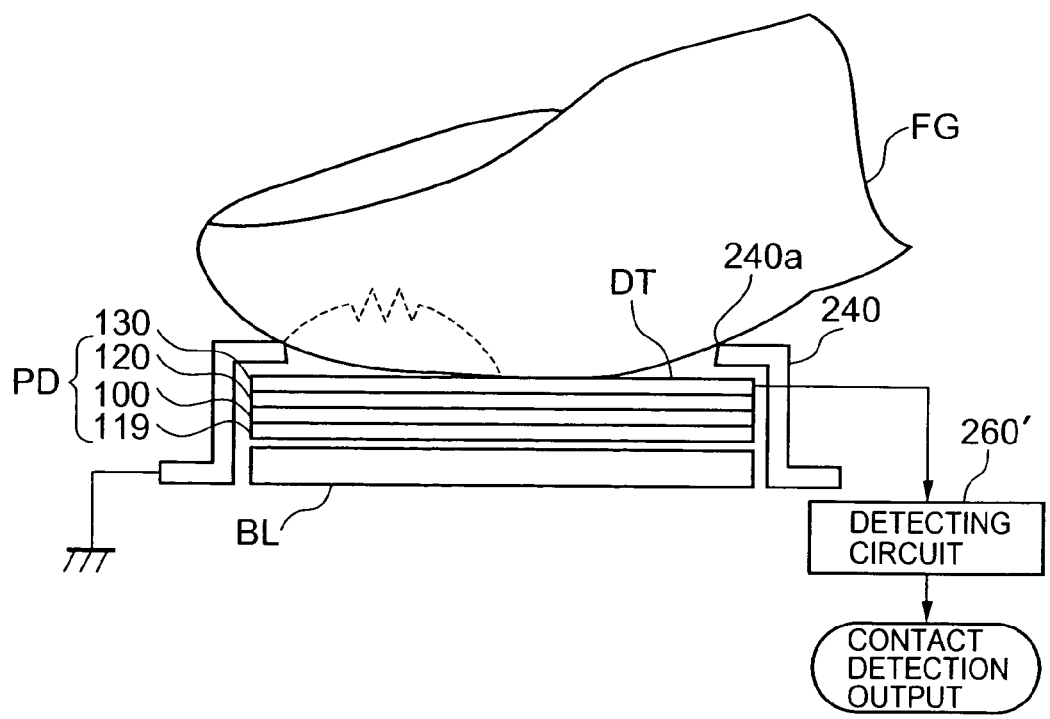
Figure 17:
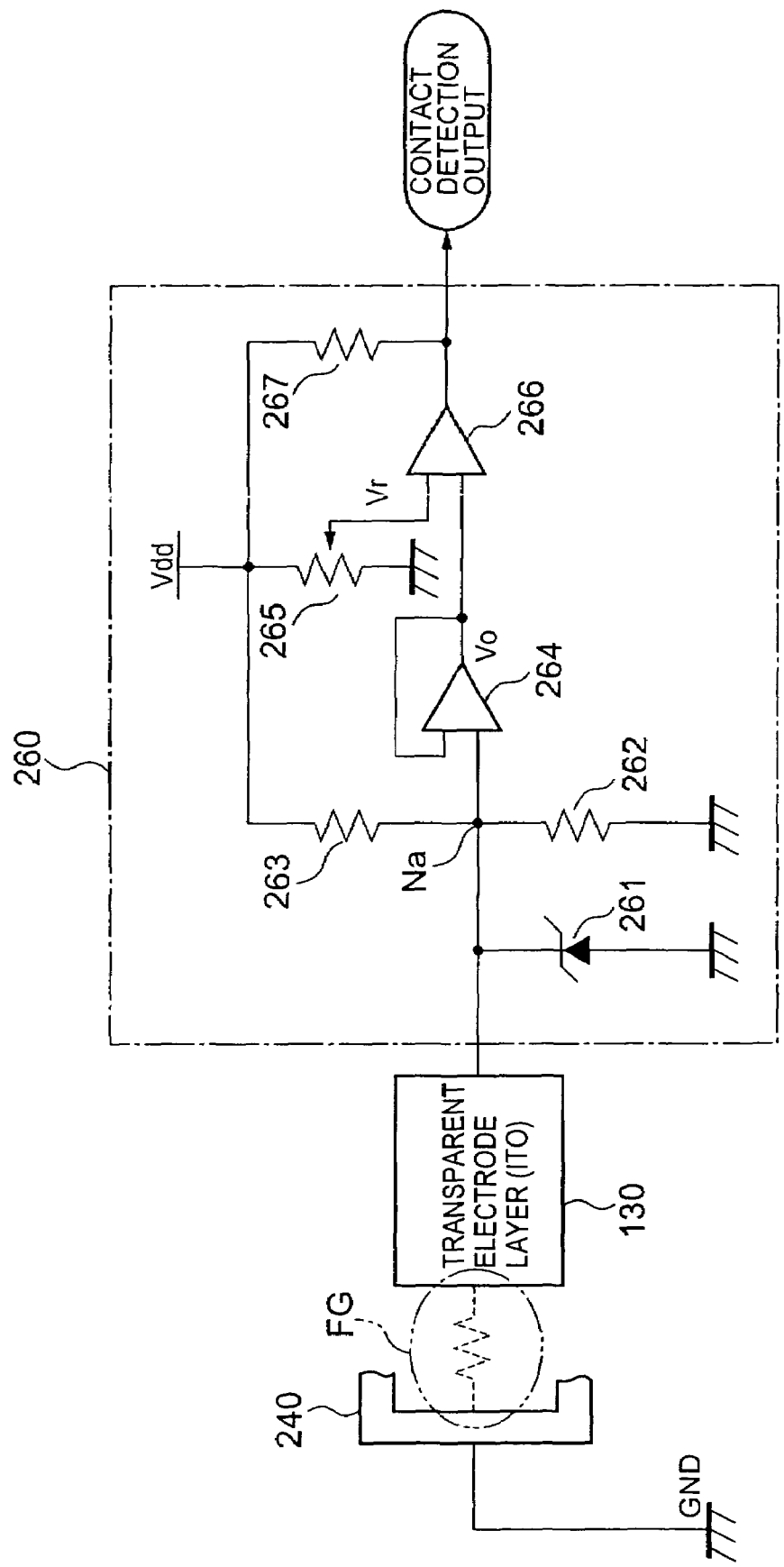
FIG. 17 is a schematic circuit diagram illustrating one example of a detecting circuit applied to the conventional fingerprint device of FIGS. 16A and 16B.

FIGS. 16A and 16B are schematic structural views each illustrating one example of a conventional fingerprint reading apparatus to be compared with the image reading apparatus according to the present embodiment, and FIG. 17 is a schematic circuit diagram illustrating one example of the detecting circuit applied to the conventional fingerprint device of FIGS. 16A and 16B. Here, regarding the structure equivalent to the aforementioned embodiment, the same reference numerals are added thereto, and the embodiment and the explanation is simplified or omitted.

For example, as illustrated in FIGS. 16A and 16B, the comparing fingerprint reading apparatus of the image reading apparatus according to this embodiment has the sensor device PD including the photosensor array 100 with the transparent electrode 130 on the uppermost surface, the surface light source BL arranged on the back surface side of the sensor device PD, and the conducive case member 240 provided around the sensor device PD to be electrically insulated therefrom, similar to the aforementioned embodiment, and there is further provided the structure in which a detecting circuit 260 is connected to the transparent electrode layer 130 and the ground potential is connected to the case member 240. Here, at least the transparent electrode layer 130 and the case member 240 are electrically insulated from each other through air and the like.

As illustrated in FIG. 17, the detecting circuit 260' is schematically structured to have an input protection diode 261 and a resistance element 262, which are connected in parallel between a node Na connected to a transparent electrode layer 430 and the ground potential, a resistance 263 connected between one contact Na and power voltage Vdd, a voltage follower 264, a variable resistance element 265 connected between power voltage Vdd and the ground potential, a comparator 266 that compares voltage Vr generated by the variable resistance element 265 and output potential Vo of the voltage follower 264 to output a binary logic signal, which corresponds to the comparison result, as a contact detection signal, and a pull-up resistor 267 connected between the output terminal of the comparator 266 and the power voltage Vdd.

In the fingerprint reading apparatus having such the structure, when the finger FG is brought into contact with neither the transparent electrode layer 130 nor the case member 240 in common, the resistance value between the transparent electrode layer 130 and the case member 240 shows a high value corresponding to substantially infinity.

While, when the finger FG is brought into contact with the transparent electrode layer 130 and the case member 240 in common, the resistance value between the transparent electrode layer 130 and the case member 240 shows a value, which is based on the resistance component of the finger FG, namely, a relative low resistance value corresponding to a skin resistance of the finger FG.

Thereby, in the image reading apparatus having such the structure, the potential of the contact Na changes according to the contact state of the finger FG with the transparent electrode layer 130 and the case member 240, so that reference voltage Vr input to the comparator 266 is suitably set by the variable resistance, making it possible to output the contact state of the finger FG as the contact detection signal having the binary logic signal. Then, the fingerprint reading apparatus can start the reading operation of the image pattern (fingerprint) of the finger FG placed on the transparent electrode layer 130 (photosensor array 100) based on the contact detection signal.

However, in the image reading apparatus (fingerprint reading apparatus) having the conductive case member 240 provided around the sensor device PD to be electrically insulated as mentioned above, when such a system is used that the potential, which changes based on only the resistance component peculiar to the finger FG brought into contact with the transparent electrode layer 130 and the case member 240, is detected by the detecting circuit 260' to detect the contact state of the finger FG, there is a problem in which such characteristics are included that the change in the resistance value detected based on the resistance component of the finger is relatively small, variations in the resistance value become relatively large depending on the finger state (skin condition, individual difference, external environments, and the like), making it difficult to detect the wide range of voltage change followed by this and to detect the presence or absence of the contact correctly at all times. Moreover, there is a problem in which the conductive foreign object (dirt and the like) having the resistance value approximating to the resistance component of the normal detecting object (finger) is erroneously detected as the normal detecting object.

In contrast to the above, in the contact detector, the detecting method, and the image reading apparatus according to the present invention, since the contact state of the detecting object with the transparent electrode layer is detected and judged by performing comparison between the signal waveform that changes and the preset reference voltage based on both the capacitance component and the resistance component peculiar to the detecting object (finger), discrimination between the normal detecting object as an object to be detected and the other conductive or capacitive foreign object can be satisfactorily and equally performed, and the erroneous detection due to the foreign object is suppressed so that the erroneous operation of the image reading apparatus can be controlled, thereby making it possible to provide the contact detector and image reading apparatus having high reliability.

An explanation will be next given of the structure for implementing the electrostatic removing function according to the present invention by showing the embodiment.

<First Embodiment of Electrostatic Removing Function>

Figure 18:
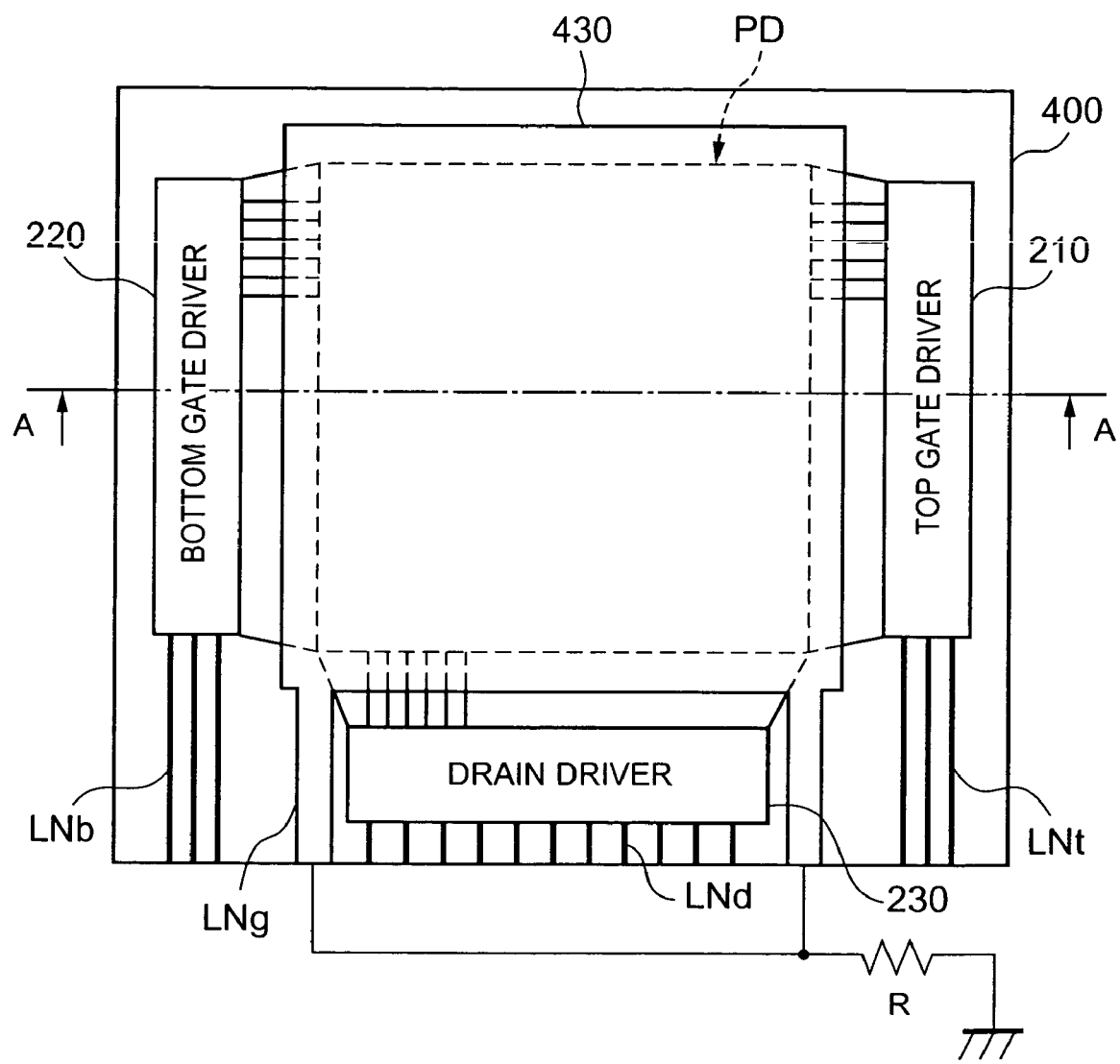
FIG. 18 is a schematic structural view illustrating the first embodiment of the structure for implementing an electrostatic removing function according to the present invention.
Figure 19:
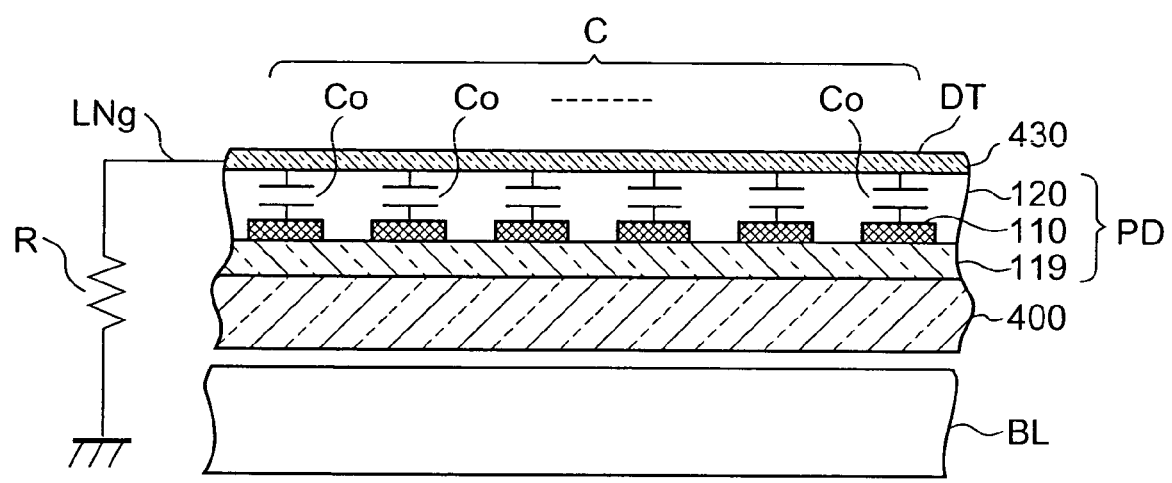
FIG. 19 is a schematic cross-sectional view illustrating the general structure of the first embodiment of the electrostatic removing function.

FIG. 18 is a schematic structural view illustrating the first embodiment of the structure for implementing an electrostatic removing function according to the present invention, and FIG. 19 is a schematic cross-sectional view illustrating the general structure of the present embodiment. Additionally, here, an explanation will be given with reference to the structures of the aforementioned photosensor and the photosensor system suitably.

Moreover, as mentioned above, the image reading apparatus according to the present invention has both the contact detecting function and the electrostatic removing function and includes the transparent electrode formed on the sensor device, which corresponds to the first detection electrode, the second detection electrode, and the counter electrode, the conductive case member, the drain electrode, the drain line, the pulse generating circuit, the amplitude limiting circuit, and the detecting circuit as shown in each embodiment of the above contact detector, however, the structure for implementing the electrostatic removing function described below is related to the structure of the transparent conductive film formed on the photosensor array corresponding to the first detection electrode, so that the explanation is given in a state that attention is paid to only the portion relating to the structure of this transparent conductive film for the sake of convenience.

Moreover, regarding the structural portions equivalent to the aforementioned each embodiment, the same reference numerals are added thereto, and the embodiment and the explanation is simplified or omitted.

As illustrated in FIGS. 18 and 19, the image reading apparatus according to the present embodiment is structured to have the photosensor device PD, which includes the photosensor array 100 having double gate photosensors 110 with the aforementioned structure arranged on one surface side of the insulating substrate 119 in a matrix form and the protection insulating film (transparent insulating film) 120 formed on the photosensor array 100, a transparent electrode layer (transparent electrode film) 430, which is an area including the array area for the photosensor array 100 and which is formed on the entire surface of the protection insulating film 120 and which has an upper surface as the detection surface DT, and which corresponds to the transparent electrode layer 130 in each embodiment of the above contact detector, a top gate driver 210, which is connected to the top gate line 101 provided in the photosensor device PD (photosensor array 100), and which applies a reset pulse φTi to the double gate type photosensor group 110 of a specific row for the reset time Tres, a bottom gate driver 220, which is connected to the bottom gate line 102 provided in the photosensor device PD, and which applies a read pulse φBi to the double gate type photosensor group 110 of a specific row for the reset time Tres, and a drain driver 230, which is connected to the drain line 103 provided in the photosensor device PD to apply precharge voltage for read time Tread, and which detects an amount of carriers as an output voltage stored in the double gate type photosensor group 110 of a specific row for precharge time Tprch.

Here, as illustrated in FIG. 18, the respective structural components (photosensor device PD, transparent electrode layer 430, top gate driver 210, bottom gate driver 220, drain driver 230) of the aforementioned image reading apparatus are placed on one surface side of a transparent insulating substrate 400 such as a glass substrate, a film substrate, and the like, and on the insulting substrate 400, there are provided lead wires LNt, LNb, LNd for electrically connecting the top gate driver 210, the bottom gate driver 220 and the drain driver 230 to the external drive controller and power supplying circuit and the like. Moreover, on the insulating substrate 400, there is provided a lead wire LNg for connecting the transparent electrode layer 430 formed on the photosensor device PD to the ground potential. In addition, the structure in which the transparent electrode layer 430 is connected to the ground potential through the lead wire substantially corresponds to the structure in which the first detection electrode is connected to the ground potential through the amplitude limiting circuit in connection with the structure of each embodiment of the aforementioned detector.

Here, the lead wrings LNt, LNb, LNd, and LNg may be structured to be connected to the external drive controller and the power supplying circuit through a connection terminal group (not illustrated) provided on one end side of the insulating substrate 400. Additionally, instead of providing the insulating substrate 400, for example, the right and left and lower side portion of the insulating substrate 119 are extended to form a predetermined wiring on which and the top gate driver 210, the bottom gate driver 220, and the drain driver 230 may be placed, and moreover, on the insulating substrate 119, there may be formed on the bottom driver 220 and the drain driver 230 integrally with the photosensor array 110.

Furthermore, as illustrated in FIG. 19, on the other surface side of the photosensor device PD (other surface side of the insulating substrate 400), there is arranged the surface light source BL that provides uniform light irradiation to the detecting object (for example, finger and the like), which is placed on the detecting surface DT of the upper surface of the transparent electrode layer 130 and which is brought into contact therewith. Accordingly, the insulating substrate 119, which is illustrated in the structure of the aforementioned photosensor device PD (double gate type photosensor 110), and an insulting substrate 200 illustrated in FIGS. 18 and 19 may be formed of the same glass substrate and the like.

The following will specifically explain the electrostatic removing function applicable to the image reading apparatus according to the present invention.

First of all, the image reading apparatus having the aforementioned structure can be considered to be equivalent to the circuit structure in which resistance component R, which includes resistance that the transparent electrode layer 430 has and wiring resistance of the lead wire LNg, is formed between the transparent electrode layer 430 and the ground potential, and electrostatic capacitance (parasitic capacitance) is formed by the transparent electrode layer 430, the insulating film such as the protection film 120, and the respective electrodes of the respective double gate type photosensors (specifically, the top gate line 101 formed integrally with the top gate electrode 121, the bottom gate line 102 formed integrally with the bottom gate electrode 122, the drain line 103 formed integrally with the drain electrode 112, and the source line 104 formed integrally with the source electrode 113), and capacitance component Co formed of the electrostatic capacitance is distributed to the transparent electrode layer 430 to be added as illustrated in FIG. 19. Here, it is assumed that the total capacitance in which the respective capacitance components Co are added is C.

While, as explained in the prior art, in the image reading apparatus that reads the image pattern of the detecting object (human body and the like), which is apt to have static, when the detecting object is placed on the detecting surface DT and brought into contact therewith, it is required to have withstand pressure (electrostatic withstand pressure), which is more than static electricity charged to the detecting object, in order to prevent device damage due to static electricity and the erroneous operation of the image reading apparatus. Here, since it becomes clear that static electricity of approximately 10 to 15 kV or more is charged when the human body is used as the detecting object as mentioned above, the electrostatic withstand pressure, which is the equal or more than the aforementioned charge voltage, is required even in the image reading apparatus (fingerprint reading apparatus) having the aforementioned structure.

Here, regarding the relationship among the resistance component R, capacitance component C, and electrostatic withstand pressure, the inventors of the present invention conducted various experiments based on such a viewpoint, and made a close study of the result, and found out that the electrostatic withstand pressure in the image reading apparatus was closely related to a time constant $\tau$ ($=C \times R$) defined by a product of the resistance component R, capacitance component C. Then, they found out that a numerical range of an optimal time constant $\tau$ to ensure sufficient electrostatic withstand pressure.

An explanation will be first given of the test method applied to the image reading apparatus according to the present embodiment.

Figure 20A:
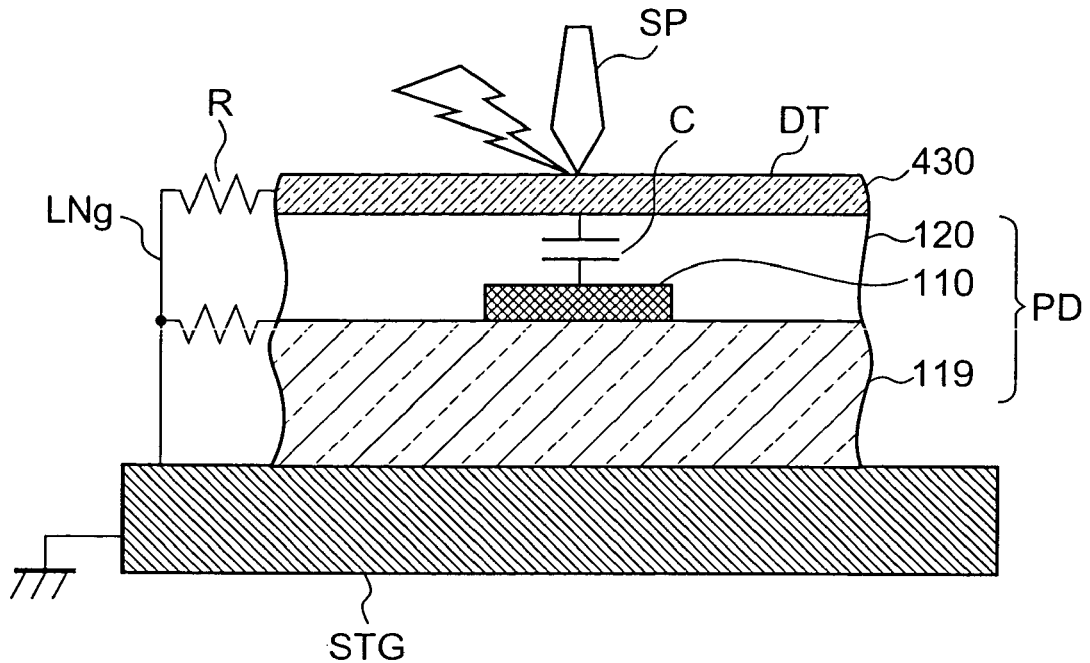
FIGS. 20A and 20B are schematic views each illustrating a test method applied at the time of measuring the relationship between an electrostatic withstand pressure and a time constant in the image reading apparatus.
Figure 20B:
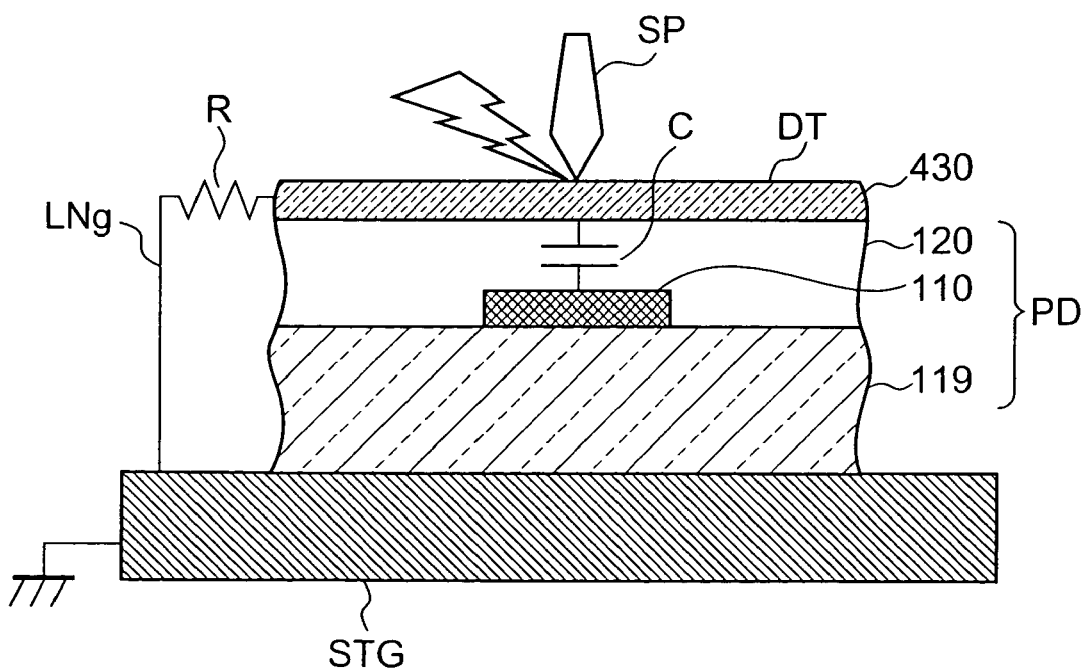

FIGS. 20A and 20B are schematic views each illustrating the test method applied at the time of measuring the relationship between the electrostatic withstand pressure and the time constant in the image reading apparatus according to this embodiment.

In this embodiment, an ESD (electrostatic discharge) test method using a human discharge model was applied to the image reading apparatus having the aforementioned structure, and the test method included two kinds, that is, an all-terminal grounded state where the transparent electrode layer 430 and all electrodes of the double gate type photosensors 110 were connected to the ground potential as illustrated in FIG. 20A and a transparent electrode grounded state where only the transparent electrode layer 430 was connected to the ground potential, and resistance and electrostatic capacitance values of the transparent electrode layer 430 defining the time constant $\tau$ and a value of applied voltage corresponding to electrostatic withstand pressure were measured in connection with each of these states. Here, as the method for setting a numeric value of time constant arbitrarily, the film thickness of the transparent electrode layer 430 was changed to set a value of the resistance of the transparent electrode layer 430 arbitrarily and to change the film thickness of the protection insulating film 120, thereby setting a value of electrostatic capacitance to be added to the transparent electrode layer 430 arbitrarily, therefore, the value of time constant $\tau$ was changed.

More specifically, as illustrated in FIG. 20A, regarding the EDS test in the all-terminal grounded state, the photosensor device PD where the transparent electrode layer 430 and the protection insulating film 120, each having an arbitrary thickness, are formed is placed on a sample stage STG, the transparent electrode layer 430 is connected to the ground potential through the lead wring LNg, and each electrode of the double gate type photosensor 110 is set to be connected to the ground potential. Next, a discharge gun SP is brought into contact with the detecting surface DT on the transparent electrode layer 430 and arbitrary voltage is applied thereto, thereby setting to the state, which is equivalent to the case in which the charged detecting object is contacted.

While, as illustrated in FIG. 20B, regarding the EDS test in the transparent electrode grounded state, in the photosensor device PD placed on the sample stage STG, only the transparent electrode layer 430 is connected to the ground potential through the lead wire LNg, each electrode of the double gate type photosensor 110 is set to be a floating state (floating voltage state). Next, the discharge gun SP is brought into contact with the detecting surface DT on the transparent electrode layer 430 and arbitrary voltage is applied thereto.

By such test methods, the charges based on the voltage applied to the transparent electrode layer 430 are held and stored in the electrostatic capacitance formed by the protection insulating film 120 and the like based on the potential difference between the transparent electrode layer 430 and each electrode of the double gate type photosensor 110, and the charges gradually flow to the sample stage STG connected to the ground potential through the lead wire LNg having wiring resistance, which is lower than the transparent electrode layer 430, according to the potential difference between the transparent electrode layer 430 and the ground potential. Then, when applied voltage due to the discharge gun SP was changed, the maximum applied voltage, which was maintained satisfactorily without causing damage of photosensor device PD (double gate type photosensor 110), was measured as electrostatic withstand pressure.

Figure 21:
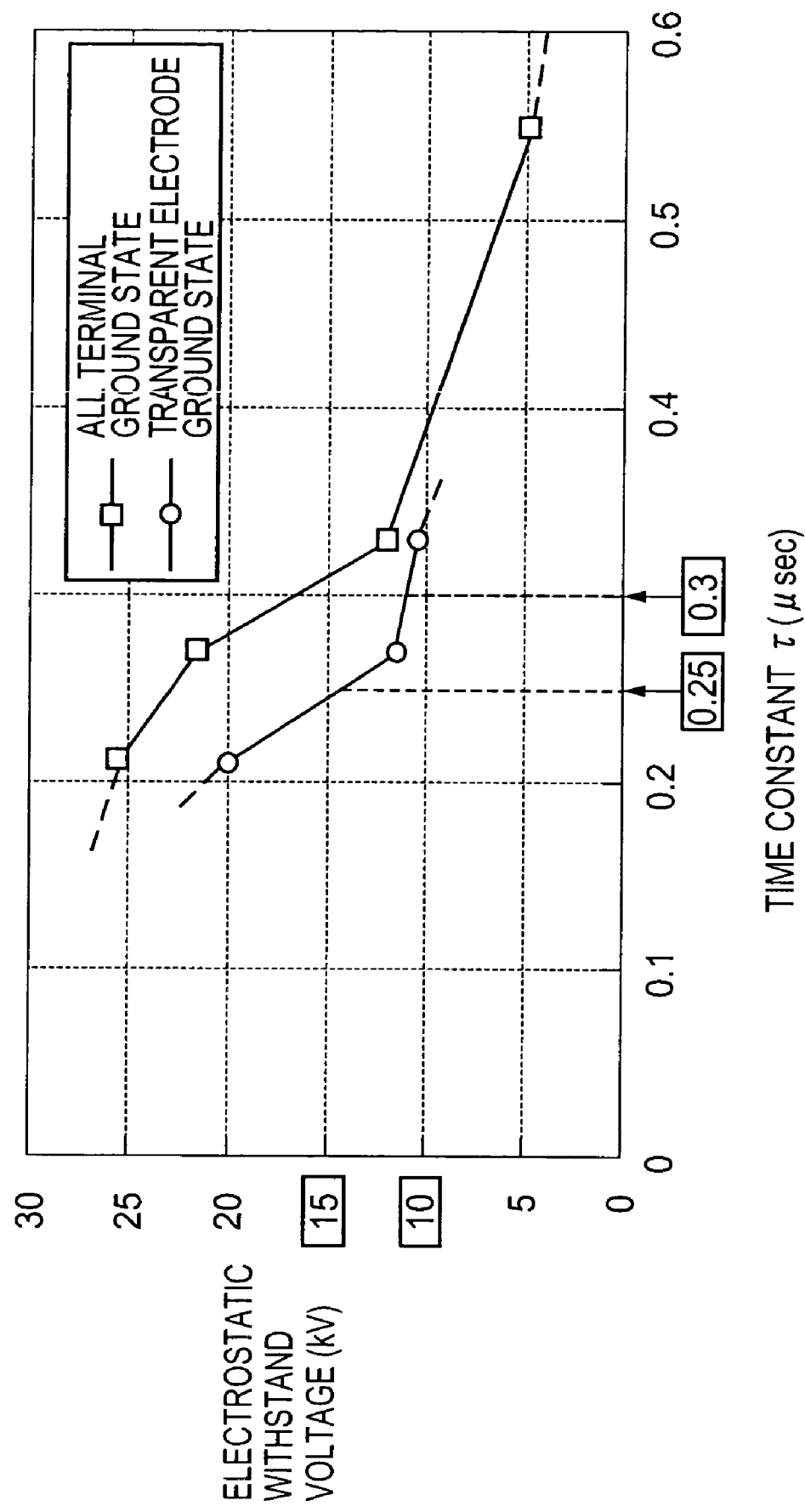
FIG. 21 is a graph illustrating the relationship between the electrostatic withstand pressure and the time constant in the image reading apparatus.

FIG. 21 is a graph illustrating the relationship between the time constant and the electrostatic withstand pressure in the image reading apparatus according to the above-described test methods. Here, the electrostatic withstand pressure (maximum applied voltage) was measured in the case where an ITO film was used as the transparent electrode layer 430 and the film thickness of the transparent electrode layer 430 was set to 50 nm (500 Å) and 150 nm (1500 Å), a silicon nitride film was used as the protection insulting film 120, and the film thickness of the silicon nitride film 120 was set to 600 nm (6000 Å), 800 nm (8000 Å), and 1000 nm (1 μm).

First of all, Table 1 shows the relationship among sheet resistance of the transparent electrode layer 430, electrostatic capacitance of the protection insulating film 120, and time constant, and measurement data of electrostatic withstand pressure at the relevant time constant.

TABLE 1

| SHEET RESISTANCE AND FILM THICKNESS OF TRANSPARENT ELECTRODE LAYER (ITO) | ELECTROSTATIC CAPACITANCE AND FILM THICKNESS OF PROTECTIVE INSULATING FILM | TIME CONSTANT $\tau$ | ELECTROSTATIC WITHSTAND VOLTAGE | |
|---|---|---|---|---|
| | | | ALL TERMINAL GROUND STATE | TRANSPARENT ELECTRODE GROUND STATE |
| 50 Ω/☐ (50 nm) | 11 nF (600 nm) | 0.55 μsec | — | 5.0 kV |
| 30 Ω/☐ (150 nm) | 11 nF (600 nm) | 0.33 μsec | 10.67 kV | 12.00 kV |
| 30 Ω/☐ (150 nm) | 9 nF (800 nm) | 0.27 μsec | 11.33 kV | 21.60 kV |
| 30 Ω/☐ (150 nm) | 7 nF (1000 nm) | 0.21 μsec | 20.00 kV | 25.60 kV |

As illustrated in Table 1, regarding the ITO film that forms the transparent electrode layer 430, there is shown a tendency that sheet resistance reduces as the film thickness becomes thick. Additionally, in the present embodiment, since the transparent electrode layer 430 is formed to be substantially square, the resistance value of the transparent electrode layer 430 becomes the same as the sheet resistance. For this reason, afterwards, the resistance of the transparent electrode layer 430 is shown by the sheet resistance. While, in the silicon nitride film that forms the protection insulating film 120, there is shown a tendency that electrostatic capacitance reduces as the film thickness becomes thick. Accordingly, the time constant $\tau$ defined by the product of these sheet resistance (resistance component R) and electrostatic capacitance (capacitance component C) becomes small as the thickness of the transparent electrode layer 430 is formed thick (namely, the sheet resistance is set to be low) and the thickness of the protection insulating film 120 is formed thick (namely, the electrostatic capacitance is set to be low).

Then, in the image reading apparatus set to the sheet resistance and electrostatic capacitance each having the numeric value shown in Table 1, by measuring the electrostatic withstand pressure based on the above test methods, it was shown that there was a tendency that the electrostatic withstand pressure becomes large as the time constant $\tau$ was small even in either test method as illustrated in Table 1 and FIG. 21.

Accordingly, in the case where the image reading apparatus according to this embodiment is applied to the fingerprint reading apparatus using, for example, the human body as the detecting object, in order to implement withstand pressure of static electricity (10 to 15 kV) charged to the human body, it is clear that there is usefulness in that the thickness of the transparent electrode layer 430 is increased to reduce the sheet resistance and that the thicknesses of the protection insulating film 120 and the like are increased to reduce the electrostatic capacitance, thereby reducing the constant time $\tau$ to a minimum.

However, since the transparent electrode layer 430 and the protection insulating film 120 need high transmittance to make light incident onto each double gate type photosensor 110 satisfactorily according to the image pattern of the detecting object, there is a possibility that transmittance will be degraded by light reflection and scattering, attenuation, and the like in the film to bright about a reduction in reading sensitivity and accuracy of the photosensor device if the film thicknesses of the transparent electrode layer 430, the protection insulating film 120, and the like are formed thick to improve the electrostatic withstand pressure (to reduce time constant $\tau$). Accordingly, it is necessary to decide the numerical range of time constant $\tau$ by which suitable reading sensitivity can be implemented as ensuring electrostatic withstand pressure sufficiently.

Under the circumstances, the inventors of the present invention conducted a close study based on such the experiment result and the condition such as the reading sensitivity required to the photosensitive device, and found it useful to set the sheet resistance of the transparent electrode layer 430 and the electrostatic capacitance of the protection insulating film 120 in such a way that the time constant $\tau$ reached approximately 0.3 μsec or less (case of electrostatic withstand pressure of 10 kV or more) more preferably 0.25 μsec or less (case of electrostatic withstand pressure of 15 kV or more) in order to realize excellent device characteristics (reading sensitivity and accuracy) of electrostatic withstand pressure (electrostatic removing function) of 10 to 15 kV or more. Additionally, even in this case, in order to obtain the time constant $\tau$ of approximately 0.3 μsec or less, it is preferable that the film thicknesses of the transparent electrode layer 430, the protection insulating film 120 and the like should be prevented from being formed extremely thick, and it is preferable that that the numerical range of time constant $\tau$ should be implemented with an extremely thin film thickness by the film forming condition, the material composition, and the like.

When illustration is given based on measurement data illustrated in Table 1, 0.3 μsec by which the numerical range of time constant $\tau$ is defined corresponds to the structure in which the sheet resistance of the transparent electrode layer 430 is formed to have approximately 30 Ω/□ and less and the electrostatic capacitance formed by the protection insulating film 120 is approximately 10 nF or less. Then, the numerical ranges of the sheet resistance and the electrostatic capacitance correspond to the structure in which the thickness of the ITO film as the transparent conductive layer 30 is set to about 150 nm (1500 Å) or more and the thickness of the silicon nitride film as the protection insulting film 120 is set to about 600 nm (6000 Å) or more. However, since the relationship between the sheet resistance and the electrostatic capacitance largely depends on the film forming condition, material component, crystal condition and the like, this is not always the unique relationship, and since the combination of the transparent electrode layer 430 and the protection insulating film 120 in the thickness (sheet resistance and electrostatic capacitance) is individually set, the time constant and the electrostatic withstand pressure are not uniquely decided by only these thicknesses.

Accordingly, in the image reading apparatus according to the present invention, the time constant $\tau$, which is defined by the product of the resistance component of the transparent electrode layer and the capacitance component (electrostatic capacitance) of the protection insulting film, is limitedly set to the numerical range of 0.3 μsec or less, and this makes it possible to discharge the static electricity applied to the detecting surface to the ground potential satisfactorily even if the image reading apparatus is applied to the fingerprint reading apparatus using the object such as a human body to which extremely large static electricity (10 to 15 kV or more) is charged as the detecting object, with the result that the device damage of the photosensor and the generation of the erroneous operation of the system can be prevented or suppressed excellently.

Moreover, the image reading apparatus according to the present embodiment can implement the structure having a predetermined time constant $\tau$ relatively easily and at low cost by controlling only the thicknesses of the transparent electrode layer and the protection insulating film and the like (film thickness and film forming conditions, material composition, and the like) without adding a special structure to the conventional structure, and this makes it possible to provide the image reading apparatus, which is suitable for the known structure satisfactorily and which is excellent in the electrostatic removing function.

<Second Embodiment of Electrostatic Removing Function>

An explanation will be next given of the second embodiment of the structure for implementing the electrostatic removing function according to the present invention.

Figure 22:
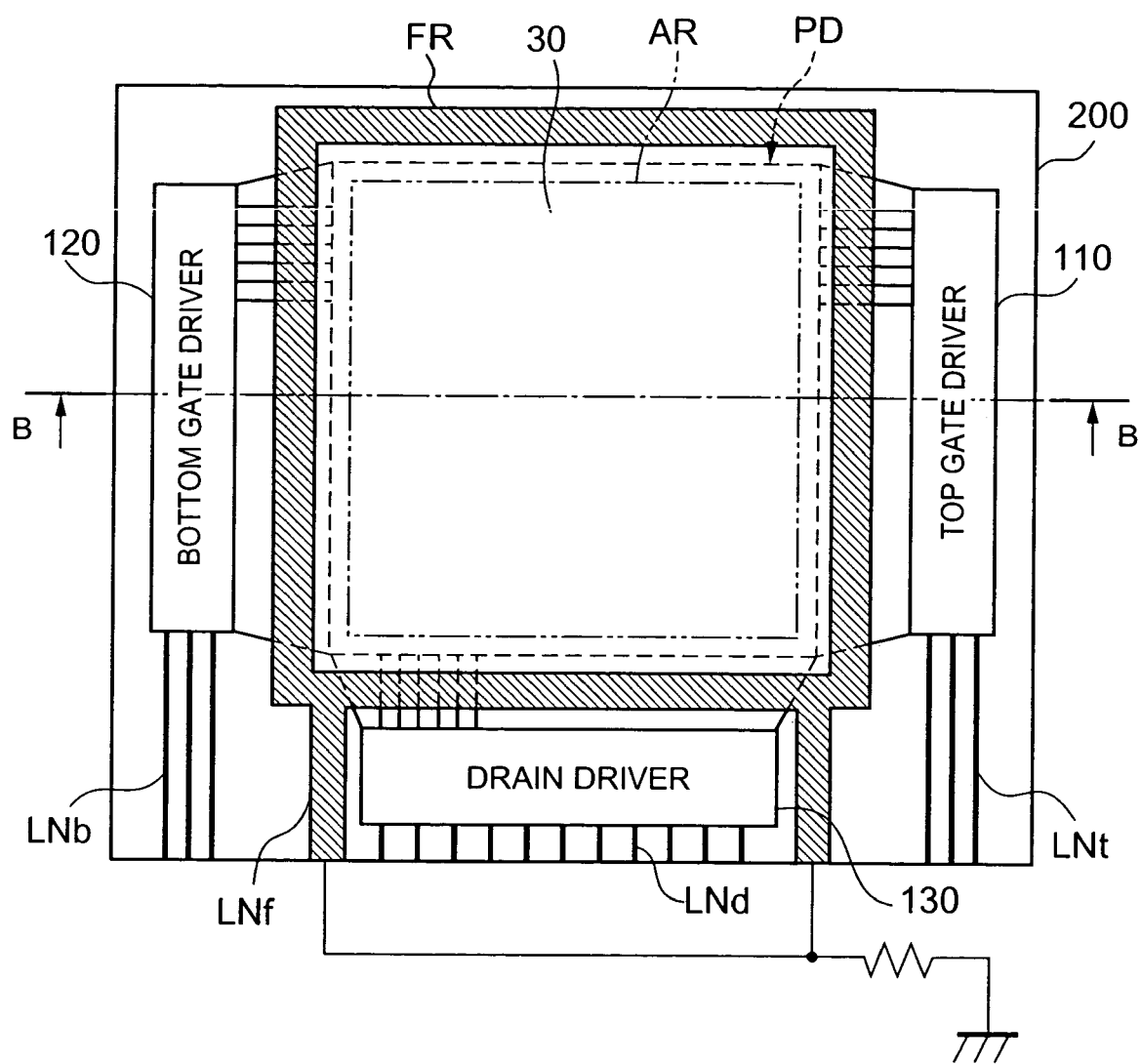
FIG. 22 is a schematic structural view illustrating one structural example of the second embodiment of the structure for implementing the electrostatic removing function according to the present invention.
Figure 23:
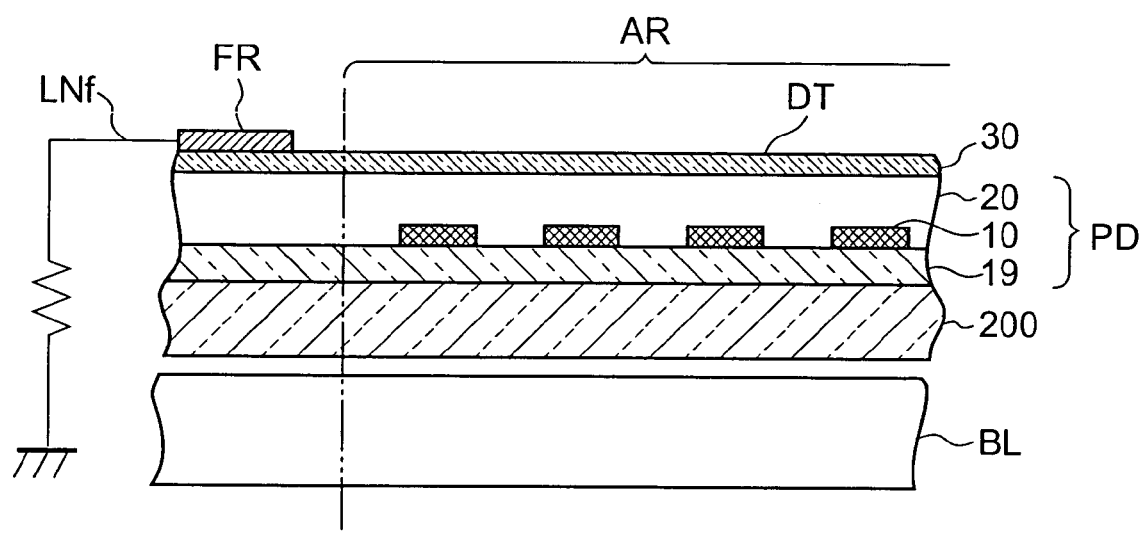
FIG. 23 is a schematic cross-sectional view illustrating the general structure of the electrostatic removing function of the second embodiment.
Figure 24A:
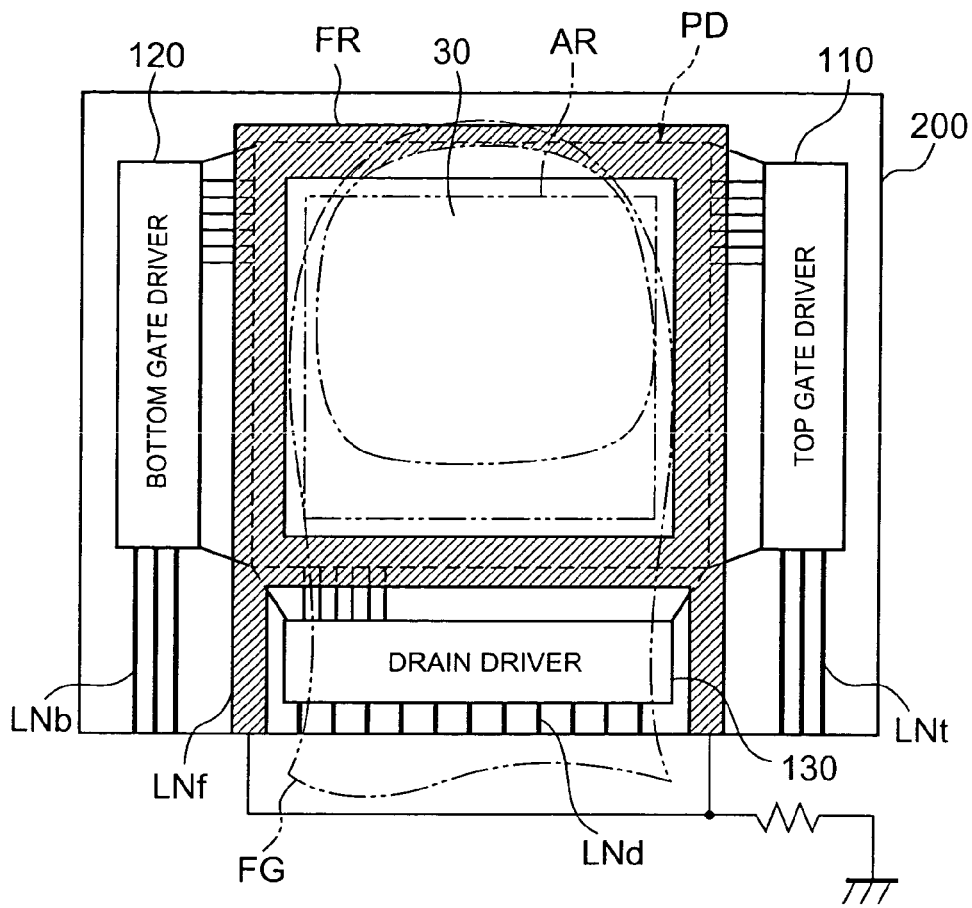
FIGS. 24A and 24B are schematic structural views each illustrating other structural example of the second embodiment of the electrostatic removing function.
Figure 24B:
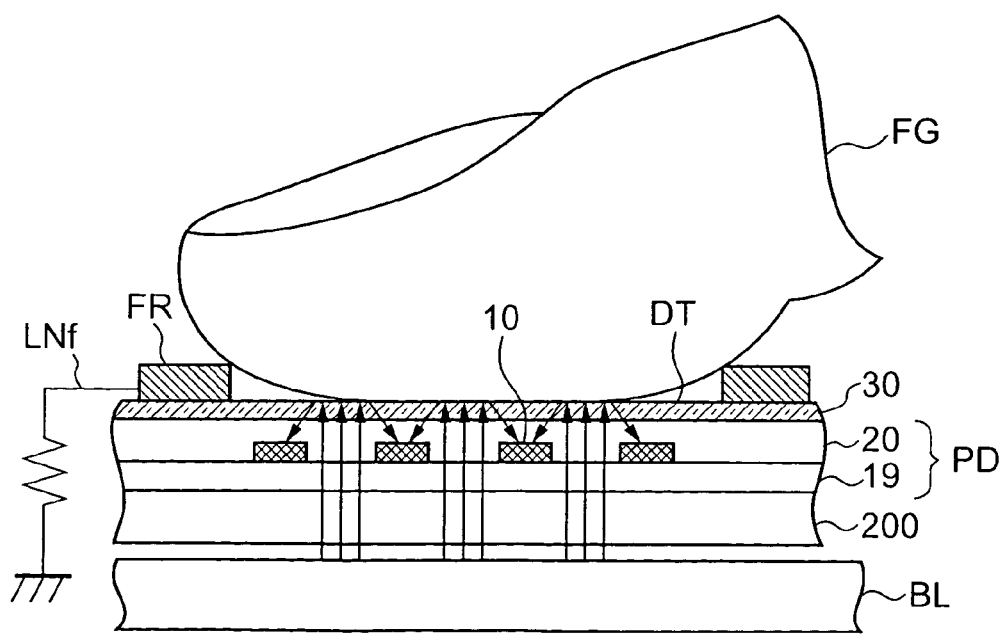
Figure 25:
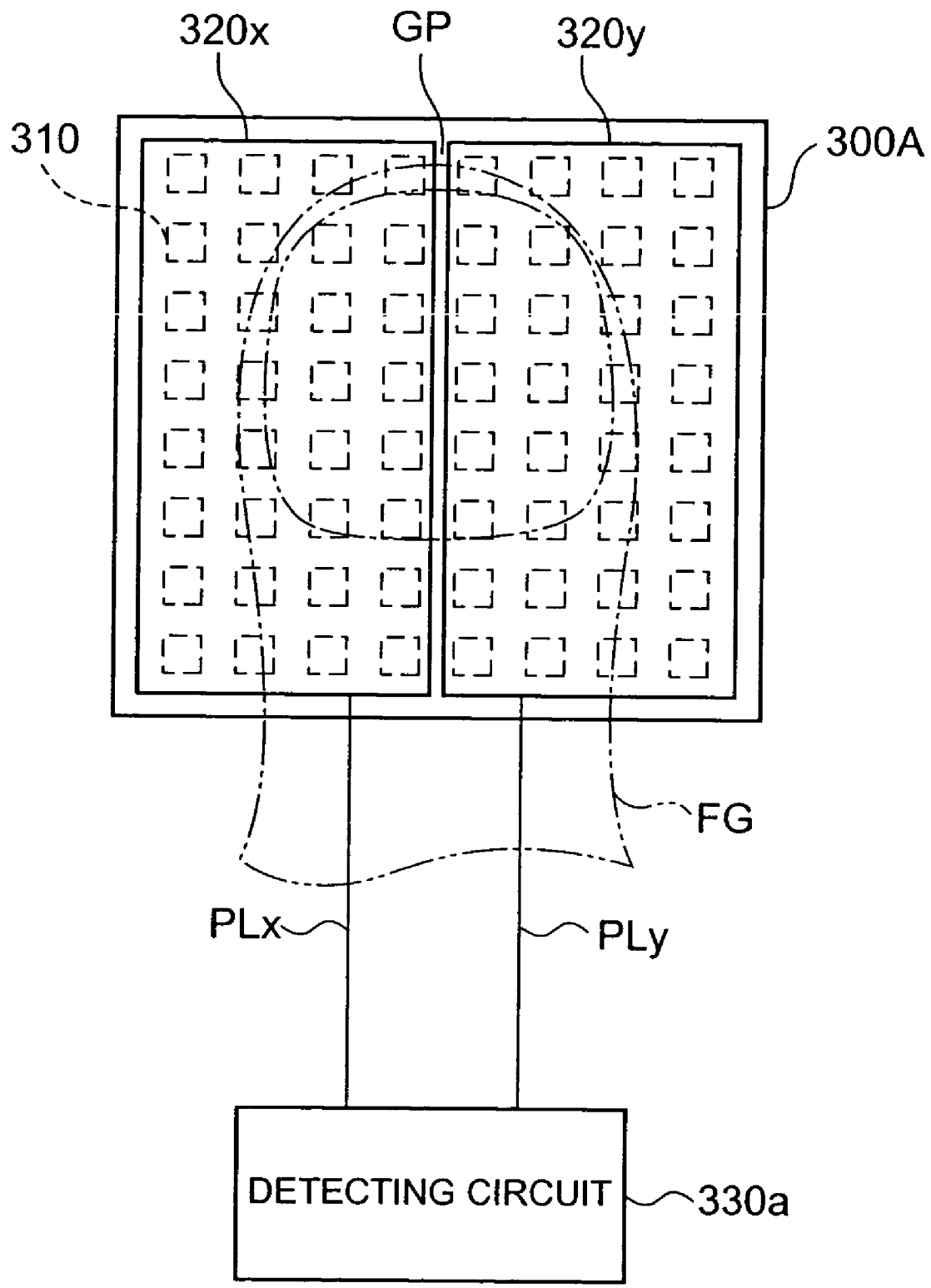
FIG. 25 is a schematic structural view illustrating one structural example of the conventional contact detecting function in the image reading apparatus.
Figure 26:
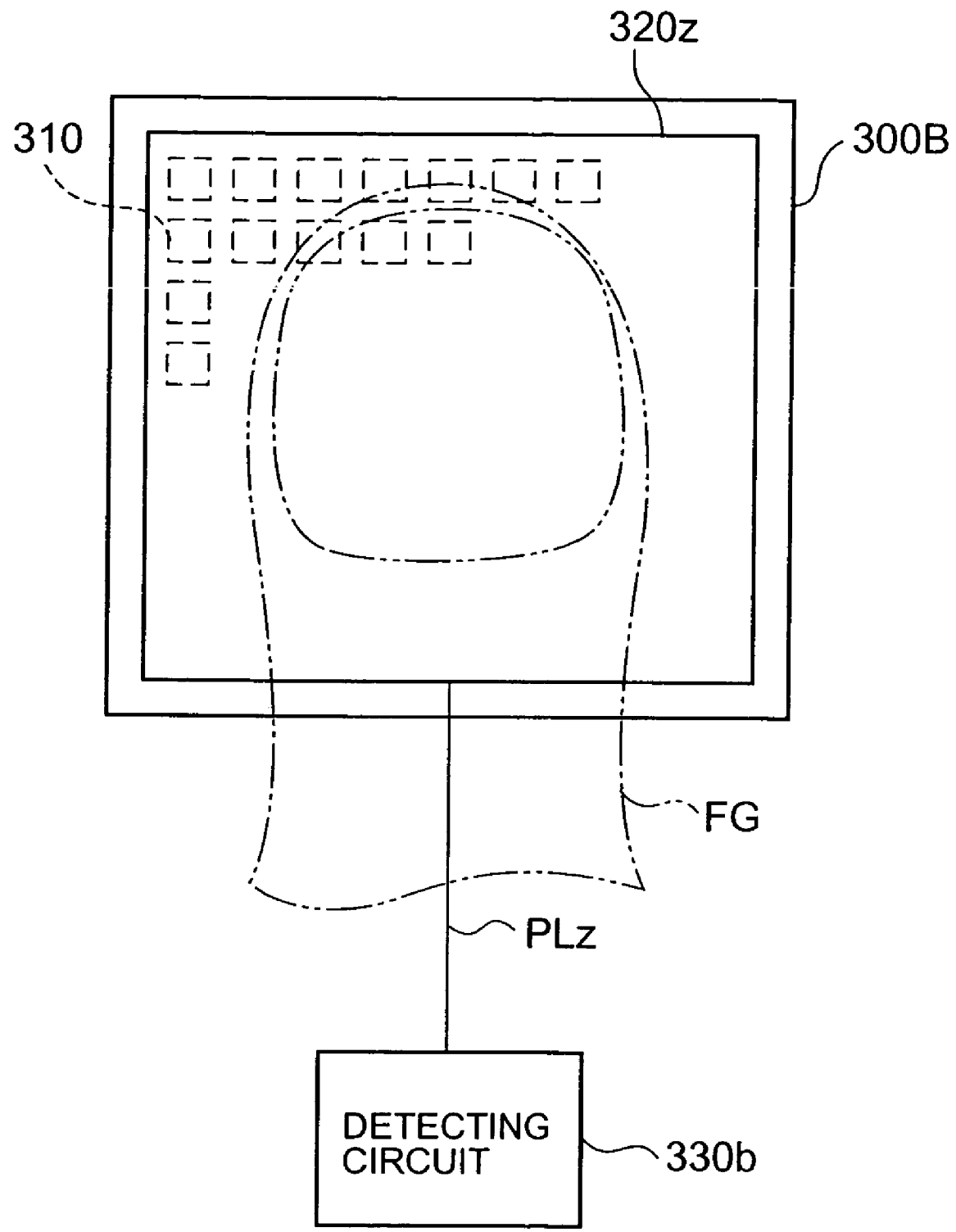
FIG. 26 is a schematic structural view illustrating other structural example of the conventional contact detecting function.
Figure 27A:
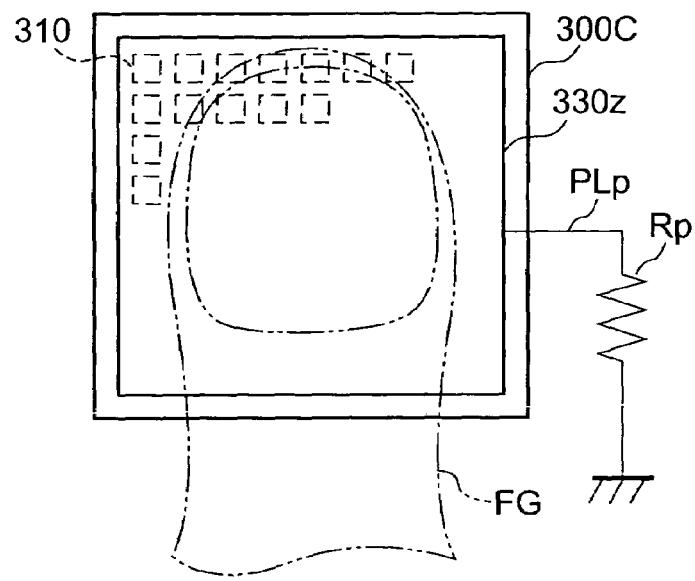
FIG. 27A is a schematic structural view illustrating one structural example of the conventional electrostatic removing function in the image reading apparatus.
Figure 27B:
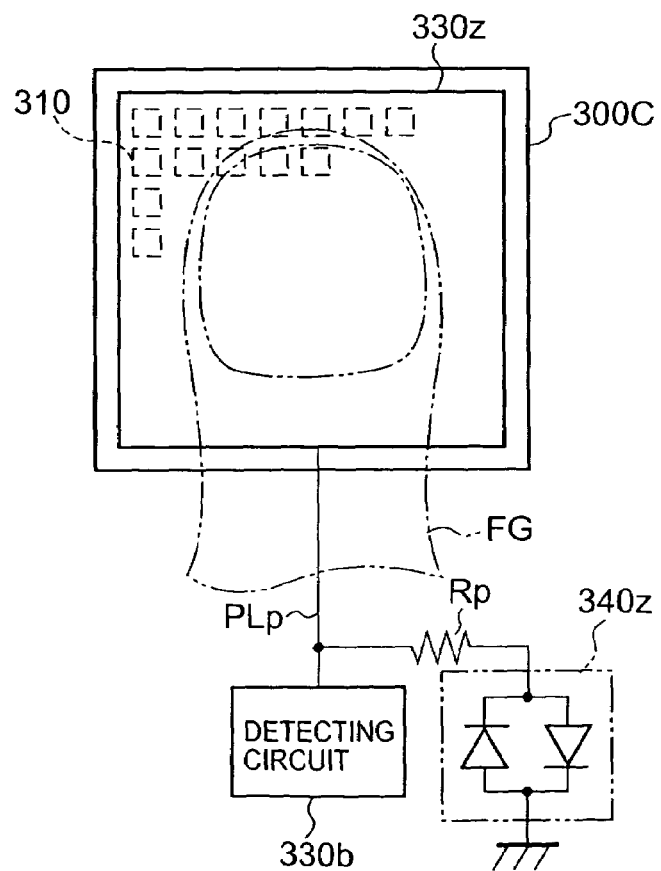
FIG. 27B is a schematic structural view illustrating one structural example of a case in which the image reading apparatus has both the contact detecting function and electrostatic removing function.

FIG. 22 is a schematic structural view illustrating one structural example of the second embodiment of the structure for implementing the electrostatic removing function according to the present invention, and FIG. 23 is a schematic cross-sectional view illustrating the general structure of the electrostatic removing function of the second embodiment. Moreover, FIGS. 24A and 24B are schematic structural views each illustrating other structural example of the second embodiment of the electrostatic removing function. Additionally, hereinafter, an explanation will be given with reference to the structures of the aforementioned double gate type photosensor and the photosensor system.

As illustrated in FIGS. 22 and 23, the image reading apparatus according to the present embodiment has the structure in which the transparent electrode layer 430, which is formed on the photosensor device PD having the same structure as the aforementioned first embodiment (FIG. 18), is provided to extend outside the light receiving area (array area) of the photosensor array 100 and a conductive member FR, which is electrically connected to the transparent electrode layer 430 and the ground potential, is provided in an arbitrary area of the transparent electrode layer 430.

Here, through the setting area for the conductive member FR is not particularly limited, for example, the setting area is a peripheral portion of the transparent electrode layer 430 as illustrated in FIGS. 22 and 23, an area that is not overlapped with the array area AR of the photosensor array 100, and an area where the detecting object does not comes in contact with the conductive member FR directly in a state that the detecting object is placed on the detecting surface DT on the transparent electrode layer 430 and brought into contact therewith. Namely, the conductive member FR is formed on the transparent electrode layer 430 around the array area AR to expose at least the array area AR.

Moreover, the conductive member FR is connected to the ground potential outside of the insulating substrate 200 by a lead wire LNf extended from an arbitrary location, thereby electrically connecting the transparent electrode layer 430 to the ground potential. Here, as the conductive material that forms the conductive member FR, it is possible to use a good conductor with a relatively small electrical resistance as compared with the ITO film, stannic oxide, and the like that form the transparent electrode layer 430, for example, conductive material selected from chromium, aluminum, or alloy material containing chromium, and alloy material containing aluminum can be used satisfactorily.

Here, in the image reading apparatus according to the present embodiment, the sheet resistance of the transparent electrode layer 430 must be 30 Ω/□ or less since the sheet resistance becomes the same as the aforementioned first embodiment when no conductive member FR is provided therein. Then, in order that the sheet resistance of the transparent electrode layer 430 is set to approximately 30 Ω/□ or less, the thickness of 150 nm (1500 Å) or more must be provided though this depends on the film forming condition and material component of the transparent electrode layer 430. However, as explained the first embodiment, if the film thicknesses of the transparent electrode layer 430, the protection insulating film 120, and the like are formed thick, there is a possibility that transmittance of the transparent electrode layer 430, the protection insulating film 120 and the like will be degraded to worsen reading sensitivity and accuracy of the photosensor device.

For this reason, according to the present embodiment, the conductive member FR having low resistance material is provided on the peripheral portion of the transparent electrode layer 430 to establish electrical connection between the transparent electrode layer 430 and the conductive member FR. Since the aforementioned resistance component R is structured by combining the transparent electrode layer 430 and the conductive member FR, it is possible to substantially reduce the resistance of the transparent electrode layer 430.

In other words, for example, the film thickness of the transparent electrode layer 430 is provided relatively thin (for example, about 50 nm (500 Å)), and even if the resistance of the single transparent electrode layer 430 becomes high, the resistance component R combined with the conductive member FR with low resistance can be reduced to make it possible to obtain the electrical characteristic (discharge characteristic), which is substantially equivalent to the case in which the sheet resistance of the transparent electrode layer 430 is set to 30 Ω/□ or less.

In this way, the ground potential is connected to the peripheral edge of the transparent electrode layer 430 through the conductive member FR formed of a good conductor and the lead wire LNf to make it possible to set the sheet resistance of the transparent electrode layer 430 to be substantially low and to set the resistance value of a current path, which is from the transparent electrode layer 430 to the ground potential through the conductive member FR and the lead wire LNf, to be low as a whole, with the result that the film thickness of the transparent electrode layer 430 can be formed relatively thin. Accordingly, even if the detecting object as in the human body (finger and the like) to which relatively high static electricity (10 to 15 kV or more) is charged is placed on the detecting surface DT on the transparent electrode layer 430 and brought into contact therewith, it is possible to discharge to the ground potential satisfactorily from the transparent electrode layer 430 through the conductive member FR and the lead wire LNf, and application of overvoltage to the photosensor PD and the flow-down of overcurrent are controlled, with the result that the device damage of the photosensor and the generation of the erroneous operation of the system can be prevented or suppressed excellently and reading sensitivity, and accuracy of the photosensor device can be ensured satisfactorily.

Additionally, as illustrated in FIGS. 22 and 23, the present embodiment has explained the case in which the conductive member FR is formed on the peripheral portion of the transparent electrode layer 430, the area that is not overlapped with the array area AR of the photosensor array 100, and an area where the detecting object does not comes in contact therewith directly, however, the present invention is not limited to this. For example, as illustrated in FIGS. 24A and 24B, the detecting object may be structured to come in contact with both the detecting surface DT ad the conductive member FR in a state that the detecting object (for example, finger FG) is placed and brought into contact with the detecting surface DT on the transparent electrode layer 430. In this case, it is desirable that the setting area and the shape should be suitably set such that the detecting object comes in contact with the conductive member FR before coming in contact with the detecting surface DT.

According to the image reading apparatus having such the structure, at the time when the detecting object is placed on the detecting surface on the transparent electrode layer and brought into contact therewith, since the detecting object comes in contact with the conductive member with low resistance at the same time when the detecting object comes in contact with the detecting surface (transparent electrode layer) or prior to contact with the detecting surface, static electricity charged to the detecting object can be discharged to the ground potential excellently through the conductive member with low resistance and the lead wring, and the device damage of the photosensor and the generation of the erroneous operation of the system can be prevented or suppressed satisfactorily.

Furthermore, the present embodiment has explained the case in which the conductive member FR is layered on the transparent electrode layer 430 formed to extend around the array area AR, however, the present invention is not limited to this, and this may be one that has the structure in which at least a part of the conductive member FR is electrically connected to the transparent electrode layer 430.

<Third Embodiment of Electrostatic Removing Function>

An explanation will be next given of the third embodiment of the structure for implementing the electrostatic removing function according to the present invention.

The present embodiment has both the structure in which the time constant is set to a predetermined numerical range, thereby improving electrostatic withstand pressure as shown in the first embodiment of the aforementioned electrostatic removing function and the structure in which the conductive member with low resistance is provided on the peripheral portion of the transparent electrode layer to substantially reduce the sheet resistance of the transparent electrode layer, thereby improving electrostatic withstand pressure as shown in the second embodiment of the aforementioned electrostatic removing function.

More specifically, in the structure shown in the second embodiment (FIG. 22, FIG. 23), the conductive member with resistance lower than the transparent electrode layer 430 is provided on the peripheral portion of the transparent electrode layer 430 formed to extend outside the array AR of the photosensor array 100, and a substantial numeric value of the time constant τ, which is defined by the sheet resistance (resistance component) of the transparent electrode layer 430 and the electrostatic capacitance (capacitance component) formed by the protection insulating film 120 and the like, is set to approximately 0.3 μsec or less.

Here, in the image reading apparatus according to this embodiment, there is provided the structure in which the conductive member FR with resistance lower than the transparent electrode layer 430 is electrically connected to the peripheral portion of the transparent electrode layer 430 as shown in the second embodiment, thereby making it possible to reduce the resistance value, as a whole, in the current path, which is from the transparent electrode layer 430 to the ground potential through the conductive member FR and the lead wire LNf, so that it is possible to obtain the same effect as the case in which the sheet resistance of the transparent electrode layer 430 is set to be substantially low.

For this reason, as shown in the first embodiment, the time constant τ, which is defined by the sheet resistance of the transparent electrode layer 430 and the electrostatic capacitance formed by the protection insulating film 120 and the like, can be set to be substantially low without performing change and control of the film quality such as an increase in the film thickness of the transparent electrode layer 430, and this make it possible to improve electrostatic withstand pressure as illustrated in Table 1 and FIG. 21. Accordingly, with the simple structure, the transparent electrode layer, which structures the detecting surface, is formed thin and the sheet resistance is set to be substantially low, making it possible to reduce the constant time on the detecting surface and to improve the discharge characteristic of static electricity, with the result that it is possible to provide the image reading apparatus, which can prevent or suppress the device damage of the photosensor and the generation of the erroneous operation of the system excellently and which can ensure reading sensitivity and accuracy of the photosensor device satisfactorily.

Additionally, the aforementioned embodiment has explained the case in which the double gate type photosensor is used as the sensor that is applied to the photosensor system, however, the sensor applied to the present invention is not limited to this, and it is needless to say that this can be applied to the photosensor system using the other structure such as a photodiode, TFT and the like, similarly.

Furthermore, the above explanation has shown "finger" as the example of the detecting object and "fingerprint" as the example of the image to be read, however, the present invention is not limited to this, and specific portions of the human body besides the finger and the other objects may be used as the detecting objects. Moreover, since excellent electrostatic withstand pressure can be obtained, the present invention can be applied to the detecting object having the characteristic which is more likely to have static as mentioned above.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application Nos. 2002-224110 filed on Jul. 31, 2002 and 2002-272501 filed on Sep. 19, 2002 and including specification, claims, drawings and summary. The disclosure of the above Japanese patent applications is incorporated herein by reference in its entirety.

What is claimed is:

1. An image reading apparatus comprising:
  a detecting surface adapted to have a detecting object placed thereon;
  a sensor array comprising a plurality of sensors arranged to read an image pattern of the detecting object placed on the detecting surface; and
  a contact detector which detects whether the detecting object has been brought into contact with the detecting surface and determines whether the detecting object that has been brought into contact with the detecting surface is a predetermined specific detecting object,
  wherein the contact detector comprises:
    a first detection electrode, which is provided at least on an upper portion of the sensor array, and which comprises the detecting surface;
    a second detection electrode which comprises a conductive case member that is formed of a conductive material and surrounds the sensor array, the second detection electrode being electrically insulated and spaced apart from the first detection electrode;
    a counter electrode which is provided at a lower side of the first detection electrode that is on an opposite side of the first detection electrode from the detecting surface, the counter electrode being opposite to the lower side of the first detection electrode with an interlayer insulating film provided therebetween;
    a signal voltage applying circuit which applies a signal voltage having a first signal waveform that varies periodically to the counter electrode to excite a second signal waveform to the first detection electrode through the interlayer insulating film; and
    a detecting circuit connected to the second detection electrode;
  wherein the detecting circuit (i) detects, upon contact of the detecting object with both the first detection electrode and the second detection electrode, a third signal waveform excited to the second detection electrode, (ii) compares the third signal waveform with a threshold voltage that is preset based on a capacitance component and a resistance component of the specific detecting object, and (iii) detects whether the detecting object has been brought into contact with the detecting surface and determines whether the detecting object is the specific detecting object when the threshold voltage is included within a range of a voltage amplitude of the third signal waveform; and wherein the threshold voltage is set either to a voltage that is higher than an upper limit value of the third signal waveform excited to the second detection electrode in a state in which the detecting object does not come into contact with the detecting surface, or to a voltage that is lower than a lower limit value of the third signal waveform excited to the second detection electrode in a state in which the detecting object does not come into contact with the detecting surface.

2. The image reading apparatus according to claim 1, further comprising a drive controller which supplies a predetermined drive control signal to each sensor of the sensor array to perform an image reading operation of the image pattern of the detecting object placed on the detecting surface.

3. The image reading apparatus according to claim 2, wherein the drive controller controls the image reading operation based on a result of the determination by the contact detector of whether the detecting object is the specific detecting object.

4. The image reading apparatus according to claim 1, wherein each sensor of the sensor array comprises a photosensor, and the first detection electrode and interlayer insulating film transmit light.

5. The image reading apparatus according to claim 4, wherein the first detection electrode comprises a transparent conductive film formed on the upper portion of the sensor array with the interlayer insulting film provided between the upper portion of the sensor array and the transparent conductive film, and the photosensors receive light through the first detection electrode and the interlayer insulating film.

6. The image reading apparatus according to claim 5, wherein the transparent conductive film comprises indium-tin oxide.

7. The image reading apparatus according to claim 1, wherein the first detection electrode comprises a conductive film formed on the upper portion of the sensor array.

8. The image reading apparatus according to claim 1, wherein the specific detecting object is a part of a human user, and the image pattern read by the sensor array is an image pattern specific to the human user.

9. The image reading apparatus according to claim 1, wherein the first detection electrode and the second detection electrode are arranged such that the detecting object is laid across the first detection electrode and the second detection electrode to be brought into contact therewith.

10. The image reading apparatus according to claim 1, further comprising an amplitude limiting circuit which defines upper and lower limit voltage values of the second signal waveform excited to the first detection electrode.

11. The image reading apparatus according to claim 10, wherein the amplitude limiting circuit comprises an anti-parallel diode circuit provided between the first detection electrode and a ground potential, and the amplitude limiting circuit defines the upper and lower limit voltage values of the second signal waveform excited to the first detection electrode based on forward voltages of respective diodes that form the anti-parallel diode circuit.

12. The image reading apparatus according to claim 1, wherein the signal voltage applying circuit applies, to the counter electrode, a signal having a predetermined voltage amplitude and two periodical voltage levels.

13. The image reading apparatus according to claim 1, wherein the contact detector determines whether the detecting object is the specific detecting object based on a value of the voltage amplitude and a value of a central voltage of the voltage amplitude of the third signal waveform excited to the second detection electrode.

14. The image reading apparatus according to claim 1, wherein the threshold voltage is set to a voltage that is higher than the upper limit value of the third signal waveform excited to the second detection electrode in the state in which the detecting object does not come into contact with the detecting surface.

15. The image reading apparatus according to claim 1, wherein the threshold voltage is set to a voltage that is lower than the lower limit value of the third signal waveform excited to the second detection electrode in the state in which at least the detecting object does not come into contact with the detecting surface.

16. The image reading apparatus according to claim 1, wherein the detecting circuit comprises a threshold voltage setting circuit that sets the threshold voltage, and a comparing circuit that compares the threshold voltage and the third signal waveform.

17. The image reading apparatus according to claim 16, wherein the detecting circuit determines whether the threshold voltage is included in the range of the voltage amplitude of the third signal waveform based on a result of the comparison by the comparing circuit, and outputs a contact detection signal indicating that the detecting object is the specific detecting object when it is determined that the threshold voltage is included in the range of the voltage amplitude of the third signal waveform.

18. The image reading apparatus according to claim 16, wherein the third signal waveform is a waveform that varies periodically, and the contact detector comprises a contact determining circuit which counts a number of times that the third signal waveform has passed the threshold voltage based on a signal from the detecting circuit, and which outputs a contact detection signal indicating that the detecting object is the specific detecting object when a number of times in a row that the third signal waveform has passed the threshold voltage exceeds a preset number of times.

19. The image reading apparatus according to claim 1, wherein the sensors comprise photosensors, each of which includes a source electrode and a drain electrode that are formed to sandwich a channel area formed of a semiconductor layer, and a first gate electrode and a second gate electrode that are formed at least on upper and lower portions of the channel area with respective gate insulating films provided between the gate electrodes and the channel area, and wherein a reset pulse is applied to the first gate electrode to initialize the sensor and a precharge pulse is applied to the drain electrode, thereafter a read pulse is applied to the second gate such that an electrical charge corresponding to an amount of irradiated light is stored in the channel area for a charge storing time, which is from an end of initialization to application of the read pulse, and a voltage corresponding to the amount of the stored charge is output as an output voltage to the channel area, and the image pattern of the detecting object placed on the detecting surface is read based on a difference between a signal voltage according to the precharge pulse and the output voltage.

20. The image reading apparatus according to claim 19, wherein the sensors are formed on an insulating substrate that transmits light, a protection insulating film is formed on a side of the sensors opposite to the insulating substrate, and the interlayer insulating film includes the protection insulating film and the gate insulating films.

21. The image reading apparatus according to claim 20, wherein a transparent conducive film is formed on the protection insulating film, and the first detection electrode comprises the transparent conductive film.

22. The image reading apparatus according to claim 19, wherein the counter electrode comprises the drain electrodes, and the first signal voltage applied to the counter electrode by the signal voltage applying circuit is a pulse voltage applied to the drain electrodes.

23. The image reading apparatus according to claim 22, wherein the pulse voltage is the precharge pulse.

24. The image reading apparatus according to claim 19, wherein the sensor array includes a plurality of drain lines connected to the drain electrodes of the photosensors, the counter electrode comprises the drain electrodes and the drain lines, and the first signal voltage applied to the counter electrode by the signal voltage applying circuit is a pulse voltage applied to the drain lines.

25. The image reading apparatus according to claim 24, wherein the pulse voltage is the precharge pulse.

26. The image reading apparatus according to claim 1, wherein a time constant, which is defined by a resistance component between the detecting surface and a ground potential and a capacitance component added to the detecting surface, is set to a value in a range of 0.2 to 0.3 μsec.

27. The image reading apparatus according to claim 26, wherein the resistance component includes electrical resistance of the first detection electrode.

28. The image reading apparatus according to claim 26, wherein the capacitance component includes electrostatic capacitance between the first detection electrode and the counter electrode and between the first detection electrode and the sensors.

29. The image reading apparatus according to claim 26, wherein the time constant is set to a value in a range of 0.2 to 0.25 μsec.

30. The image reading apparatus according to claim 26, wherein the resistance component has a sheet resistance having a value of 30 Ω.

31. The image reading apparatus according to claim 26, wherein the capacitance component has a capacitance having a value set to approximately 7 to 10 nF.

32. The image reading apparatus according to claim 26, wherein each sensor of the sensor array comprises a photosensor having a light receiving surface, the first detection electrode has an area larger than a light receiving area of the sensor array, and the first detection electrode comprises a transparent electrode film formed on an upper portion of the light receiving area of the sensor array with the interlayer insulating film provided between the upper portion of the light receiving area and the transparent electrode film; and
wherein the photosensors receive light in the light receiving area through the first detection electrode and the interlayer insulting film.

33. The image reading apparatus according to claim 32, wherein a conductive member having a resistance value that is lower than a resistance value of the transparent conductive film is provided to be electrically connected to an area besides an area corresponding to at least a light receiving area of the transparent conductive film.

34. The image reading apparatus according to claim 33, wherein the resistance component includes electrical resistance formed by the transparent conductive film and the conductive member.

35. The image reading apparatus according to claim 33, wherein the conductive member comprises one of chromium, aluminum, an alloy material containing chromium, and an alloy material containing aluminum.

36. A driving method for driving an image reading apparatus including a sensor array having a detecting surface on which a detecting object is placed and a drive controller which reads an image pattern of the detecting object placed on the detecting surface, the method comprising:
applying a signal voltage having a first signal waveform that varies periodically to a counter electrode which is provided on an upper portion of the sensor array such that the counter electrode is provided at a lower side of a first detection electrode which comprises the detection surface at an upper side thereof with an interlayer insulating film provided between the counter electrode and the first detection electrode, to excite a second signal waveform to the first detection electrode;
detecting a third signal waveform, which is excited to a second detection electrode upon contact of the detecting object with both the first detection electrode and the second detection electrode, the second detection electrode comprising a conductive case member that surrounds the sensor array and being electrically insulated and spaced apart from the first detection electrode, and the detecting being performed by a detecting circuit connected to the second detection electrode;
detecting whether the detecting object has been brought into contact with the detecting surface and determining whether the detecting object that has been brought into contact with the detecting surface is a specific detecting object based on a voltage level value of the third signal waveform detected by the detecting circuit; and
starting reading of the image pattern by the drive controller when it is determined that the detecting object has been brought into contact with the detecting surface and that the detecting object is the specific detecting object;
wherein detecting whether the detecting object has been brought into contact with the detecting surface and determining whether the detecting object is the specific detecting object comprises:
comparing the third signal waveform with a threshold voltage that is preset based on a capacitance component and a resistance component of the specific detecting object, and determining whether the threshold voltage is included within a range of a voltage amplitude of the third signal waveform; and
detecting whether the detecting object has been brought into contact with the detecting surface and determining whether the detecting object is the specific detecting object when it is determined that the threshold voltage is included within the range of the voltage amplitude of the third signal waveform, and
wherein the threshold voltage is set either to a voltage that is higher than an upper limit value of the third signal waveform excited to the second detection electrode in a state in which the detecting object does not come into contact with the detecting surface, or to a voltage that is lower than a lower limit value of the third signal waveform excited to the second detection electrode in a state in which the detecting object does not come into contact with the detecting surface.

37. The driving method for the image reading apparatus according to claim 36, wherein comparing the threshold voltage with the third signal waveform comprises detecting whether the third signal waveform has passed the threshold voltage, and determining that the detecting object is the specific detecting object when a number of times in a row that the third signal waveform has passed the threshold voltage exceeds a preset number of times.

38. The driving method for the image reading apparatus according to claim 36, wherein the threshold voltage is set to a voltage that is higher than the upper limit value of the third signal waveform excited to the second detection electrode in the state in which the detecting object does not come into contact with the detecting surface.

39. The driving method for the image reading apparatus according to claim 36, wherein the threshold voltage is set to a voltage that is lower than the lower limit value of the third signal waveform excited to the second detection electrode in the state in which at least the detecting object does not come into contact with the detecting surface.

* * * * *